US009559417B1

(12) United States Patent
Schwarzwalder

(10) Patent No.: US 9,559,417 B1
(45) Date of Patent: Jan. 31, 2017

(54) SIGNAL PROCESSING

(75) Inventor: Joseph J. Schwarzwalder, Bristow, VA (US)

(73) Assignee: The Boeing Company, Chicago, IL (US)

(*) Notice: Subject to any disclaimer, the term of this patent is extended or adjusted under 35 U.S.C. 154(b) by 1216 days.

(21) Appl. No.: 13/249,846

(22) Filed: Sep. 30, 2011

Related U.S. Application Data

(60) Provisional application No. 61/408,456, filed on Oct. 29, 2010.

(51) Int. Cl.
*H01Q 3/00* (2006.01)
*H01Q 3/26* (2006.01)
*H04B 7/04* (2006.01)
*H01Q 3/28* (2006.01)
*H04B 7/08* (2006.01)

(52) U.S. Cl.
CPC ............. *H01Q 3/26* (2013.01); *H01Q 3/2605* (2013.01); *H04B 7/0456* (2013.01); *H01Q 3/2652* (2013.01); *H01Q 3/28* (2013.01); *H04B 7/086* (2013.01); *H04B 7/0854* (2013.01)

(58) Field of Classification Search
CPC ...... H01Q 3/26; H01Q 3/2605; H01Q 3/2652; H01Q 3/28; H04B 7/043; H04B 7/0456; H04B 7/0854; H04B 7/0857; H04B 7/086; H04B 7/0862; H04B 7/0865
USPC ......................... 342/369, 372, 373, 377, 378
See application file for complete search history.

(56) References Cited

U.S. PATENT DOCUMENTS

| | | | | |
|---|---|---|---|---|
| 4,641,259 A * | 2/1987 | Shan et al. | ..................... | 708/319 |
| 7,120,657 B2 * | 10/2006 | Ricks et al. | .................. | 708/322 |
| 7,319,640 B1 * | 1/2008 | Donald | ..................... | G01S 3/86 |
| | | | | 367/118 |
| 7,471,744 B2 * | 12/2008 | Van Wechel et al. | ........ | 375/316 |
| 7,671,800 B2 * | 3/2010 | Lee | ................ | 342/420 |
| 8,224,254 B2 * | 7/2012 | Haykin | ...................... | 455/67.11 |
| 8,290,459 B2 * | 10/2012 | Lagunas et al. | ........... | 455/226.1 |
| 8,428,897 B2 * | 4/2013 | Richmond | ................ | G01S 3/74 |
| | | | | 356/303 |
| 8,705,759 B2 * | 4/2014 | Wolff | ..................... | G10L 21/02 |
| | | | | 381/66 |

OTHER PUBLICATIONS

"Extrapolation Algorithms for Discrete Signals with Application in Spectral Estimation", Jain A.; Ranganath, S. Acoustics, Speech, and Signal Processing, IEEE International Conference on ICASSP '84. vol. 29, Issue 4, Aug. 1981, pp. 830-845.*

(Continued)

*Primary Examiner* — Chuong P Nguyen
(74) *Attorney, Agent, or Firm* — Toler Law Group, PC

(57) ABSTRACT

A particular computer-implemented method includes receiving sensed data from sensors of a sensor array, where data from each sensor is descriptive of waveform phenomena detected at the sensor. The method also includes determining an estimated spatial spectrum of the waveform phenomena based at least partially on the sensed data. The method further includes determining an estimated covariance matrix of the waveform phenomena based on the estimated spatial spectrum. The method includes determining adaptive beamforming weights using the estimated covariance matrix.

30 Claims, 6 Drawing Sheets

(56) References Cited

OTHER PUBLICATIONS

"Spectrum Estimation and Harmonic Analysis", Thomson D. Proceedings of the IEEE, vol. 70, No. 9, Sep. 1982 (Sep. 1982), pp. 1055-1096.*

Coherent Subtraction of Narrowband Radio Frequency Interference; Kyehun Lee May 4, 2007—Radio Science, vol. ???, No., pp. 1-19 http://www.faculty.ece.vt.edu/swe/lwa/memo/lwa0085.pdf.*

"An Overview of Multiple-Window and Quadratic-Inverse Spectrum Estimation Methods"; Thomson, D.J.; Acoustics, Speech, and Signal Processing, 1994; IEEE International Conference on Year: 1994, vol. vi; pp. VI/185-VI/194 vol. 6.*

"Harmonic Analysis and Spectral Estimation"; John J. Benedetto; Journal of Mathematical Analysis and Applications; vol. 91, Issue 2, Feb. 1983, pp. 444-509.*

Baggeroer, A.B. et al., "Passive Sonar Limits Upon Nulling Multiple Moving Ships with Large Aperture Arrays," IEEE Conference Record of the Thirty-Third Asilomar Conference on Signals, Systems, and Computers, vol. 1, Oct. 1999, pp. 103-108.

Guerci, J.R., "Theory and Application of Covariance Matrix Tapers for Robust Adaptive Beamforming," IEEE Transactions on Signal Processing, vol. 47, No. 4, Apr. 1999, pp. 977-985.

Jin, Y. et al., "A CFAR Adaptive Subspace Detector for Second-Order Gaussian Signals," IEEE Transactions on Signal Processing, vol. 53, No. 3, Mar. 2005, pp. 871-884.

Kirsteins, I. et al., "Adaptive Detection Using Low Rank Approximation to a Data Matrix," IEEE Transactions on Aerospace and Electronic Systems, vol. 30, No. 1, Jan. 1994, pp. 55-67.

Kraay, A. et al., "A Physically Constrained Maximum-Likelihood Method for Snapshot-Deficient Adaptive Array Processing," IEEE Transactions on Signal Processing, vol. 55, No. 8, Aug. 2007, pp. 4048-4063.

Linebarger, D., "Redundancy Averaging with Large Arrays," IEEE Transactions on Signal Processing, vol. 41, No. 4, Apr. 1993, pp. 1707-1710.

Linebarger, D. et al., "The Effect of Spatial Averaging on Spatial Correlation Matrices in the Presence of Coherent Signals," IEEE Transactions on Acoustics, Speech and Signal Processing, vol. 38, No. 5, May 1990, pp. 880-884.

Ricks, D.C. et al., "What Is Optimal Processing for Nonstationary Data?," IEEE Conference Record of the Thirty-Fourth Asilomar Conference on Signals, Systems and Computers, vol. 1, Oct. 29-Nov. 1, 2000, pp. 656-661.

Schwarzwalder, J.J. et al., "ABF Performance Using Covariance Matrices Derived From Spatial Spectra for Large Arrays," IEEE Conference Record of the Forty-Third Asilomar Conference on Signals, Systems and Computers, Nov. 2009, pp. 1164-1168.

Wage, K., "Multitaper Array Processing," IEEE Proceedings of the Fourty-First Asilomar Conference on Signals, Systems, and Computers, vol. 1, Nov. 2007, pp. 1242-1246.

Yu, L. et al., "A Novel Robust Beamforiner Based on Sub-Array Data Subtraction for Coherent Interference Suppression," IEEE/SP 15th Workshop on Statistical Signal Processing, Aug. 31-Sep. 3, 2009, pp. 525-528.

Zatman, M., "Comments on 'Theory and Application of Covariance Matrix Tapers for Robust Adaptive Beamforming'," IEEE Transactions on Signal Processing, vol. 48, No. 6, Jun. 2000, pp. 1796-1800.

* cited by examiner

SIGNAL PROCESSING

CLAIM OF PRIORITY

The present application claims priority to U.S. Provisional Application No. 61/408,456 filed Oct. 29, 2010, which is incorporated by reference herein in its entirety.

FIELD OF THE DISCLOSURE

The present disclosure is generally related to signal processing.

BACKGROUND

Deployment of long aperture arrays using large numbers of sensor elements has been enabled by the evolution of sensor technology, telemetry technology, and digital processing technology. Such arrays hold promise for benefits in terms of theoretical processing gain and spatial resolution. Long aperture arrays have been employed across a range of applications, including acoustic and radar applications. Adaptive beamforming techniques have been applied to long aperture arrays to increase a system's ability to perform well in complicated signal and interference environments. For many adaptive beamforming techniques, increasing the number of sensor elements of the array works against a desire to adapt quickly. Additionally, multipath environments introduce challenges that may cause substantial performance loss for certain adaptive beamforming techniques. Many approaches for covariance estimation for adaptive beamforming have been proposed. Many adaptive beamforming techniques use sensed data to estimate a covariance matrix and use the covariance matrix for spectral estimation. However, snapshot deficient operation and correlated signal and interference environments continue to be difficult to handle for certain adaptive beamforming techniques.

SUMMARY

An adaptive beamforming technique is disclosed in which a spatial spectrum is estimated based on sensed data. The estimated spatial spectrum is used to estimate a covariance matrix. The estimated covariance matrix may be used for adaptive beamforming.

In a particular embodiment, a computer-implemented method includes receiving sensed data from sensors of a sensor array, where data from each sensor is descriptive of waveform phenomena detected at the sensor. The method also includes determining an estimated spatial spectrum of the waveform phenomena based at least partially on the sensed data. The method further includes determining an estimated covariance matrix of the waveform phenomena based on the estimated spatial spectrum. The method includes determining adaptive beamforming weights using the estimated covariance matrix.

In another particular embodiment, a non-transitory computer-readable medium includes instructions that, when executed by a processor, cause the processor to receive sensed data from sensors of a sensor array, where data from each sensor is descriptive of waveform phenomena detected at the sensor. The instructions also cause the processor to determine an estimated spatial spectrum of the waveform phenomena based at least partially on the sensed data. The instructions further cause the processor to determine an estimated covariance matrix of the waveform phenomena based on the estimated spatial spectrum. The instructions also cause the processor to determine adaptive beamforming weights using the estimated covariance matrix.

In another particular embodiment, a system includes a sensor array including multiple sensors and a signal processor coupled to the sensor array. The signal processor is configured to receive sensed data from the sensors of the sensor array, where data from each sensor is descriptive of waveform phenomena detected at the sensor. The signal processor is also configured to determine an estimated spatial spectrum of the waveform phenomena based at least partially on the sensed data. The signal processor is further configured to determine an estimated covariance matrix of the waveform phenomena based on the estimated spatial spectrum. The signal processor is configured to determine adaptive beamforming weights using the estimated covariance matrix.

The features, functions, and advantages that have been described can be achieved independently in various embodiments or may be combined in yet other embodiments, further details of which are disclosed with reference to the following description and drawings.

DETAILED DESCRIPTION

In a particular embodiment, a covariance matrix for a sensor array responsive to waveform phenomena (also referred to herein as a space-time process) may be determined based on locations of individual sensor element of the sensor array, directional response and noise of the individual sensor elements, and a spatial spectrum of the waveform phenomena. In this embodiment, the covariance matrix may have a particular structure that can be exploited to improve adaptive beamformer performance both in terms of snapshot deficient operation and in terms of robustness against correlated signal and interference environments. Such performance improvements may be particularly beneficial for large aperture arrays employing large numbers of sensor elements when operating in non-stationary and multi-path environments.

In a particular embodiment, the covariance matrix is determined using structured covariance techniques referred to herein as a covariance from spatial spectrum (CSS) method. In disclosed CSS methods, the spatial spectrum of the sensor array observing the waveform phenomena is estimated, and spatial spectrum to covariance transforms are employed to estimate the covariance matrix. Performance predictions indicate that the disclosed structured covariance techniques can provide near optimal performance for passive signal detection and recovery with very few snapshots (e.g., with a single snapshot or with fewer snapshots than interferers, as described further below).

In a particular embodiment, multi-taper spectral estimation with harmonic analysis is used to estimate the spatial spectrum. Other spectral estimation techniques, such as classical power spectral estimation techniques may be used in other embodiments. The spatial spectrum estimation techniques disclosed may be extended to support arbitrary array geometry and non-ideal array manifold response. The non-ideal array manifold response may include random or non-deterministic variations in gain, phase, and directionality in the sensors, deterministic positional errors (e.g., the bending experienced by an underwater towed array), or both non-deterministic and deterministic errors.

Figure 1:
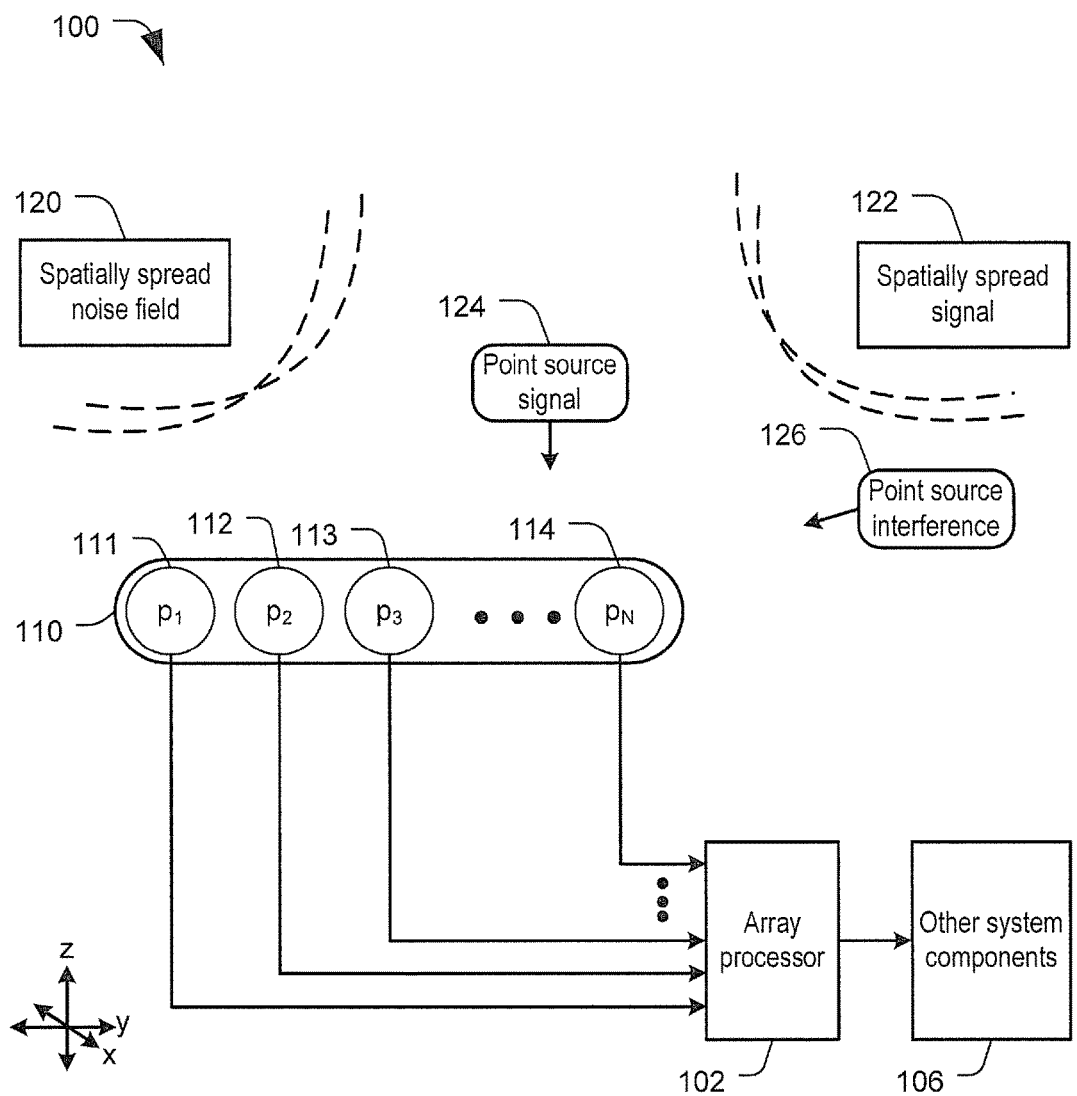
FIG. 1 is a block diagram of a particular embodiment of a signal processing system, including an array processor and a sensor array.

FIG. 1 is a block diagram of a particular embodiment of a signal processing system 100. The signal processing system 100 includes a sensor array 110 including multiple sensors 111-114. The sensor array 110 may be coupled to an array processor 102. The sensor array 100 may have an arbitrary geometry. For example, the sensors 111-114 may be uniformly or non-uniformly spaced, arranged linearly or non-linearly (e.g., curved), and so forth.

The array processor 102 may be configured to receive sensed data from the sensors 111-114 of the sensor array 110. Data from each sensor 111-114 may be descriptive of waveform phenomena detected at the sensor 111-114. The array processor 102 may be configured to perform structured covariance estimation from spatial spectra for adaptive beamforming. For example, the array processor 102 may determine an estimated spatial spectrum of the waveform phenomena based at least partially on the sensed data. The array processor 102 may determine an estimated covariance matrix of the waveform phenomena based on the estimated spatial spectrum. The array processor 102 may also determine adaptive beamforming weights using the estimated covariance matrix. The array processor 102 or one or more other system components 106 may be configured to apply the adaptive beamforming weights to the sensed data to reconstruct a time-domain signal from the waveform phenomena.

In a particular embodiment, the array processor 102 uses a structured covariance determination method, which incorporates some a priori knowledge or constraints. For example, the array processor 102 may impose a priori knowledge or constraints, such as an assumption that a space-time process being observed is stationary in time, space, or both (e.g., a source of the waveform phenomena is stationary), or geometric information or constraints associated with the sensors 111-114 of the sensor array 110. Such a priori knowledge or constraints may reduce a number of unknown quantities to estimate or a size of an allowable solution space. Thus, structured covariance determination methods may convergence to a final solution with little data or reduced data in some scenarios.

In FIG. 1, the sensors 111-114 of the sensor array 110 spatially sample an environment and provide time varying output data to the array processor 102, which operates on the output data. The sampled environment may include signal(s), interference, noise or a combination thereof. Certain of the signals and interference may originate from discrete point sources, such as a point source signal 124 and a point source interference 126. Other signals or interference may be spatially spread fields, such as a spatially spread noise field 120 and a spatially spread signal 122.

The array processor 102 performs one or more operations using the output data from the sensor array 110. For example, the array processor 102 may determine whether a signal is present or not for a particular range and/or direction of arrival (which may be referred to as a "detection problem"). In another example, the array processor 102 may use the output data to reconstruct one or more components of a time-domain waveform (which may be referred to as a "beamforming problem"). Knowledge of temporal characteristics of signals in the sampled environment may be exploited when such characteristics are known, as may be the case, for example, in communications or active radar or sonar processing. Alternately, the signal may be unknown. In a particular embodiment, the array processor 110 uses multi-taper spectral estimation in a manner that combines non-parametric spectral estimation and harmonic analysis.

Adaptive beamforming may be used to suppress noise and interference components detected in the sampled environment and to enhance response to desired signals. The array processor 102 may determine a vector of beamforming weights (referred to herein as a weighting vector, $\underline{w}$) for use in adaptive beamforming. The weighting vector may be used to combine the sensor array 110 outputs, at a particular time, $\underline{x}_m$, to produce a scalar output, $y_m = \underline{w}^H \underline{x}_m$. When the covariance matrix, $\underline{R} = E\{\underline{x}\underline{x}^H_m\}$, for the sensor array outputs is known (or estimated), an optimal or near-optimal set of beamforming weights, $\underline{w}_{opt}$, may be determined as $\underline{w}_{opt} = \gamma \underline{R}^{-1}\underline{s}$, where $\underline{s}$ is a steering vector and $\gamma$ is a normalization factor determined via an optimization process. The covariance matrix $\underline{R}$ may not be known a priori, and may therefore be estimated. When the noise and interference are Gaussian, a sample covariance matrix, $\hat{R}_{SCM}$, may be used as an unconstrained maximum likelihood (ML) estimate of $\underline{R}$. The sample covariance matrix may be determine as:

$$\hat{R}_{SCM} = \frac{1}{M} \sum_{m=1}^{M} x_m x_m^H \tag{1}$$

Eqn. (1) is valid over a duration that the sampled environment can be considered stationary. Nonstationarity in the sampled environment may arise in both sonar and radar applications and may be a limiting factor in the ability to estimate $\underline{R}$ from the output data of the sensor array 110. In the case of sonar, a dominant noise mechanism in cluttered environments may be shipping. A combination of continuous motion of sound sources relative to the sensor array 110 at short ranges and corresponding small resolution cells of the sensor array 110 may establish a time scale over which a short-term stationarity assumption is valid. In space-time adaptive processing (STAP) for radar, a resolution of range-Doppler cells may be susceptible to nonstationarity in the form of heterogeneous clutter, caused by ground clutter varying over the surface of the earth. Nonstationary conditions may be addressed by using a limited number of snapshots of data from the sensor array 110. A snapshot refers to a set of samples including no more than one sample from each sensor 111-114 of the sensor array 110. Snapshot deficient operation refers to a condition in which a limited amount of snapshot data is available for processing. Snapshot deficient operation may be a concern when the stationarity assumption applies only over a limit number of snapshots and the limit number of snapshots is insufficient for the algorithm to converge. In addition to concerns caused by snapshot deficient operation due to nonstationarity, correlated signal and interference can also be problematic in adaptive beamforming. Correlated interference may arise in multipath or smart jamming scenarios, resulting in signal cancellation effects. Applications that have no a priori knowledge of the inbound signal at the desired direction of arrival, such as passive sonar, may be subject to this effect.

In a particular embodiment, covariance from spatial spectrum (CSS) processing for uniform linear and regularly spaced array geometries may be performed using power spectral estimation techniques (such as windowed averaged periodogram techniques) and fast Fourier transform (FFT) processing. However, such techniques may estimate the covariance with bias. Additionally, discrete or point source interference and spatial separation from the steering vector may degrade performance. Additional processing may be performed to detect, estimate, and subtract discrete components from such sources from available snapshot data prior to determining a final covariance matrix estimate. Such processing enables operation with negligible normalized signal to interference and noise ratio (SINR) loss under a large range of conditions.

The signal processing system 100 may also include one or more other components coupled to the array processor 102. For example, the one or more other system components 106 may include devices that use the covariance matrix, the beamforming weights, the sensed data, the time-domain signal, or other data available to or generated by the array processor 102.

Figure 2:
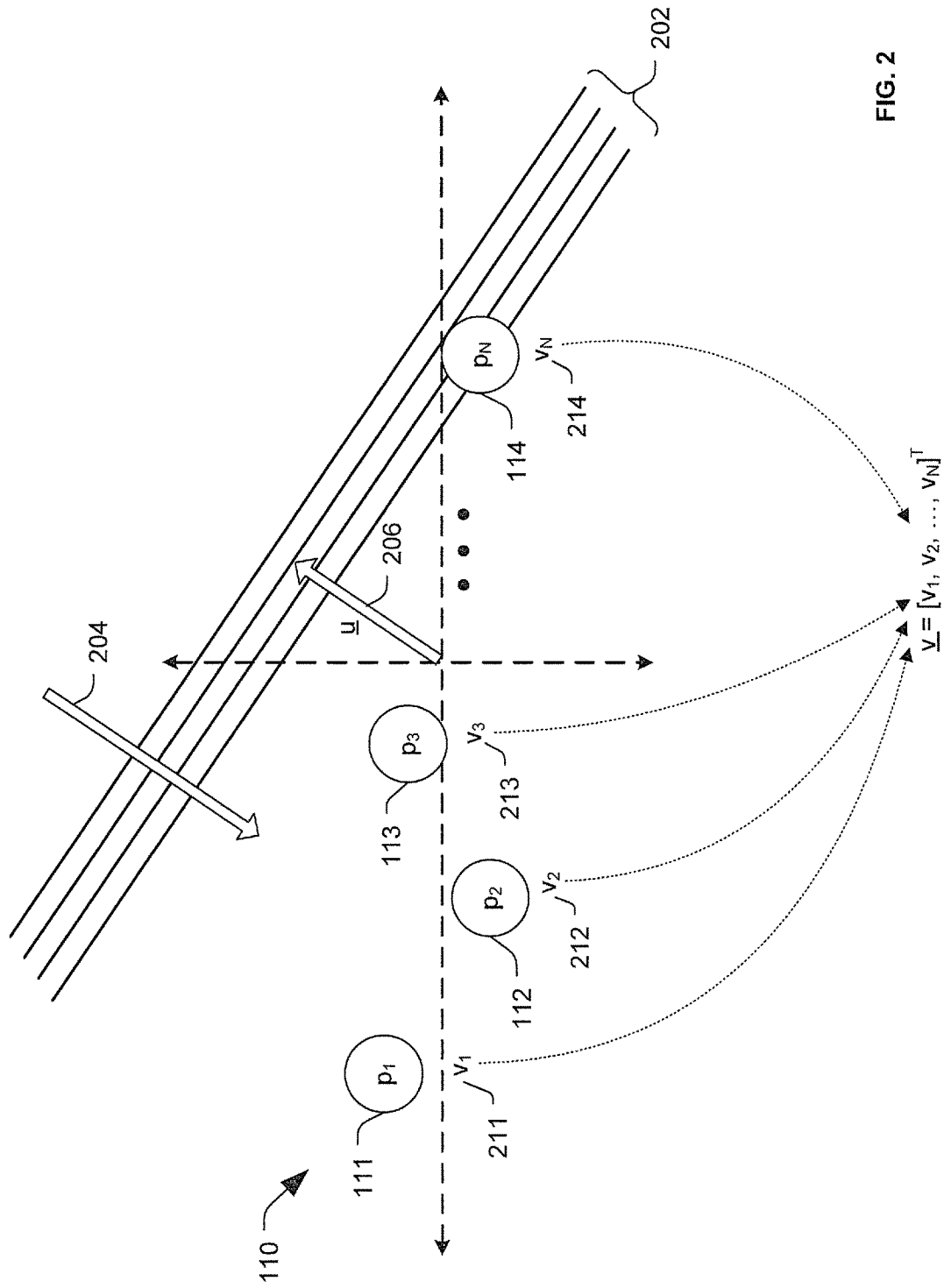
FIG. 2 is a diagram of a particular embodiment of a plane wave impinging sensors of the sensor array of FIG. 1.

FIG. 2 is a diagram of a particular embodiment of plane wave impinging sensors 111-114 of the sensor array 110 of FIG. 1. In FIG. 2, the sensor array 110 is an N element array with arbitrary sensor positions subject to one or more incident plane waves 202. The location of an $N^{th}$ sensor 114 may be specified in Cartesian coordinates as $\underline{p}_n = [x_n, y_n, z_n]^T$. Outputs of the sensors 111-114 resulting from the incident plane wave 202 may be described by an array manifold response vector, $\underline{v} = ((v_n(\underline{u})))_n$, where $\underline{u}$ is a unit directional vector 206 that is opposite a direction of propagation 204 of the one or more plane waves 202.

Under a narrowband assumption, the effect of the plane wave 202 as it propagates across the array 110 in space may be approximated by a phase shift, and the array manifold response vector may be represented as:

$$\underline{v} = \left(\left(\exp(-j\underline{k}^T \underline{p}_n)\right)\right)_n = \left(\left(\exp\frac{j2\pi}{\lambda} \underline{u}^T \underline{p}_n\right)\right)_n$$

Each array element 111-114 may be sampled simultaneously at a time index m to produce a snapshot, $\underline{x}_m$, where data elements of the snapshot are individual sensor outputs. M snapshots may be produced for processing, one for each time index m. The snapshot $\underline{x}_m$ may include components that derive from different sources. For example, the snapshot $\underline{x}_m$ may include a contribution from point sources, which may be described as $\underline{V}\underline{a}_m$, where $\underline{V}$ is a matrix of array manifold responses and $\underline{a}_m$ is a vector of point source amplitudes. When only a single point source is present, the contribution from the point source may be described as $\underline{v}a_m$, where $\underline{v}$ is the array manifold response and $a_m$ is a scalar value of the individual point source amplitude. Both the vector of point source amplitudes, $\underline{a}_m$, and the scalar point source amplitude, $a_m$, may be modeled as complex Gaussian. The snapshot $\underline{x}_m$ may also include a contribution from background or environmental noise, which may be described as $\underline{n}_{b,m}$. The snapshot $\underline{x}_m$ may also include a contribution from internal noise of the sensors which may be described as $\underline{n}_{w,m}$. Thus, the snapshot $\underline{x}_m$ may be a zero mean complex Gaussian random vector, since it may be a linear combination of uncorrelated, zero mean, complex Gaussian random vectors.

For the N element sensor array 110 of omni-directional sensors 111-114 at locations $\underline{p}_n$, n=1, 2, . . . , observing waveform phenomena (e.g., the plane wave 202) that can be described as a function f(t, $\underline{p}$) with corresponding covariance $R_f(\underline{p})$, the covariance matrix for the array outputs, ignoring sensor noise components, may include:

$\underline{R}_f = ((R_f(p_r - p_c)))r, c$ which can be expressed in matrix form using the frequency-wavenumber spectrum, $P_f(\underline{k})$, and array manifold response vector, $\underline{v}(\underline{k})$.

$\underline{R}_f = (2\pi)^{-C} \int \cdots \int_R C P_f(\underline{k}) \underline{v}(\underline{k}) \underline{v}^H(\underline{k}) d\underline{k}$ where –C is the dimension of $\underline{k}$. The waveform phenomena may also be interpreted another way. A wavenumber restriction, $|\underline{k}| = 2\pi/\lambda$, implies that plane waves 202 observed by the sensor array 110 correspond to angles of arrival that may physically propagate to the sensor array 110. The waveform phenomena in this case may be modeled as the sum of uncorrelated plane waves, that are distributed according to a normalized directional distribution, $G_f(\omega, \theta, \phi)$, across all angles of arrival to the sensor array 110, where $\omega$ is a radian frequency, $\theta$ is an angle from vertical in a spherical coordinate system, and $\phi$ is an azimuth angle in the spherical coordinate system.

Figure 3:
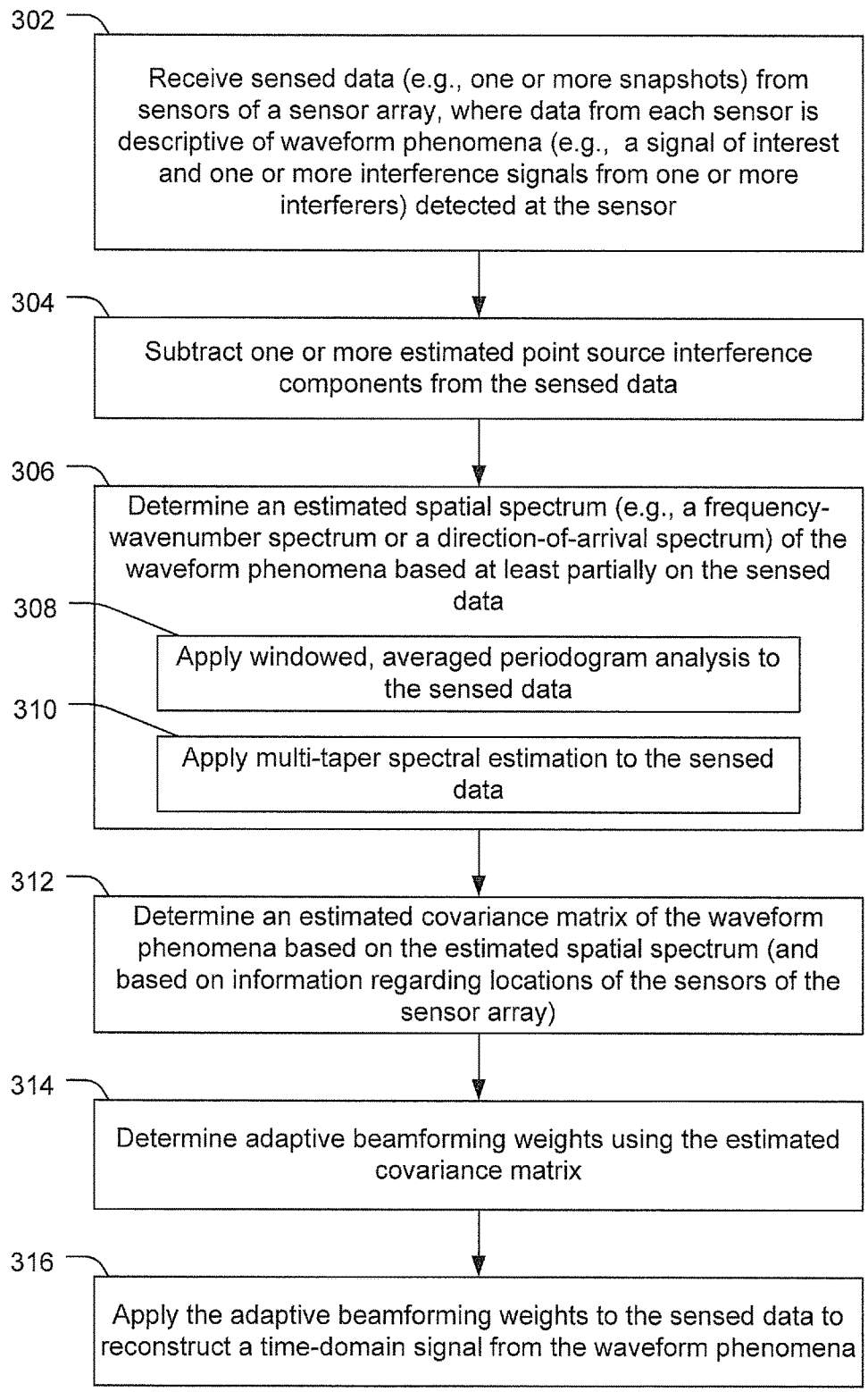
FIG. 3 is a flow diagram of a first particular embodiment of a method of signal processing.

FIG. 3 is a flow diagram of a first particular embodiment of a method of signal processing. The method may be performed by an array processor, such as the array processor 102 of FIG. 1, or by another signal processing system. At 302, sensed data may be receiving from sensors of a sensor array. Data from each sensor may be descriptive of waveform phenomena detected at the sensor. For example, the waveform phenomena may include a signal of interest and one or more interference signals from one or more interferers. The sensed data may correspond to a single snapshot from the sensor array or more than one snapshot.

At 304, one or more estimated point source interference components may be subtracted from the sensed data. For example, a harmonic analysis technique may be used to subtract the point source interference components.

At 306, an estimated spatial spectrum of the waveform phenomena may be determined based at least partially on the sensed data. For example, the estimated spatial spectrum may include a frequency-wavenumber spectrum of the waveform phenomena or a direction-of-arrival spectrum of the waveform phenomena. In a particular embodiment, the estimated spatial spectrum is determined by applying windowed, averaged periodogram analysis to the sensed data, at 308. In another particular embodiment, the estimated spatial spectrum is determined by applying multi-taper spectral estimation to the sensed data, at 310.

At 312, an estimated covariance matrix of the waveform phenomena may be determined based on the estimated spatial spectrum. In a particular embodiment, a source of the waveform phenomena may be treated as stationary for purposes of estimating the covariance matrix. The estimated covariance matrix may be determined based on information regarding locations of the sensors of the sensor array. In a particular embodiment, the estimated covariance matrix converges with fewer snapshots than interferers.

In a particular embodiment, the estimated covariance matrix is determined as a combination of a first portion (e.g., a visible region) and a second portion (e.g., a virtual region). The first portion may correspond to one or more physically propagating waves of the waveform phenomena. The second portion may be associated with sensor noise. In this embodiment, the method may include determining an estimate of the sensor noise based at least partially on the second portion.

At 314, adaptive beamforming weights may be determined using the estimated covariance matrix. At 316, the adaptive beamforming weights may be applied to the sensed data to reconstruct a time-domain signal from the waveform phenomena. Thus, the covariance matrix may be determined in a manner that improves adaptive beamformer performance in terms of snapshot deficient operation, in terms of robustness against correlated signal and interference environments, and in terms of rate of convergence to a solution. Such performance improvements may be particularly beneficial for large aperture arrays employing large numbers of sensor elements when operating in non-stationary and multi-path environments.

Figure 4:
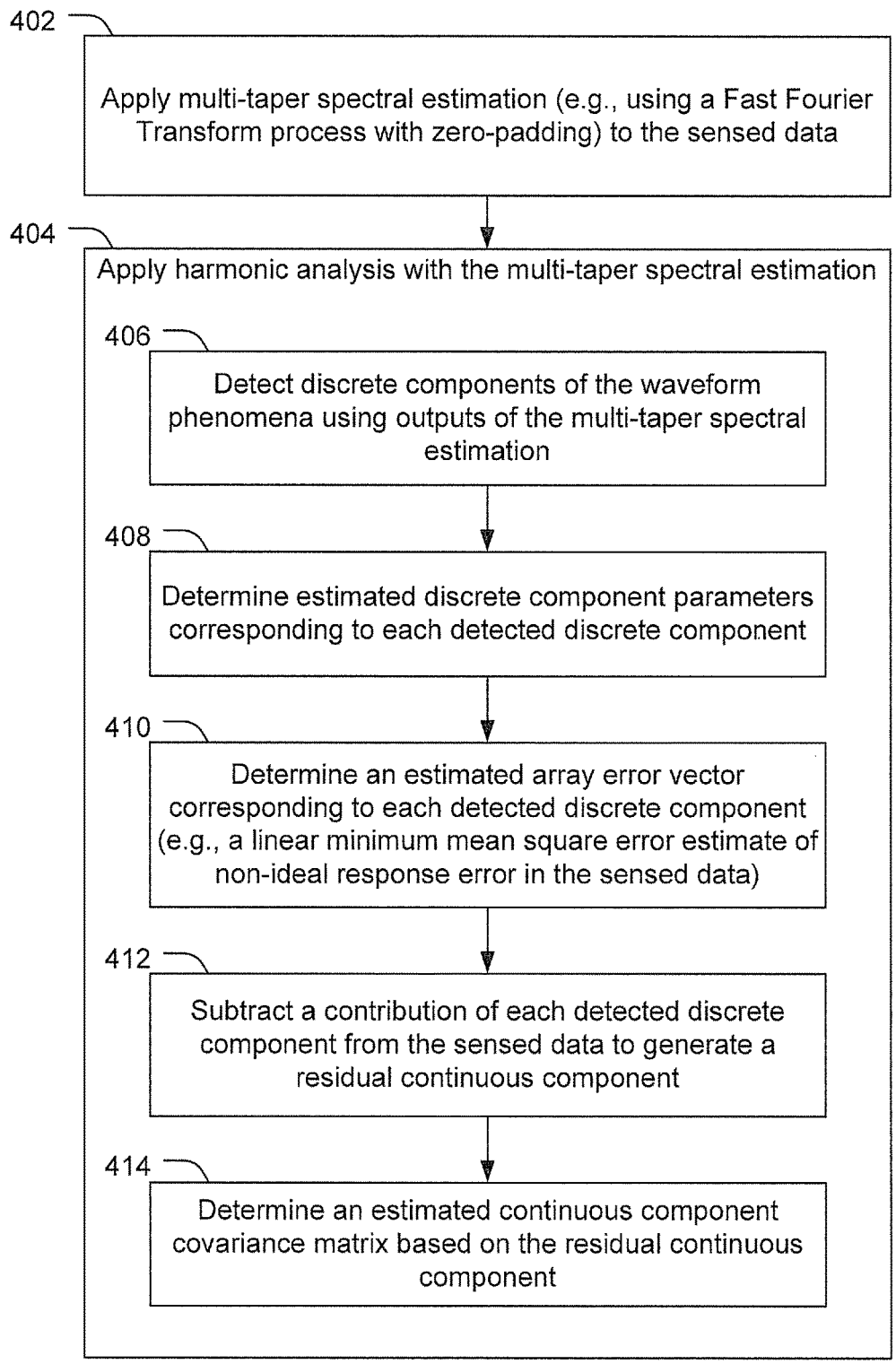
FIG. 4 is a flow diagram of a particular embodiment of a method of determining a covariance matrix using multi-taper spectral estimation with harmonic analysis.

FIG. 4 is a flow diagram of a particular embodiment of a method of determining a covariance matrix using multi-taper spectral estimation and with harmonic analysis. The method may be performed by an array processor, such as the array processor 102 of FIG. 1, or by another signal processing system. At 402, multi-taper spectral estimation may be applied to sensed data from a sensor array (such as the sensor array 110 of FIG. 1). Zero-padding may be used to increase sampling density of the estimated spatial spectrum. In a particular embodiment, a number of tapers used for the multi-taper spectral estimation is less than a number of the sensors of the sensor array.

At 404, harmonic analysis is applied with the multi-taper spectral estimation to detect and subtract discrete components from the sensed data. Applying the multi-taper spectral estimation with the harmonic analysis may include detecting discrete components of the waveform phenomena using outputs of the multi-taper spectral estimation, at 406. At 408, estimated discrete component parameters corresponding to each detected discrete component may be determined. At 410, an estimated array error vector corresponding to each detected discrete component may be determined. At 412, a contribution of each detected discrete component may be subtracted from the sensed data to generate a residual continuous component. For example, the estimated array error vector may correspond to a linear minimum mean square error estimate of non-ideal response error in the sensed data. At 414, an estimated continuous component covariance matrix may be determined based on the residual continuous component.

In a particular embodiment, the estimated covariance matrix is determined as a numeric combination of the estimated continuous component covariance matrix and an estimated discrete component covariance for each detected discrete component. In this embodiment, the estimated discrete component covariance for a particular detected discrete component is determined based on the estimated array error vector corresponding to the particular detected discrete component and based on the estimated parameters of the particular detected discrete component.

Figure 5:
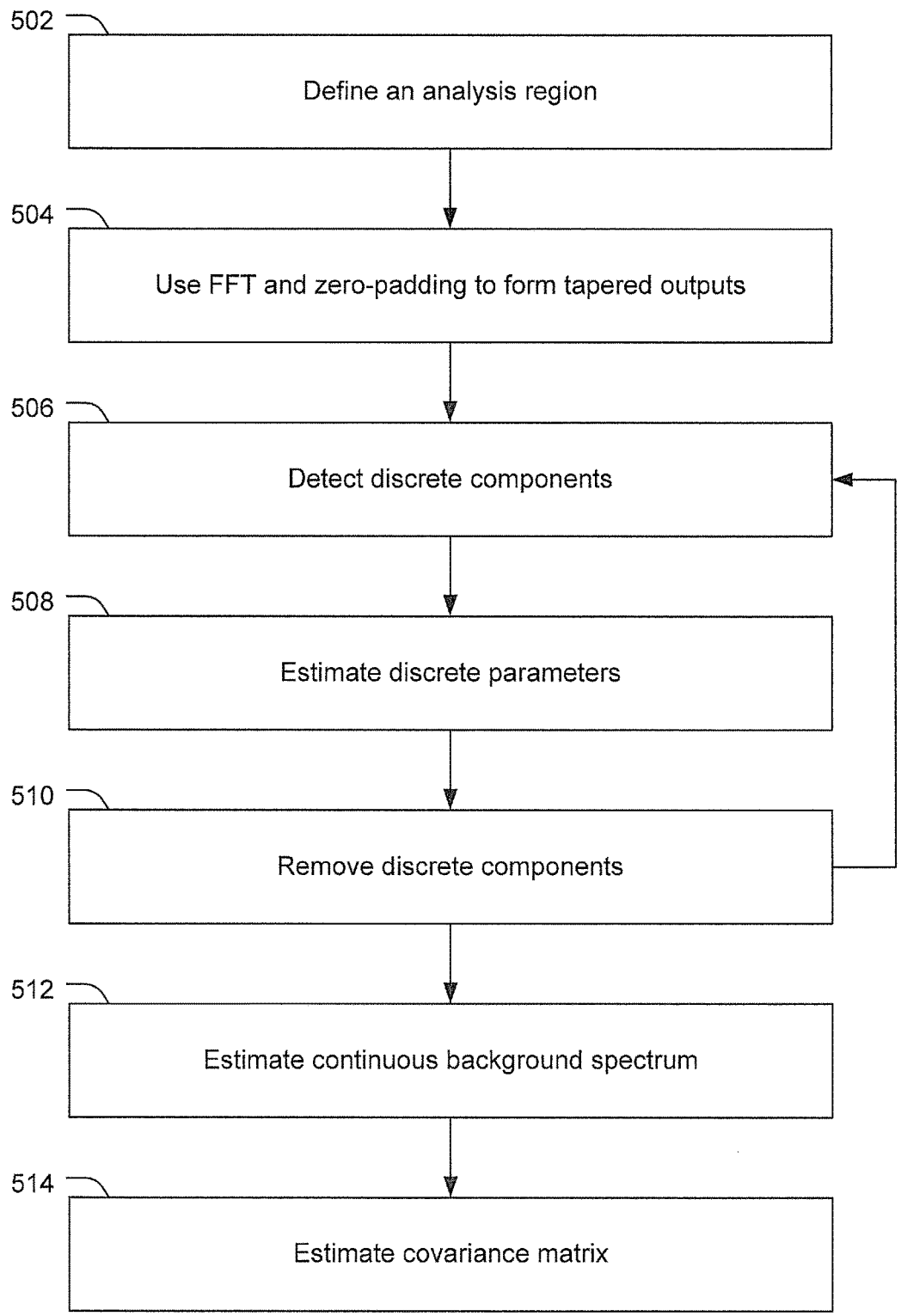
FIG. 5 is a flow diagram of a second particular embodiment of a method of signal processing.

FIG. 5 is a flow diagram of a second particular embodiment of a method of signal processing. The method may be performed by an array processor, such as the array processor 102 of FIG. 1, or by another signal processing system. In particular, the method of FIG. 5 describes a process to determine a covariance matrix from spatial spectrum using a multitaper spectral estimation technique. At 502, an analysis region may be defined. For example, defining the analysis region may include determining a number of tapers to be used for multitaper spectral estimation. At 504, a fast Fourier transform (FFT) process and zero-padding may be performed on sampled data from an array to form tapered outputs. Free parameter expansion may be used to facilitate forming the taper outputs. At 506, discrete components may be detected within the sampled data. Harmonic analysis may be used to detect the discrete components. The discrete components may be related to point source interference. At 508, discrete parameters, i.e., parameters of the discrete components (e.g., wavenumber, interference to noise ratio, etc.), may be estimated. At 510, the discrete components may be removed from the sample data, e.g., by subtracting contribution of the discrete components from the sample data. To illustrate, a coherent subtraction method or a null-projector method, as described further below, may be used to remove the discrete components. In a particular embodiment, the method may return to 506 to detect additional discrete components. Thus, the detection, estimation of parameters and removal of discrete components may be iterated.

At 512, a continuous background spectrum may be determined or estimated based on the sample data with discrete components removed. At 514, a covariance matrix may be estimated based on the continuous background spectrum.

Thus, a covariance matrix for a sensor array observing a stationary space-time process (also referred to herein as a waveform phenomena) may be determined based on individual sensor element locations, directional response and noise of those individual sensor elements, and a spatial spectrum of the space-time process. In a particular embodiment, the covariance matrix may have a particular structure that can be exploited, improving adaptive beamformer performance both in terms of snapshot deficient operation and robustness against correlated signal and interference environments. The description below provides additional detail regarding determination of a covariance matrix and determination of beamforming weights based on the covariance matrix.

Structured Covariance Techniques

Structured covariance methods incorporate some a priori knowledge of a problem space to add additional constraints to the problem. These constraints may include, for instance, a Toeplitz structure or block Toeplitz structure within the covariance matrix. The a priori knowledge may be based on established models, such as the space-time process observed being stationary, or the geometry of the array elements. These constraints reduce the number of unknown quantities to estimate or the size of the allowable solution space, and may convergence to a solution with very little data in some scenarios. Thus, they offer the potential for meaningful adaptive processor performance with lower snapshot requirements than sample covariance methods and their reduced rank derivatives. Structured covariance algorithms may be applied to both the snapshot deficient and correlated signal and interference problems.

Structured Covariance Based on Spatial Spectrum

An observed environment may be modeled as a spatially and temporally stationary space-time random process in many applications in array signal processing. This model of the space-time process can be described using a Cramér spectral representation theorem. This theorem provides a description of a random process as a sum of uncorrelated plane waves, distributed across a visible region of an array as a function of azimuth and elevation or across the visible region in a frequency-wavenumber domain. These domains are related to each other, and each properly describes the space-time process observed. A theory of second order characterizations of space-time random processes shows that either of these descriptions (or representations) can be related to the space-time covariance of the process at the output of the array. This is analogous to the relationship between power spectral density and auto-correlation in the case of time series analysis.

Because the space-time covariance can be related to either of these representations, embodiments disclosed herein consider estimating these spectral quantities first in order to compute the covariance at the output of the array. A process that uses estimated spectral quantities to estimate covariance is referred to herein as covariance from spatial spectrum (CSS).

A spectral representation model may include uncorrelated plane wave components. When encountering correlated signal and interference scenarios, processors may degrade in performance due to signal cancellation effects. Constraining the estimated covariance to a stationary model may reduce the contribution of the correlation within the estimated covariance matrix, mitigating signal cancellation. The stationary model may also impart a structure to the covariance matrix. Structured covariance matrix techniques may converge more rapidly than traditional sample covariance matrix techniques and derivative techniques. While there may be no simple closed form solution for a maximum likelihood (ML) estimate for a structured covariance for the general problem of an unknown number of signals in non-white noise, a naturally intuitive interpretation of the process in the azimuth-elevation or frequency-wavenumber domains may be used to address the problem.

Spectral representation theorem in the context of angle of arrival to the array considers the space-time process itself. Sensor noise may be modeled as an uncorrelated noise component within each sensor and may be a part of the covariance observed by an adaptive processor. CSS processing for uniform linear and regularly spaced array geometries may use power spectral estimation techniques and Fast-Fourier Transform (FFT) processing.

The impact of discrete, or point source interference and its spatial separation from the steering vector, $\underline{s}$, may degrade performance. Additional steps may be used to detect, estimate, and subtract this type of discrete component from available snapshot data prior to final covariance estimation. This allows operation with negligible normalized SINR loss under a large range of conditions. Multi-taper spectral estimation technique, such as Thomson's multi-taper spectral estimation as described in Thomson, D. J. "Spectrum estimation and harmonic analysis." In Proceedings of the IEEE, Volume 70 (1982), 1055-1096, which may combine the convenience of non-parametric spectral estimation algorithms and harmonic analysis techniques, work well in this application. Performance assessment of the final technique was performed through simulation of various interference and noise environments, with excellent normalized SINR loss performance obtained below an M=2K threshold for sample covariance type algorithms. Extensions to support arbitrary array geometry are disclosed.

A correlated signal and interference environment generally cannot be modeled as a stationary space-time process. The correlated components perturb the Toeplitz structure of the covariance matrix in the uniform linear array (ULA) case. The expected value of the estimated covariance for this problem, while constrained to an uncorrelated plane waves model, contains a bias term related to the original correlated data. Impact of this bias term is negligible as array length increases. Simulation to compare sample covariance based techniques and CSS techniques, using an effective SINR metric, demonstrated successful mitigation of signal cancellation effect in the CSS techniques. The CSS techniques mitigate the signal cancellation effect without loss in effective aperture, and provide the same low snapshot support requirements as the stationary space-time process case. The CSS techniques provide an increase in effective sample size, similar to redundancy averaging, while maintaining a positive definite covariance matrix estimate, and differ from CMT in their ability to mitigate the effects of correlated signal and interference in the data.

The CSS techniques are structured covariance techniques, which assume an ideal array manifold response. A real-world array manifold response may be non-ideal due to random variation in gain, phase, and directionality in the sensors. Non-ideal response may also result from deterministic positional errors, e.g., the bending experienced by an underwater towed array. Performance impact for both random and deterministic array manifold response errors was simulated. In a particular embodiment, the CSS techniques are extended to account for non-ideal response.

Notation

The following notational conventions are used herein. Italicized lower case letters (e.g., x) denote scalar variables, and x* is the complex conjugate of x. A vector of dimension P×1 is represented as a lowercase letter with a single underline (e.g., $\underline{k}$) and is complex or real-valued as indicated. The transpose of a vector $\underline{x}$ is denoted as $\underline{x}^T$, and $\underline{x}^H$ is the conjugate transpose of $\underline{x}$. The matrix of dimension P×Q is denoted with an underlined uppercase letter (e.g., $\underline{X}$) and is complex or real-valued as indicated. A compact notation is sometimes used to denote a matrix $\underline{X}=((x_{rc}))_{rc}$ and to indicate that the matrix $\underline{X}$ includes elements (rows, columns) which are individually denoted as $x_{rc}$. For example, this notation may be used to denote values when the values are a function of position indices, e.g., $\underline{x}=((\cos[\omega p]))_p$ is a vector of P elements including the values $[\cos(\omega), \cos(2\omega), \cos(3\omega)), \cdots]^T$. Similar notation may be used for vectors or higher dimensional matrices. The notation diag (x1, x2, •••) describes a diagonal matrix including entries $x_1$, $x_2$, ••• on the main diagonal.

The expectation operator is denoted as E {x}. When describing random variables, $$x \xrightarrow{d} fx(x),$$

indicates that the random variable x is distributed according to the probability density function fx (x). Gaussian random variables are denoted with specific notation for the appropriate density function. The P-variant Gaussian random variable, $\underline{x} \in R^P$, with mean $\underline{m}$=E {x} and covariance $\underline{R}_x$=E{($\underline{x}-\underline{m}$)($\underline{x}-\underline{m}$)$^T$} is represented using the notation $$x \xrightarrow{d} RN_P(\underline{m}, \underline{R}_x).$$

Similarly, a P-variant complex Gaussian random variable, $\underline{x} \in C^P$, with mean $\underline{m}$=E{$\underline{x}$} and covariance $\underline{R}_x$=E{($\underline{x}-\underline{m}$)($\underline{x}-\underline{m}$)$^H$} is represented using the notation $$x \xrightarrow{d} CN_P(\underline{m}, \underline{R}_x).$$

It is assumed that all complex Gaussian random variables are circularly symmetric of the type described by Goodman. The acronym i.i.d. stands for independent and identically distributed.

Data Models and Assumptions

For ease of description, it is assumed herein that a sensed or observed waveform phenomena (also referred to herein as an space-time process) is narrowband and propagates in a homogeneous medium with velocity c and temporal frequency $f=c/\lambda$. The space-time process is also assumed to include plane waves that are solutions to a homogeneous wave equation. This places a restriction on wavenumber $\underline{k}$ such that $|\underline{k}|=2\pi/\lambda$, or said another way, plane waves correspond to physically propagating angles of arrival to the sensor array. The space-time process may typically be considered to be spatially wide sense stationary (WSS) and zero mean. The spatially wide sense stationary property implies the spatial covariance is a function of difference in position only. Additional, for WSS, plane wave components making up the process are uncorrelated. This restriction is relaxed when dealing with the special condition of correlated signal and interference, as this special condition violates the spatially stationary model. Snapshots are assumed independent over a time index, m. Several formulations of narrowband bandwidth and sampling period may be used to reasonably support this assumption.

General Model

The general model of an N element array with arbitrary sensor positions subject to an incident plane wave is shown in FIG. 2. The nth element location, specified in Cartesian coordinates, is given as $\underline{p}_n=[x_n, y_n, z_n]^T$. Sensor array element outputs resulting from incident plane waves 202 are described by the array manifold response vector 216 as $\underline{v}=((v_n(\underline{u})))_n$. For an array of omni-directional sensors (such as the sensor array 110), under the narrowband assumption, the effect on a plane wave as it propagates across the array in space is approximated by a phase shift, and the array manifold response vector is $\underline{v}=((\exp(-j\underline{k}^T\underline{p}_n))_n=((\exp(j\,2\pi/\lambda\,\underline{u}^T\underline{p}_n))_n$. Each array element is sampled simultaneously at time index m to produce a snapshot, $\underline{x}_m \in C^N$, where the elements of the snapshot vector are the individual sensor outputs, $\underline{x}_m=((x_n(m)))_n$. There are M snapshots available for processing.

In the output of the sensor array observing a space-time process, a snapshot model may include three terms $$\underline{x}_m = \sum_{k=1}^{K} \underline{v}_k a_k(m) + \underline{n}_{b,m} + \underline{n}_{w,m} \quad (2.1)$$

Each of the individual terms is described below. The space-time process may include two types of sources. The first type corresponds to point sources in the environment. These arrive at the sensor array 110 as discrete plane waves 202. K such sources may exist. Each source has a given direction of arrival $\underline{u}_k$, with a corresponding array manifold response vector, $\underline{v}_k$ as well as a source amplitude at each sampling instant $a_k(m)$. Combining the array manifold responses, $\underline{V}=[\underline{v}_1, \underline{v}_2, \bullet\bullet\bullet, \underline{v}_K]$ and point source amplitudes $\underline{a}_m=((a_k(m)))_k$, Eqn. (2.1) can be written more succinctly as $$\underline{x}_m = \underline{V}\underline{a}_m + \underline{n}_{b,m} + \underline{n}_{w,m} \quad (2.2)$$

The discrete source amplitudes, $\underline{a}_m$, are assumed to be $$i.i.d.\ am \rightarrow CNK(0, \underline{R}a)\underline{a}_m \xrightarrow{d} CN_K(\underline{0}, \underline{R}_a).$$

This is a standard model for passive sonar reception of far field discrete sources. The point sources may be correlated with each other or not. Specifying this attribute is a distinguishing feature between models. For a spatially stationary space-time process, the sources are uncorrelated by definition and $\underline{R}_a=\text{diag}\,(\sigma_1^2, \sigma_2^2, \ldots \sigma_K^2)$.

The second component of the space-time process is the background or environmental noise. This noise is spread spatially and has a smooth, continuous distribution across some region of angle of arrival to the sensor array. The background noise at each snapshot, $$\underline{n}_{b,m},\text{ is i.i.d. }\underline{n}_{b,m} \xrightarrow{d} CN_N(\underline{0}, \underline{R}_b)$$

and is uncorrelated with the discrete components of the space-time process.

Each sensor 111-114 also produces an internal noise, which is uncorrelated with internal noise of the other sensors and is independent across snapshots. This noise is modeled as $$\underline{n}_{w,m} \xrightarrow{d} CN_N(\underline{0}, \sigma_w^2 I).$$

The sensor noise is uncorrelated with other components of the space-time process.

Because it is a linear combination of uncorrelated, zero mean, complex Gaussian random vectors, the snapshot $\underline{x}_m$ is a zero mean, complex Gaussian random vector. It is distributed as $$\underline{x}_m \xrightarrow{d} CN_N(\underline{0}, \underline{R}_x),\ \underline{R}_x = \underline{V}\underline{R}_a \underline{V}^H + \underline{R}_b + \sigma_w^2 I \quad (2.3)$$

Eqn. (2.3) is a model of general plane waves in non-white noise, and can represent line component, continuous, or mixed spectra type of processes.

Space-Time Random Processes

Second ($2^{nd}$) order characterizations of WSS space-time random processes may be used to develop linear array processors (such as the array processor 102 of FIG. 1). A second order characterization may provide a complete specification a WSS space-time random process for a class of Gaussian space-time processes. Under the assumptions stated above, the WSS space-time random process can be described as a sum of uncorrelated plane waves allocated according to a distribution across all angles of arrival to the sensor array.

Cramér spectral representation provides a description of a stochastic process in terms of an orthogonal process in a transform domain. The spectral representation can be used to develop the more familiar second order characterizations for the process and their relationships, rather than by stated definition. It may become clear from the spectral representation how a process may be characterized by one of the following: i) a smooth, continuous power spectral density, ii) a discrete (or line component) spectrum, or iii) a mixed spectrum, containing both smooth and line components. This formulation may be useful in developing techniques to deal with mixed spectrum when they are encountered, which may be beneficial for good adaptive beamformer performance.

Second Order Characterization of Space-Time Random Processes

A zero mean, WSS complex space-time process, $\{f(t, \underline{p})\}$, is defined for $-\infty<t<\infty$, and over some dimensionality of Cartesian space, $\square^C$, typically $\square^3$ so that $\underline{p}=[p_x, p_y, p_z]^T$. The following relationships define second order central moments of the process.

Second Order Characterizations

Space-time covariance between two points $\underline{\Delta p}=\underline{p}_1-\underline{p}_2$ and times $\tau=t_1-t_2$ is defined as $$R_f(\tau,\underline{\Delta p})=E\{f(t,\underline{p})f^*(t-\tau,\underline{p}-\underline{\Delta p})\} \quad (2.4)$$

The temporal frequency spectrum-spatial correlation function, also referred to as the cross spectral density, is related to $R_f(\tau, \underline{\Delta p})$ by a Fourier transform of a time lag variable.

$$S_f(\omega, \underline{\Delta p}) = \int_{-\infty}^{\infty} R_f(\tau, \underline{\Delta p})e^{-j\omega\tau}d\tau \quad (2.5)$$

The frequency-wavenumber spectrum is related to $S_f(\omega, \underline{\Delta p})$ by a Fourier transform of the Cartesian spatial coordinate $\underline{\Delta p}$, with note of the reverse sign convention of the complex exponential. The wavenumber vector $\underline{k}$ has dimension C similar to $\underline{\Delta p}$.

$$P_f(\omega, \underline{k}) = \int \ldots \int_{\square^C} S_f(\omega, \underline{\Delta p})e^{j\underline{k}^T\underline{\Delta p}}d\underline{\Delta p} \quad (2.6)$$

Because of the Fourier transform pair relationships, the following inverse transforms may also be used.

$$R_f(\tau, \underline{\Delta p}) = (2\pi)^{-1}\int_{-\infty}^{\infty} S_f(\omega, \underline{\Delta p})e^{j\omega\tau}d\omega \quad (2.7)$$

$$S_f(\omega, \underline{\Delta p}) = (2\pi)^{-C}\int \ldots \int_{\square^C} P_f(\omega, \underline{k})e^{-j\underline{k}^T\underline{\Delta p}}d\underline{k} \quad (2.8)$$

$$R_f(\tau, \underline{\Delta p}) = (2\pi)^{-1}(2\pi)^{-C}\int_{-\infty}^{\infty} e^{j\omega\tau}d\omega \int \ldots \int_{\square^C} P_f(\omega, \underline{k})e^{-j\underline{k}^T\underline{\Delta p}}d\underline{k} \quad (2.9)$$

These results may be specialized for the narrowband, independent snapshot model. For a narrowband or monochromatic process at $\omega_o$, $P_f(\omega, \underline{k})=P_f(\underline{k})\cdot 2\pi\delta(\omega-\omega_o)$. This simplifies the relationship between the covariance and frequency-wavenumber spectrum.

$$R_f(\tau, \underline{\Delta p}) = (2\pi)^{-C}e^{j\omega_0\tau}\int \ldots \int_{\square^C} P_f(\underline{k})e^{-j\underline{k}^T\underline{\Delta p}}d\underline{k} \quad (2.10)$$

Further, under the assumption of independent snapshots, the covariance is zero for $\tau\neq 0$, further simplifying the relationship to $$R_f(\underline{\Delta p}) \equiv R_f(0, \underline{\Delta p}) = (2\pi)^{-C}\int \ldots \int_{\square^C} P_f(\underline{k})e^{-j\underline{k}^T\underline{\Delta p}}d\underline{k} \quad (2.11)$$

This shows that the narrowband, independent snapshot problem is principally a spatial problem, the temporal related aspects are not considered.

Matrix Representation

Consider an N element array of omni-directional sensors at locations $\underline{p}_n$, n=1, 2, ... •••, observing a process represented as $\{f(t, \underline{p})\}$. The covariance matrix for the array outputs, ignoring sensor noise components, is a matrix including elements $$R_f=((R_f(\underline{p}_r-\underline{p}_c)))_{r,c} \quad (2.12)$$

which can be expressed in matrix form succinctly using the frequency-wavenumber spectrum and array manifold response vector, $\underline{v}(\underline{k})$.

$$R_f = (2\pi)^{-C}\int \ldots \int_{\square^C} P_f(\underline{k})\underline{v}(\underline{k})\underline{v}^H(\underline{k})d\underline{k} \quad (2.13)$$

Directional Distribution of Plane Waves

The space-time process may also be interpreted another way. The wavenumber restriction, $|\underline{k}|=2\pi/\lambda$, implies that plane waves observed by the array correspond to angles of arrival that may physically propagate to the array, i.e., $0\leq\theta\leq\pi$ and $0\leq\phi\leq 2\pi$ in spherical coordinates. The stationary space-time process in this case may be modeled as the sum of uncorrelated plane waves that are distributed according to a directional distribution, $G_f(\omega, \theta, \phi)$, across all angles of arrival to the array. $G_f(\omega, \theta, \phi)$ is similar to a probability density, and $$\frac{1}{4\pi}\int_0^\pi \int_0^{2\pi} G_f(\omega, \theta, \phi)\sin\theta d\theta d\phi = 1 \quad (2.14)$$

The covariance may be related to the directional distribution. Consider two sensors in the field at locations $\underline{p}+, \underline{p}_2$. Each sensor has a respective frequency and directional response, $H_i(\omega, \theta, \phi)$, i=1, 2. The difference in position, $\underline{\Delta p}=\underline{p}_1-\underline{p}_2$, can be described in Cartesian or spherical coordinates.

$$\underline{\Delta p} = \underline{p}1 - \underline{p}2 = \begin{cases} [\Delta p_x, \Delta p_y, \Delta p_z]^T \\ [s\sin\gamma\cos\zeta, s\sin\gamma\sin\zeta, s\cos\gamma]^T \end{cases} \quad (2.15)$$

The cross-spectral density between two sensors may be expressed in spherical coordinates as $$S_f(\omega, s, \gamma, \zeta) = \quad (2.16)$$
$$(4\pi)^{-1}S_f(\omega)\int_{-\pi}^{\pi}\int_0^{\pi} G_f(\omega, \theta, \phi)H_1(\omega, \theta, \phi)H_2(\omega, \theta, \phi) \times$$
$$\exp\left(j\frac{\omega s}{c}[\sin\theta\sin\gamma\cos(\phi-\zeta)+\cos\theta\cos\gamma]\right)\sin(\theta)d\theta d\phi$$

The function $S_f(\omega)$ in front of the integral translates the relative levels specified by the directional distribution, $G_f(\cdot)$, to the absolute levels observed at the array. The cross-spectral density and space-time covariance are a Fourier transform pair.

$$R_f(\tau, s, \gamma, \zeta) = \frac{1}{2\pi}\int_{-\infty}^{\infty} S_f(\omega, s, \gamma, \zeta)\exp(j\omega\tau)d\omega \quad (2.17)$$

For a narrowband process, $S_f(\omega, s, \gamma, \zeta)=S_f(s, \gamma, \zeta)\cdot 2\pi\delta(\omega-\omega_o)$. Computing the space-time covariance at $\tau=0$, the covariance and cross spectral density are seen to be the same.

$$R_f(0, s, \gamma, \zeta) = \frac{1}{2\pi} \int_{-\infty}^{\infty} S_f(s, \gamma, \zeta) \square 2\pi \delta(\omega - \omega_0) \exp(j\omega\tau) d\omega \quad (2.18)$$
$$= S_f(s, \gamma, \zeta)$$

Using Eqns. (2.16) and (2.18) with $H_i(\omega, \theta, \phi)=1$, $i=1, 2$, the covariance, $R_f(s, \gamma, \zeta)$ between two omnidirectional sensors in a given noise field, $G_f(\omega, \theta, \phi)$, can be found. This is particularly convenient if the noise field has a known form that can be conveniently represented in spherical or cylindrical harmonics. The covariance matrix for an array of sensors is populated by values of this function, where $\underline{\Delta p} = \underline{p}_r - \underline{p}_c$.

$$\underline{R}_f = ((R_f(s, \gamma, \zeta)))_{r,c} \quad (2.19)$$

Spectral Representation

Spectral representation theorem for stationary random processes, e.g., Cramér spectral representation, provides a mechanism for describing the properties of a WSS temporal or space-time random process in the respective transform domain, e.g., frequency or frequency-wavenumber. With this representation, the quantities of interest for a physically generated process have intuitive interpretation and representation. For example, distribution of power may be related to the space-time random process as a function of frequency (temporal or spatial). Definitions and a description of properties of spectral representation are provided below. The discussion below also explains how spectral representation can be used to develop the relationships between the more common second order moment characterizations of random processes. The spectral representation and its properties for a continuous time random process are introduced, followed by a discussion of properties for a discrete time random process. Extensions for WSS space-time random processes, in light of model assumptions, follows. In the following discussion, $\Omega$ denotes a continuous time frequency variable (in radians/sec) and $\omega$ denotes a discrete time frequency variable (in radians/sample).

Continuous Time

Let $\{f(t)\}$ be a zero mean, complex-valued stationary random process defined over time $-\infty < t < \infty$. Additionally, let $\{f(t)\}$ be stochastically continuous, a mild regularity condition that holds when the autocorrelation function, $R(\tau)$, is continuous at the origin. Then by the Cramér spectral representation theorem, there exists an orthogonal process, $\{Z(\Omega)\}$, such that for all t, a realization of the process, f(t), can be expressed as $$f(t) = \int_{-\infty}^{\infty} e^{j\Omega t} dZ(\Omega) \quad (2.20)$$

where equality is in the mean square sense and Eqn. (2.20) is a Riemann-Stieljes integral. The orthogonal process is zero mean $$E\{dZ(\Omega)\} = 0 \quad (2.21)$$

and its corresponding covariance $$E\{dZ(\Omega_1)dZ^*(\Omega_2)\} = \begin{cases} 0 & \Omega_1 \neq \Omega_2 \\ dS^{(I)}(\Omega_1) & \Omega_1 = \Omega_2 \end{cases} \quad (2.22)$$

implies that disjoint frequencies are uncorrelated. The function $S^{(I)}(\Omega)$, known as the integrated spectrum of $\{f(t)\}$, is a bounded, non-decreasing function. If $S^{(I)}(\Omega)$ is differentiable, then:

$$\frac{dS^{(I)}(\Omega)}{d\Omega} = S(\Omega) \quad (2.23)$$

and the covariance then becomes $$E\{dZ(\Omega)dZ^*(\Omega)\} = S(\Omega)d\Omega \quad (2.24)$$

The function $S(\Omega)$ is referred to as the power spectral density function. The integrated spectrum $S^{(I)}(\Omega)$ plays a role similar to a random variable cumulative distribution function, and many of the results for distribution functions may be applied to it. In analog to the Lebesgue decomposition theorem for distribution functions, the integrated spectrum can be written as including three components $$S^{(I)}(\Omega) = S_1^{(I)}(\Omega) + S_2^{(I)}(\Omega) + S_3^{(I)} \quad (2.25)$$

$S^{(I)}(\Omega)$ is continuous, meaning its derivative exists for almost all $\Omega$ such that $S^{(I)}(\Omega) = \int_{-\infty}^{\Omega} S(\Omega')d\Omega'$. A process with an integrated spectrum with only this term, $S^{(I)}(\Omega) = S_1^{(I)}(\Omega)$, has a smooth background spectral component. White or colored noise processes (AR, MA, ARMA) are of this type, which is referred to herein as a process with a purely continuous spectrum.

$S_2^{(I)}(\Omega)$ is a step function with jumps of size $p_l$ at frequencies $\Omega_l$, $l=1, 2, \ldots$. A process with an integrated spectrum with only this term, $S^{(I)}(\Omega) = S_2^{(I)}(\Omega)$, has a purely discrete spectrum or line spectrum. A harmonic random process, $$\{f(t)\} = \sum_{l=1}^{K} A_l e^{j\Theta_l} e^{j\Omega_l t},$$

where $\Theta_l$ is uniform $[-\pi, \pi]$ and $A_l$ is a real-valued random variable, has this type of spectrum.

$S_3^{(I)}(\Omega)$ is a continuous singular function. This type of pathologic function is not of practical use for spectral estimation, and may be assumed to be identically equal to 0 herein.

From this classification of spectra, and the decomposition described by Eqn. (2.25), three types of stationary random processes may be encountered. First, those with a purely continuous spectrum. Second those with a purely discrete spectrum. And last, those which are a combination of both types, referred to herein as a mixed spectrum processes.

The autocorrelation function, $R(\tau)$, and power spectral density, $S(\Omega)$, of the process can be related through the spectral representation and the properties of the orthogonal process. Starting with the definition of the autocorrelation function $$R(\tau) = E\{f(t)f^*(t-\tau)\} \quad (2.26)$$

and replace f(t) with its spectral representation from Eqn. (2.20)

$$R(\tau) = \int_{-\infty}^{\infty} e^{j\Omega_1 t} \int_{-\infty}^{\infty} e^{j\Omega_2(\tau-t)} E\{dZ(\Omega_1)dZ^*(\Omega_2)\} \quad (2.27)$$

Using the uncorrelated property of the covariance at disjoint frequencies from Eqn. (2.22), Eqn. (2.27) simplifies to $$R(\tau) = \int_{-\infty}^{\infty} e^{j\Omega\tau} dS^{(I)}(\Omega) = \int_{-\infty}^{\infty} S(\Omega) e^{j\Omega\tau} d\Omega \qquad (2.28)$$

where the result of the last integral assumes $S^{(I)}(\Omega)$ is differentiable. Because R ($\tau$) is an integrable, deterministic function, Eqn. (2.28) indicates that R ($\tau$) and S ($\Omega$) form a Fourier transform pair, such that $$S(\Omega) = \frac{1}{2\pi} \int_{-\infty}^{\infty} R(\tau) e^{-j\Omega\tau} d\tau \qquad (2.29)$$

Discrete Time

The spectral representation also applies to discrete time random processes, {f [n] }, with modifications explained below. Given a stationary, discrete time random process, {f [n] }-∞<n<∞, a realization the process, f [n], has spectral representation using the orthogonal process, {Z ($\omega$)}, given by $$f[n] = \int_{-\pi}^{\pi} e^{j\omega n} dZ(\omega) \qquad (2.30)$$

where equality is in the mean square sense. The limits of integration are restricted to ±$\pi$ to reflect the unambiguous range of the discrete time frequency. The orthogonal process is zero mean, E {dZ ($\omega$)}=0, with covariance $$E\{dZ(\omega_1)dZ^*(\omega_2)\} = \begin{cases} 0 & \omega_1 \neq \omega_2 \\ dS^{(I)}(\omega) & \omega_1 = \omega_2 \end{cases} \qquad (2.31)$$

where the bounded, non-decreasing function $S^{(I)}(\omega)$ is the integrated spectrum of {f[n]}. The covariance implies disjoint frequencies are uncorrelated. If $S^{(I)}(\omega)$ is differentiable, then:

$$\frac{dS^{(I)}(\omega)}{d\omega} = S(\omega) \qquad (2.32)$$

and the covariance of the increments becomes $$E\{dZ(\omega)dZ^*(\omega)\} = S(\omega)d\omega \qquad (2.33)$$

The function S ($\omega$) is referred to as the power spectral density function. Following the same procedure as in the continuous time case, the autocorrelation, R [l]=E {x (n) x*(n-1)} and integrated spectrum are related via the spectral representation by $$R[l] = \int_{-\pi}^{\pi} e^{j\omega l} dS^{(I)}(\omega) = \int_{-\pi}^{\pi} S(\omega) e^{j\omega l} d\omega \qquad (2.34)$$

where the final expression assumes $S^{(I)}(\omega)$ is differentiable. The power spectral density and autocorrelation form a Fourier transform pair such that $$S(\omega) = \frac{1}{2\pi} \int_{l=-\infty}^{\infty} R[l] e^{-j\omega l} \qquad (2.35)$$

where equality is in the mean square sense.

Sampling and Aliasing

A sampled WSS continuous time random process $\{f_c(t)\}$, $-\infty<t<\infty$, with uniform sampling period T, produces a WSS discrete random process $\{f_d[n]\}$, $-\infty<n<\infty$. The subscripts c and d are used to reinforce the distinction between the continuous and discrete time domains. As a stationary discrete time random process, $f_d[n]$=fc ($t_0$+nT) has a spectral representation $$f_d[n] = \frac{1}{2\pi} \int_{-\pi}^{\pi} e^{j\omega n} dZ_d(\omega) \qquad (2.36)$$

where the orthogonal process $\{Z_d(\omega)\}$ has the spectral representation properties described above. The autocorrelation and power spectral density form a Fourier transform pair.

$$R_d[l] = \int_{-\pi}^{\pi} S_d(\omega) e^{j\omega l} d\omega, \, Sd(\omega) = \frac{1}{2\pi} \int_{l=-\infty}^{\infty} R_d[l] e^{-j\omega l} \qquad (2.37)$$

The discrete time process second order characterizations, $R_d$ [l] and $S_d$ ($\omega$), may be related to the continuous time counterparts, $R_c(\tau)$ and $S_c$ ($\Omega$). The discrete time autocorrelation function samples its continuous time counterpart. This follows directly from its definition $$R_d[l] = E\{x_d[n]x_d^*[n-l]\} \qquad (2.38)$$
$$= E\{x_c(t_0 + nT)x_c^*(t_0 + nT - lT)\}$$
$$= R_c(lT)$$

Two approaches may be taken to determine the form of the discrete time process power spectral density. The first considers both $R_c$ ($\tau$) and $S_c$ ($\Omega$) as deterministic functions, and utilizes the properties of the Fourier transform and the continuous time sampling indicated in Eqn. (2.38) to arrive at $$S_d(\omega) = \frac{1}{T} \sum_{\beta=-\infty}^{\infty} S_c\left(\frac{\omega - 2\pi\beta}{T}\right), \, |\omega| \leq \pi \qquad (2.39)$$

The second approach utilizes the spectral representation directly to arrive at the same result.

The relationship in Eqn. (2.39) can be used to determine parameters for the sampling period, T, such that the resultant discrete spectrum is an accurate representation of the underlying continuous spectrum, i.e., the Nyquist sampling criteria. However, consider an alternate interpretation of Eqn. (2.39). Even if the Nyquist sampling criteria is not met, using an estimate of the discrete spectrum, although it may be an aliased version of the true spectrum, it is possible to determine correct values for the covariance at the sample points indicated by Eqn. (2.38). This may be insufficient to completely reconstruct the underlying spectrum, but it enables estimation of covariance matrix values for adaptive processing.

In practice a finite number of samples are available for processing. This is the effect of a finite duration observation window and has a direct impact on the ability to estimate the discrete spectrum, which may be addressed via formulation of a multitaper spectral estimator, as explained below.

These concepts may be applied directly to uniform linear array processing problems. For regular arrays, such as arrays based on a multiple of a fixed spacing (e.g., minimum redundancy arrays), additional complexity is introduced due to the impact of the equivalent windowing function on the ability to estimate the discrete spectrum. Arbitrary array design may also have this issue. Additionally, arbitrary array design may add potentially unusual spectral combinations due to the non-uniform spacing compared to the uniform structure described by Eqn. (2.39).

Continuous Space-Time

The spectral representation extends to the case of a spatially and temporally stationary multidimensional random process, $\{f(t, \underline{p})\}$. Given a realization of the process, $f(t, \underline{p})$, there exists an orthogonal process, $\{Z(\omega, \underline{k})\}$, such that for all $t, \underline{p}$ $$f(t, \underline{p}) = \int_{-\infty}^{\infty} \cdots \int_{-\infty}^{\infty} e^{j(\omega t - \underline{k}^T \underline{p})} dZ(\omega, \underline{k}) \quad (2.40)$$

The orthogonal process, $\{Z(\omega, \underline{k})\}$, is zero mean $E\{dZ(\omega, \underline{k})\}=0$, and uncorrelated across disjoint frequency-wavenumber bands.

$$E\{dZ(\omega_1, \underline{k}_2)dZ^*(\omega_3, \underline{k}_4)\} = \quad (2.41)$$
$$\begin{cases} 0 & (\omega_1, \underline{k}_2) \cap (\omega_3, \underline{k}_4) = 0 \\ P(\omega, \underline{k}) d\omega d\underline{k} & \omega_1 = \omega_2, \underline{k}_2 = \underline{k}_4 \end{cases}$$

where it is assumed that the integrated frequency-wavenumber spectrum, $P_x^{(I)}(\omega, \underline{k})$, is differentiable.

The relationships between covariance, cross spectral density, and frequency-wavenumber spectrum may be derived from the multidimensional spectral representation in Eqn. (2.40).

Directional Distribution of Plane Waves

As an alternative to the frequency-wavenumber domain in Eqn. (2.40), one may define the orthogonal process across all angles of arrival on a sphere.

$$dZ(\omega_0, \underline{p}) = \frac{1}{4\pi} \int_0^\pi \sin\theta d\theta \int_0^{2\pi} e^{-jk_0 \underline{a}_r^T(\theta,\phi)\underline{p}} dZ(\omega_0, \theta, \phi) \quad (2.42)$$

where $$f(t, \underline{p}) = \int_{-\infty}^{\infty} e^{j\omega t} dZ(\omega_0, \underline{p}) \quad (2.43)$$

where $k_0 = 2\pi/\lambda$, and $\underline{a}_r(\theta, \phi)$ is a unit vector in the radial direction. The orthogonal process, $\{dZ(\omega_0, \theta, \phi)\}$, defines an integrated spectrum, $S(\omega) G^{(I)}(\omega, \theta, \phi)$, where $G(\cdot)$ is used to be consistent with the discussion above of the second order characterization of space-time random processes. The function $S(\omega)$ scales the relative levels defined in $G(\cdot)$ to the absolute levels seen at the array. Assuming $G^{(I)}(\omega, \theta, \phi)$ is differentiable $$E\{dZ(\omega_1, \theta_1, \phi_1)dZ^*(\omega_2, \theta_2, \phi_2)\} = \quad (2.44)$$
$$\begin{cases} 0 & \theta_1 \neq \theta_2, \phi_1 \neq \phi_2, \omega_1 \neq \omega_2 \\ S(\omega)G(\omega, \theta, \phi)\frac{2\pi}{\sin\theta}d\omega & \theta_1 = \theta_2, \phi_1 = \phi_2, \omega_1 = \omega_2 \end{cases}$$

The cross spectral density is defined by $$E\{dZ(\omega_0, \underline{p})dZ^*(\omega_0, \underline{p} - \Delta\underline{p})\} = S_f(\omega_0, \Delta\underline{p})\frac{d\omega}{2\pi} \quad (2.45)$$

Relating Eqn. (2.45) to Eqn. (2.42), and using Eqn. (2.44):

$$S_f(\omega_0, \Delta\underline{p}) = \frac{1}{4\pi} S(\omega) \int_{-\pi}^{\pi} \int_0^\pi G_f(\omega, \theta, \phi) e^{-jk_0 \underline{a}_r^T(\theta,\phi)\Delta\underline{p}} \sin(\theta) d\theta d\phi \quad (2.46)$$

One may compare Eqn. (2.46) to the earlier expression in Eqn. (2.16), which also included directional response of the individual sensor elements and expanded the $\underline{a}_r^T \Delta\underline{p}$ terms in spherical coordinates. By defining the directional distribution, $G_f(\omega, \theta, \phi)$, and requiring disjoint regions in angle space to be uncorrelated Eqn. (2.44) this shows how the spectral representation underlies the model of the stationary space-time process as the sum of uncorrelated plane waves distributed over all directions of arrival to the array.

Optimal Beamforming

The following discussion reviews optimal beamforming techniques given observation of the interference and noise environment, and the related problem when the desired signal is also present in the data. Normalized signal to interference and noise ratio (SINR) loss metric is a measure of the decrease in output SINR of an implemented beamformer compared to an optimal processor. The normalized SINR loss metric may be used to assess the performance of a given adaptive beamforming algorithm. This metric and its application are described below.

Minimum Variance Distortionless Response (MVDR)

Given a series of snapshots, $\underline{x}_m \in \mathbb{C}^N$ with $E\{\underline{x}_m \underline{x}_m^H\}=\underline{R}_x$, an adaptive processor may use a weighted linear combination of the sensor outputs to produce a scalar output signal $$y_m = \underline{w}^H \underline{x}_m \quad (2.47)$$

The processor should pass the desired direction of arrival, specified by steering vector $\underline{s}$, undistorted. This constraint may be expressed as $$\underline{w}^H \underline{s} = 1 \quad (2.48)$$

Expected output power of the processor is $$E\{|y_m|^2\} = E\{|\underline{w}^H \underline{x}_m|^2\} = \underline{w}^H \underline{R}_x \underline{w} \quad (2.49)$$

The design criteria is to minimize the expected output power, subject to the distortionless constraint. This design criteria is the same as maximizing the output SINR. The optimization problem is then $$\arg\min_{\underline{w}} \underline{w}^H \underline{R}_x \underline{w} \text{ s.t. } \underline{w}^H \underline{s} = 1 \quad (2.50)$$

Using the method of Lagrange multipliers, the constrained cost function to be minimized is then $$J(\underline{w}) = \underline{w}^H \underline{R}_x \underline{w} + \lambda(\underline{w}^H \underline{s} - 1) + \lambda^*(\underline{s}^H \underline{w} - 1) \quad (2.51)$$

The cost function is quadratic in $\underline{w}$. Taking the complex gradient with respect to $\underline{w}$, and setting to zero $$\frac{\partial J(\underline{w})}{\partial \underline{w}^*} = \underline{R}_x \underline{w} + \lambda \underline{s} = 0 \mid_{\underline{w}=\underline{w}_{opt}} \quad (2.52)$$

the optimal set of weights is $$\underline{w}_{opt} = -\lambda \underline{R}_x^{-1} \underline{s} \quad (2.53)$$

Using Eqn. (2.53) in Eqn. (2.48) to solve for the Lagrange multiplier, gives $\lambda = -(\underline{s}^H \underline{R}_x \underline{s})^{-1}$, and combining the two produces the final weight vector $$\underline{w}_{opt} = \frac{\underline{R}_x^{-1} \underline{s}}{\underline{s}^H \underline{R}_x^{-1} \underline{s}} \quad (2.54)$$

When snapshot data used to estimate $\underline{R}_x$ contains only a noise and interference environment, this processor is referred to as a minimum variance distortionless response (MVDR). In the event the desired signal is also present in the snapshot data, the same solution for the weight vector results; however, such a solution is sometimes referred to as a minimum power distortionless response (MPDR) to indicate the difference in the observed data. In practice, the distinction makes a significant difference in terms of the required snapshot support to achieve good performance.

Normalized SINR Loss

For cases involving uncorrelated signal and interference, a standard metric for performance of an adaptive beamformer is degradation in the output signal to interferer and noise ratio (SINR) compared to that obtainable with an optimal processor. The normalized SINR loss, $\xi$, is defined as $$\xi = \frac{SINR_a}{SINR_o} \quad (2.55)$$

The subscript o designates true quantities or optimal values, while the subscript a designates the actual or estimated values. For convenience, normalized SINR loss can be expressed on a dB scale, as $\xi_{dB} = -10 \log_{10}(\xi)$. In this way, $\xi_{dB}=1$ implies an output SINR that is 1 dB lower than obtainable by an optimal processor. For the optimal processor, SINR is computed as $$SINR_o = \frac{|\underline{w}_o^H \underline{s}|^2}{\underline{w}_o^H \underline{R}_o \underline{w}_o} \quad (2.56)$$

while for an implemented processor, SINR may be computed as $$SINR_a = \frac{|\underline{w}_a^H \underline{s}|^2}{\underline{w}_a^H \underline{R}_o \underline{w}_a} \quad (2.57)$$

The general expression for $\xi$, not assuming a particular form for the weights, is therefore $$\xi = \frac{|\underline{w}_a^H \underline{s}|^2}{\underline{w}_a^H \underline{R}_o \underline{w}_a} \Box \frac{\underline{w}_o^H \underline{R}_o \underline{w}_o}{|\underline{w}_o^H \underline{s}|^2} \quad (2.58)$$

For an adaptive beamformer with weights designed using the minimum variance distortionless response (MVDR) criteria, using Eqn. (2.54) in Eqn. (2.56), the SINR for the optimal processor is $$SINR_o = \underline{s}^H \underline{R}_o^{-1} \underline{s} \quad (2.59)$$

while using Eqn. (2.54) in Eqn. (2.57) yields the SINR for an implemented processor $$SINR_a = \frac{(\underline{s}^H \underline{R}_a^{-1} \underline{s})(\underline{s}^H \underline{R}_a^{-1} \underline{s})}{\underline{s}^H \underline{R}_a^{-1} \underline{R}_0 \underline{R}_a^{-1} \underline{s}} \quad (2.60)$$

Using Eqn. (2.59) and Eqn. (2.60) in Eqn. (2.55), the expression for $\xi$ becomes $$\xi = \frac{\underline{s}^H \underline{R}_a^{-1} \underline{s}}{\underline{s}^H \underline{R}_o^{-1} \underline{s}} \Box \frac{\underline{s}^H \underline{R}_a^{-1} \underline{s}}{\underline{s}^H \underline{R}_a^{-1} \underline{R}_0 \underline{R}_a^{-1} \underline{s}} \quad (2.61)$$

Eqn. (2.61) is a general expression for $\xi$ when beamformer weights are found via MVDR, but it does not give any insight into performance as it relates to the quantities estimated for the underlying model. The matrix inverse operations also make it difficult to follow directly how model parameters influence the performance, except under some simplifying assumptions.

Spectral Estimation Techniques

In a particular embodiment, covariance for adaptive beamforming is estimated by first estimating the spatial or wavenumber spectrum. Thus, techniques that require an estimate of the covariance a priori, such as Capon's MVDR or MUSIC, are not usable for this purpose. Two main techniques for spectral estimation based upon the data are described: windowed, averaged periodogram (a non-parametric technique) and multitaper spectral estimation.

Classical (Nonparametric) Spectral Estimation

A windowed, averaged periodogram is a technique for spectral estimation for uniform sampled data series. By applying a predetermined fixed window function or taper, $\underline{w}=((w[n]))_n$, to the data, the behavior of the spectral estimate can be controlled with regard to frequency resolution and spectral leakage, e.g., sidelobe suppression. These quantities may be traded off against each other.

For simplicity, a single dimension time series or uniform linear array processing may be assumed. For either the time series or array processing problem the procedure is identical once the snapshots have been established. Time series processing may consider a contiguous collection of $N_{TOTAL}$ samples. This collection may then be subdivided into M snapshots of N samples each. Within the time series, the snapshots may be specified such that there is overlap of samples between adjacent snapshots. For the array processing application, each snapshot represents the simultaneous sampling of each of the N array elements. In either application, once obtained, each snapshot, $\underline{x}_m$, is multiplied element-by-element with the windowing function, w [n].

$$\underline{y}_m = ((x_n[n]w[n]))_n = \underline{x}_m \Box \underline{w} \quad (2.62)$$

where ⊙ is the element-by-element or Hadamard product. This windowed snapshot data may then be Fourier transformed, e.g., using efficient fast Fourier transform (FFT) algorithms $$Y_m[l] = \sum_{n=0}^{N-1} y_m[n]\exp\left(-j\frac{2\pi ln}{N_{FFT}}\right), l = 0, 1, \ldots, L-1 \quad (2.63)$$

A value of $N_{FFT}$ may be selected to more finely sample the underlying spectrum, e.g., zero-padding, but the fundamental "resolution" of the transform is constant based on the amount of available samples, N. A final estimated spectrum is the average, magnitude squared of the outputs of Eqn. (2.63):

$$\hat{P}[l] = \frac{1}{M}\sum_{m=1}^{M}|Y_m[l]|^2 \quad (2.64)$$

The frequency domain may be referred to as the transform domain of the time series, although for array processing the wavenumber is the spatial frequency, and once normalized by their respective sample period or sensor separation the two are equivalent. The averaged, modified periodogram processing shown here using the FFT provides a fixed resolution and sidelobe (leakage) performance across the frequency domain, based on the characteristics of the selected window. The array problem encounters the non-linear mapping between physical angle of arrival and wavenumber. If a fixed response across angle space is desired, the window function becomes a function of angle of arrival, or $\underline{w}_l = ((w_l[n]))_n$, such that Eqn. (2.63) becomes $$Y_m[l] = \sum_{n=0}^{N-1} w_l[n]x_m[n]\exp\left(-j\frac{2\pi ln}{N_{FFT}}\right), l = 0, 1, \ldots, N_{FFT}-1 \quad (2.65)$$

Multitaper Spectral Estimation (MTSE)

A multitaper algorithm formulates the spectral estimation problem as one of estimating second order moments of a spectral representation of a process. The following discussion considers uniform sampled time series. Application of the method to uniform linear array processing in wavenumber space is immediate. For arbitrary array geometries or operation in angle space, the concepts are the same though a specialized multitaper design may be used and processing may be more computationally intensive.

Spectral Estimation

In the following discussion the temporal "centering" term, $e^{j(N-1)/2}$, has been omitted to simplify the discussion, and relationships are shown for M>1 available snapshots. Given a stationary discrete random process, $\{x[n]\}$, $-\infty<n<\infty$, a realization of the process, x [n], may have a spectral representation $$x[n] = \int_{-1/2}^{1/2} e^{j2\pi fn} dZ(f) \quad (2.66)$$

where the covariance of the orthogonal increment process defines the power spectral density.

$$E\{dZ(f)dZ^*(f)\} = S(f)df \quad (2.67)$$

The problem of spectral estimation is to estimate the covariance of this process. However, dZ (f) is not observable directly from the available, limited samples x [n], 0≤n<N. While the impact of this data limiting operation (or projection onto a finite number of samples) is obvious in the time domain, its effect on the spectral representation of the process is less immediate. Taking the Fourier transform of the samples $$y(f) = \sum_{n=0}^{N-1} x[n]e^{-j2\pi fn} \quad (2.68)$$

and inserting Eqn. (2.66) into Eqn. (2.68) gives what may be referred to as the fundamental equation of spectral estimation $$y(f) = \int_{-1/2}^{1/2} \frac{\sin N\pi(f-v)}{\sin\pi(f-v)} dZ(v) \quad (2.69)$$

This result is a linear Fredholm integral equation of the first kind, and cannot be solved explicitly for dZ (v). This is in line with the inability to reconstruct the entire realization of the process, x [n], $-\infty<n<\infty$, from the limited sample observation. Eqn. (2.69) can be solved approximately, for a local region $(f_o-W, f_o+W)$ using an eigenfunction expansion of the kernel $$\frac{\sin N\pi(v)}{\sin\pi(v)}$$

and a local least squares error criterion. The eigenfunction equation is given by $$\lambda_d(N, W)Q_d(N, W, f) = \int_{-W}^{W} \frac{\sin N\pi(v)}{\sin\pi(v)} Q_d(N, W, v) \quad (2.70)$$

where 0<W<½ is a design choice and N is the number of available samples. There are N solutions to Eqn. (2.70), indexed by the subscript d. The eigenvalues, $0<\lambda_d(N, W)<1$, give a measure of the concentration of the eigenfunction $Q_d$ (N, W, f) within a desired region, [−W, W]. For this particular problem, the solutions to Eqn. (2.70) are known. The $Q_d$ (N, W, f) are the discrete prolate spheroidal wave functions (DPSWF), which are related to $q_d$ (N, W, n), the discrete prolate spheroidal sequences (DPSS) by a Fourier transform $$Q_d(N, W, f) = \varepsilon_d \int_{n=0}^{N-1} q_d(N, W, n)e^{-j2\pi fn} \quad (2.71)$$

where $\epsilon_d$=1 for d even, j for d odd. These sequences are also known as the Slepian sequences. There are approximately 2 NW significant eigenvalues for these functions. Defining the Fourier transform of the windowed samples, $y_m^{(d)}(f)$, as the $d^{th}$ eigencoefficients of the data $$y_m^{(d)}(f) = \sum_{n=0}^{N-1} \frac{1}{\varepsilon_d} q_d(N, W, n)x_m[n]e^{-j2\pi fn} \quad (2.72)$$

The $d^{th}$ eigenspectra, $\hat{S}_d(f)$ may be is computed by averaging the magnitude squared of $y_m^{(d)}(f)$ over all snapshots $$\hat{S}_d(f) = \frac{1}{M} \sum_{m=1}^{M} |y_m^{(d)}(f)|^2 \qquad (2.73)$$

Due to the orthogonality of $Q_d$ (N, W, f) over the interval [−W, W], for locally near flat spectra the eigenspectra are approximately uncorrelated. By averaging them, the overall variance of the final estimate is improved. Before considering a method for combining the eigenspectra, one might be interested to use all N available eigenfunctions to improve the variance by increased averaging, but this is not recommended.

Looking at Multiple Tapers

To develop a better understanding of the difference between using a multitaper technique and a single taper classical technique, a simple example may be considered. For this example, consider three approaches to estimating the spectrum using a windowed technique. Averaging multiple, uncorrelated estimates improves estimation accuracy. This can be accomplished using non-overlapping Hann windows. Alternatively, a multitaper design uses overlapping but orthogonal windows. Both achieve improvement due to averaging uncorrelated estimates, but one would expect the multitaper design to perform better overall as it incorporates more of the sample data in each estimate. In order to improve the resolution using the Hann window one may increase the length of the window (at the expense of providing fewer uncorrelated estimates). In the extreme, a single Hann window has better resolution than the multitaper but achieves no improvement due to averaging. Alternate formulations of the Hann based approach may be used, such as 50% overlap, etc., but in general the multitaper has better performance in terms of frequency resolution and overall improvement in variance due to averaging.

There is a limit to the number of tapers that may be applied meaningfully, based on N and the W selected. As a rule of thumb, there are 2 NW significant eigenvalues (sometimes more conservatively estimated as 2 NW−1), indicating 2 NW tapers are highly concentrated in the region [−W, W]. For example, a first few eigenfunctions may have a mainlobe concentrated largely within [−W, W], but for higher numbered windows the main lobe may be mostly outside the desired region, and the sidelobe level may increase substantially. This implies is that power estimates based on these higher numbered windows may be heavily influenced by frequency content outside the area of interest. This effect may be referred to as a broad band bias, which may be undesirable, in particular for high dynamic range non-flat spectra. Limiting the number of employed windows such that D≤2 NW provides some robustness against broad band bias automatically. Improvement may also be achieved by appropriately combining of the individual eigenspectra as discussed further below.

Combining Eigenspectra

With N given, and W and D specified, a multitaper method may compute individual eigenspectra, $\hat{S}_d(f)$, using Eqn. (2.73). For an assumed flat spectrum, there is a fixed optimal weighting scheme for combining the individual $\hat{S}_d(f)$, however, this is of limited use. If one had a priori knowledge that the spectrum was white, altogether different estimations techniques could be applied. For non-flat spectrum, adaptive weighting schemes may reduce the contribution of broadband bias while maintaining estimation accuracy. An iterative method may be used to determine an eigenspectra weighting function, $h_d(f)$, for non-white noise. Begin with an initial estimate of the spectrum, $\hat{S}_f(f)$, using a flat spectrum fixed weighting $$\hat{S}_f^{(0)}(f) = \frac{\sum_{d=1}^{D} \lambda_d \hat{S}_d(f)}{\sum_{d=1}^{D} \lambda_d} \qquad (2.74)$$

where the superscript indexing is introduced to indicate the appropriate iteration. Estimating the variance of the process as $$\sigma^2 = \int_{-1/2}^{1/2} \hat{S}_f^{(0)}(f) df,$$

the following iterative procedure may be performed.

$$h_d^{(n)}(f) = \frac{\hat{S}_f^{(n-1)}(f)}{\lambda_d \hat{S}_f^{(n-1)}(f) - (1-\lambda_d)\sigma^2} \qquad (2.75)$$

$$\hat{S}_f^{(n)}(f) = \frac{\sum_{d=1}^{D} |h_d(f)|^2 \hat{S}_d(f)}{\sum_{d=1}^{D} |h_d(f)|^2} \qquad (2.76)$$

Typically, only 3 iterations of Eqn. (2.75) followed by Eqn. (2.76) are used for convergence.

Free Parameter Expansion

The formulation for multitaper spectral estimation develops an estimate of the power spectral density at $f_o$ by considering a region $[f_o-W, f_o+W]$. This estimate is valid for any f in this region. For this reason, for a specific $\hat{S}_f(f_o')$, there remains a question of which $f_o$ in the range $f_o'-W \leq f_o \leq f_o'+W$ is most appropriate as all are valid. This choice may be referred to as a free parameter expansion of $f_o$. The final $\hat{S}_f(f_o')$ should be a weighted average of these estimates, typically over a range $|f_o'-f_o| \leq 0.8$ W. In practice, the eigencoefficients in Eqn. (2.72) may be computed using FFT techniques for efficiency. Additional eigencoefficients for free parameter expansion may be generated by continuing to use the FFT with additional zero-padding. As used herein, the scalar multiplier NFPE refers to a value such that the full zero-padded FFT size is $N_{FFT}=N \times NFPE$. Thus, NFPE indicates the number of sampled "between points" available for free parameter expansion averaging.

Harmonic Analysis

As explained above, a discrete random process may have a mixed spectrum, such that it includes two independent processes—one with a continuous spectrum and one with a discrete spectrum. In terms of its spectral representation, a realization of a mixed spectrum stationary discrete random process $\{x[n]\}$ may have spectral representation $$x[n] = \int_{-1/2}^{1/2} e^{j2\pi fn} [dZ_1(f) + dZ_2(f)] \qquad (2.77)$$

where $dZ_1$ (f) corresponds to the continuous spectrum process and has increments in continuum from $-\frac{1}{2} \leq f \leq \frac{1}{2}$, while $dZ_2$ (f) corresponds to the line spectrum process and has increments only at the discrete locations of the frequencies in the harmonic process, $f_k$ for k=1, 2, •••, K. The line components (impulses) in the spectrum, which are caused by a portion of the process being a harmonic random process, cause difficulties with both classical and multitaper techniques. This is a result of the modulation property of the Fourier transform. Windowing of the data in the time domain results in convolution in the frequency domain. If a line component has large SNR, the result is unintended spectral leakage across frequency. A harmonic analysis approach may be applied to deal with this phenomenon.

At each frequency $f_o$, the multiple tapers define a region in the frequency domain, $[f_o-W, f_o+W]$. The continuous spectrum portion of the process, $\{dZ_1(f)\}$, is non-zero throughout the region $[f_o-W, f_o+W]$. For now, assume a single line component may exist in this region. If a line component exists at $f_o$, the increment process $\{dZ_2(f)\}$ is only non-zero at $f_o$ within $[f_o-W, f_o+W]$. Each realization of the process, $dZ_2$ (f), provides a complex valued constant at $f_o$. An analysis of variance (ANOVA) test may be used to detect the presence of the potential line component. For a single snapshot, this detection problem is termed the constant false alarm rate (CFAR) matched subspace detector. Within the region $[f_o-W, f_o+W]$, a subspace located at $f_o$ only may be defined. A vector, $\underline{q}_o$, may be defined that includes the mean value of each of the tapers $$\underline{q}_o = \left[\sum_{n=0}^{N-1} q_1(n), \sum_{n=0}^{N-1} q_2(n), \ldots, \sum_{n=0}^{N-1} q_D(n)\right]^T \quad (2.78)$$

and use this to form a projection matrix, $\underline{P}_q$, for the subspace $$\underline{P}_q = \underline{q}_o(\underline{q}_o^H \underline{q}_o)^{-1} \underline{q}_o^H \quad (2.79)$$

The null projector for the subspace, $\underline{P}_q^\perp$, $$\underline{P}_q^\perp = \underline{I} - \underline{P}_q \quad (2.80)$$

defines "everywhere else" in the region $[f_o-W, f_o+W]$. Forming a vector of the eigencoefficients, $\underline{y}_m$ ($f_o$)

$$\underline{y}_m(f_o) = [y_m^{(1)}(f_o), y_m^{(2)}(f_o), \ldots, y_m^{(D)}(f_o)]^T \quad (2.81)$$

a detection statistic may be formed by taking a ratio of the power of the eigencoefficients in the $f_o$*subspace to the power of the eigencoefficients outside that subspace. Formally, the detection statistic F ($f_o$) may be computed as $$F(f_o) = \frac{\sum_{m=1}^{M} \underline{y}_m^H(f_o) \underline{P}_q \underline{y}_m(f_o)}{\sum_{m=1}^{M} \underline{y}_m^H(f_o) \underline{P}_q^\perp \underline{y}_m(f_o)} \underset{H_0}{\overset{H_1}{\gtrless}} \gamma TH \quad (2.82)$$

and compared to an appropriate threshold, γTH.

The importance of the detection of the line components in the spectrum is that they may be identified, and after estimation of their unknown parameters (amplitude, frequency, and phase) subtracted from the original data. The residual sample data may then be subject to the spectral estimation algorithm, now with line components removed. The final spectral estimate may numerically "add" the line components to the continuous spectrum, with appropriate scaling for SNR and estimation accuracy.

Structured Covariance Matrices Based on Frequency Wavenumber Spectral Estimation The discussion below explains how the frequency-wavenumber spectrum can be used as a basis for covariance matrix estimation for WSS space-time processes. First, the sensitivity of a model based adaptive beamformer to errors in estimates of the model parameters is considered. Performance of these processors with respect to the estimation of individual model parameters, such as interferer angle-of-arrival or interferer to noise ratio (INR), is investigated. Second, relationships between the model for the array processing problem and the desired covariance are considered. In addition to the contribution from physically propagating waves seen by the array, contributions due to the sensor noise component may be included to maintain robustness. Thus, a model may be defined that includes both of these elements, and that produces the proper covariance matrix estimate after transformation to the space-time domain. This leads to an approach for covariance estimation from spatial spectrum (CSS) for uniform arrays, and guides subsequent discussion of CSS for arbitrary arrays. Concentrating on the uniform linear array case, the classical power spectral estimation techniques discussed above are applied to the problem. Expected values for the resulting covariance are developed and used to predict normalized SINR loss performance. These predictions indicate that some form of harmonic analysis to mitigate the effects of line components in the spectrum may be used. This allows the processor to maintain operation in the low normalized SINR loss region for a wide range of conditions.

Sensitivity of a Model Based Beamformer

In the following discussion, performance of a model-based adaptive beamformer is assessed relative to an optimal beamformer. Analysis is performed to determine performance sensitivity to estimation errors for the individual model components. This analysis gives insight into what parameters within the model matter most in terms of impact to beamformer performance without specifying the exact form of the processor. Bounds are developed indicating the estimation accuracy to obtain an acceptable performance for an acceptable normalized SINR loss, ξ.

Single Plane Wave in Spatially White Noise

Consider the simple case of a single plane wave interferer in spatially white noise. This provides a basic understanding of sensitivity to error in estimation of the interferer INR or wavenumber, and develops a basis for more complicated models. The model for the covariance matrix for this problem is $$\underline{R}_o = \sigma_n^2 \underline{v}_o \underline{v}_o^H + \sigma_w^2 \underline{I} \quad (3.1)$$

where $\underline{v}_o = ((e^{-j\underline{k}_o^T \underline{p}_n}))_n$ is the array manifold response for wavenumber $\underline{k}_o$. The unknown quantities are:

$\sigma_w^2$, the variance of the uncorrelated sensor noise;

$\sigma_n^2$, the variance of the plane wave interferer; and $\underline{k}_o$, the wavenumber of the plane wave interferer.

Optimal beamformer weights for desired wavenumber, $\underline{k}s$, specifying steering vector, $\underline{s}$, may be determined using Eqn. (2.54). Given its simple structure, there is a closed form expression for $\underline{R}_o^{-1}$. Using the matrix inversion lemma.

$$\underline{R}_o^{-1} = \sigma_w^{-2}\left[\underline{I} - \frac{\frac{\sigma_n^2}{\sigma_w^2}}{1 + \frac{\sigma_n^2}{\sigma_w^2}\underline{v}_o^H \underline{v}_o}\underline{v}_o \underline{v}_o^H\right] \quad (3.2)$$

The projection matrix for the subspace spanned by a single vector, $\underline{v}$, is defined as $\underline{P}_v = \underline{v}(\underline{v}^H \underline{v})^{-1} \underline{v}^H$ which can be rearranged as $\underline{v}^H \underline{v} \underline{P}_v = \underline{v}\underline{v}^H$. Defining the quantity $$\beta_o = \underline{v}_o^H \underline{v}_o \left( \frac{\sigma_w^2}{\sigma_n^2} + \underline{v}_o^H \underline{v}_o \right)^{-1},$$

the matrix inverse is represented as $$\underline{R}_o^{-1} = \sigma_w^{-2}[\underline{I} - \beta_o \underline{P}_{v_o}] \quad (3.3)$$

Eqn. (3.3), which is similar to a projection matrix on the null space of $\underline{v}_o$, is a weighted subtraction of the projection onto the range space of $v_o$. $\beta_o$ is a measure of the interferer to noise ratio, so the operation of the optimal beamformer can be interpreted as projecting out the interferer based on its relative strength against the spatially white noise. The complete expression for the weight vector is $$\underline{w}_o = \frac{[\underline{I} - \beta \underline{P}_{v_o}] \underline{s}}{\underline{s}^H [\underline{I} - \beta \underline{P}_{v_o}] \underline{s}} \quad (3.4)$$

Note that the denominator is a scalar, and does not affect the shape of the beam pattern other than as a gain.

In a particular embodiment, a model based adaptive processor may know the form of the covariance, estimate the unknown parameters, and use the estimates to determine the adaptive weights using Eqn. (3.4). As used below, the subscript o is used to denote a true or optimal quantity, while the subscript a denotes an estimated quantity. The estimated quantities reflect the true value and the estimation error, $\sigma_{w,a}^2 = \sigma_w^2 + \Delta\sigma_w^2$, $\sigma_{n,a}^2 = \sigma n2 + \Delta\sigma_n^2$, $k_a = k_o + \Delta k$. The estimated covariance matrix, $\underline{R}_a$, and the corresponding weight vector, $\underline{w}_a$, are $$\underline{R}_a = \sigma_{n,a}^2 \underline{v}_a \underline{v}_a^H + \sigma_{w,a}^2 \underline{I} \quad (3.5)$$

$$\underline{R}_a^{-1} = \sigma_{w,a}^{-2}[\underline{I} - \beta_a \underline{P}_{v_a}] \quad (3.6)$$

$$\underline{w}_a = \frac{[\underline{I} - \beta_a \underline{P}_{v_a}] \underline{s}}{\underline{s}^H [\underline{I} - \beta_a \underline{P}_{v_a}] \underline{s}} \quad (3.7)$$

The weight vector does not depend on the absolute values of $\sigma_{w,a}^2$ and $\sigma_{n,a}^2$, only their ratio. Thus, the following quantities may be defined:

$$INR_o \equiv \frac{\sigma_n^2}{\sigma_w^2}, \quad INR_a \equiv \frac{\sigma_{n,a}^2}{\sigma_{w,a}^2} = INR_o \Box \Delta INR \quad (3.8)$$

where $0 < \Delta INR < 1$ indicates an underestimate, and $\Delta INR > 1$ indicates an overestimate. The following discussion considers the sensitivity of $\xi$ to under/over-estimation of INR, and whether there is a range of $\Delta k$ that is also tolerant such that $\xi$ is near unity.

Over/Under-Estimate of INR, $\Delta INR \neq 1$

For this analysis let $\Delta k = 0$, so that $\underline{P}_{v_a} = \underline{P}_{v_o}$, to concentrate on the behavior w.r.t. $\Delta INR$. $\beta_a$ may be expressed as $$\beta_a = \frac{N}{(\sigma_n^2/\sigma_w^2)^{-1}(\Delta INR)^{-1} + N} \quad (3.9)$$

Four scenarios resulting in two different approximations for performance are described in Table 3.1. An additional condition is considered in the upper right case of Table 3.1 that $(INR)^{-1}(\Delta INR)^{-1} \leq 1$, or $\Delta INR \geq (INR)^{-1}$. This puts a limit on the amount of underestimation considered and eliminates the situation of gross underestimation of INR when the interferer is strong. As seen in Table 3.1, the two approximations to consider are: Case 1– $\beta_a \approx 1$ and Case 2– $\beta_a \approx 0$.

TABLE 3.1

INR estimation error cases, single plane wave interferer:

| | overestimate INR $\Delta INR \geq 1$ | underestimate INR $\Delta INR \leq 1$ |
|---|---|---|
| INR > 1 | $(INR)^{-1}(\Delta INR)^{-1} \ll 1, \beta_a \approx 1$ | $(INR)^{-1}(\Delta INR)^{-1} \leq 1, \beta_a \approx 1$ |
| INR < 1 | $(INR)^{-1}(\Delta INR)^{-1} \geq 1, \beta_a \approx 1$ | $(INR)^{-1}(\Delta INR)^{-1} \gg 1, \beta_a \approx 0$ |

Case 1. Overestimate or Slightly Underestimated INR, $\beta a \approx 1$

The general expression for the SINR loss is approximately $$\xi \approx \frac{N - (1/N)|\underline{s}^H \underline{v}_o|^2}{N - (\beta_o/N)|\underline{s}^H \underline{v}_o|^2} \quad (3.10)$$

The performance depends on the number of elements, N, the INR, and the wavenumber separation. For a uniform linear array with element spacing d, with broadside as the desired steering vector, $\underline{s}$, Eqn. (3.10) becomes $$\xi \approx \frac{N - (1/N)\sin^2(k_o dN/2)/\sin^2(k_o d/2)}{N - (\sigma_w^2/\sigma_n^2 + N)^{-1}\sin^2(k_o dN/2)/\sin^2(k_o d/2)} \quad (3.11)$$

Defining the normalized frequency as the ratio of the operational frequency to the design frequency of the array, $f_{norm} = f|f_o, f \leq f_o$, the expression can be written in terms of the angle of incidence to the array, $\theta$. Note the normalized wavenumber $k_o d = -\pi f_{norm} \cos \theta$.

$$\xi \approx \frac{N - (1/N)\sin^2(\pi f_{norm}\cos[\theta]N/2)/\sin^2(\pi f_{norm}\cos[\theta]/2)}{N - (\sigma_w^2/\sigma_n^2 + N)^{-1}\sin^2(\pi f_{norm}\cos[\theta]N/2)/\sin^2(\pi f_{norm}\cos[\theta]/2)} \quad (3.12)$$

As $\theta$ moves away from the mainlobe at broadside, this expression is $\approx 1$.

Case 2. Largely Underestimated INR, $\beta_a \approx 0$

When INR is largely underestimated, the adaptive beamformer reduces to the conventional beamformer. Normalized SINR loss is highly dependent on INR, as the processor takes no action to specifically suppress the interferer. The expression for SINR loss for a uniform linear array in this case is approximately $$\xi \approx \frac{N}{\underline{s}^H \underline{R}_o^{-1} \underline{s}} \square \frac{N}{\underline{s}^H \underline{R}_o \underline{s}} \quad (3.13)$$

The normalized SINR loss for the conventional (non-adaptive) beamformer is:

$$\xi \approx \frac{N}{N - (\beta_o/N)|\underline{s}^H \underline{v}_o|^2} \square \frac{N}{N + \sigma_n^2/\sigma_w^2 |\underline{s}^H \underline{v}_o|^2} \quad (3.14)$$

Large underestimation of the INR results in performance of the non-adaptive beamformer, effectively failing to take any corrective action in the weight determination to null the interference. The normalized SINR loss for this case shows the strong dependence between SINR loss and INR. This is expected for a non-adaptive processor, the larger the interferer the worse the performance.

Wavenumber Offset, $\Delta k \neq 0$

Now consider the impact of $\Delta k \neq 0$ on the performance. Assume that $\Delta INR = 1$, i.e., there is no error in estimating the INR, so that $\beta_a = \beta_o$. The expression for the approximate SINR loss in this case is $$\xi \approx \left[ \sigma_n^2/\sigma_w^2 \frac{|\underline{v}_o^H \underline{P} \underline{v}_{as}^\perp|^2}{|\underline{P} \underline{v}_{as}^\perp|^2} + 1 \right]^{-1} \quad (3.15)$$

This expression may be used to determine a $\Delta k$ that achieves an acceptable SINR loss, $\xi_{OK}$. This can then be compared to the Cramér Rao bound to see how reasonable it is in terms of the imagined model based processor. This results in the general expression for the single interferer in uncorrelated white noise case.

$$|\underline{v}_o^H \underline{P} \underline{v}_{as}^\perp|^2 \leq |\underline{P} \underline{v}_{as}^\perp|^2 \frac{1 - \xi_{OK}}{\xi_{OK} \sigma_n^2/\sigma_w^2} \quad (3.16)$$

Assumptions about the array geometry may be used to further simply this expression. For a uniform linear array (ULA), performance may be analyzed in terms of $\Delta k$, with an assumed desired steering vector corresponding to broadside, $k_s = 0$. Due to the choice of $k_s$, the interferer wavenumber $k_o$ is the separation in wavenumber between the two. The following expressions can be derived through analysis of normalized SINR loss of a model based adaptive beamformer as a function of estimation accuracies of the model parameters (e.g., wavenumber and interferer to noise ratio (INR)):

$$\Delta kd \leq \left( \frac{1}{\dot{D}^2(k_o d)} \cdot \left[ N - \frac{1}{N} \frac{\sin^2(k_o dN/2)}{\sin^2(k_o d/2)} \right] \cdot \frac{1 - \xi_{OK}}{\xi_{OK} \sigma_n^2/\sigma_w^2} \right)^{1/2} \quad (3.17)$$

$$\dot{D}(kd) = \frac{1}{2} \cdot \frac{N\sin(kd/2)\cos(kdN/2) - \sin(kdN/2)\cos(kd/2)}{\sin^2(kd/2)} \quad (3.18)$$

Eqn. (3.17) includes oscillations that indicate there are areas in kd space that are more tolerant to the estimation error, $\Delta k$. These correspond to nulls in the conventional beam pattern that provide sufficient attenuation against the interference. A smoother bound for the expression that eliminates oscillations and neatly spans the lower values may be determined, resulting in a final smoothed expression:

$$\Delta kd \leq \left( \frac{2|\sin(k_o d/2)|}{N} \cdot \left[ N - \frac{1}{N} \frac{\sin^2(k_o dN/2)}{\sin^2(k_o d/2)} \right] \frac{1 - \xi_{OK}}{\xi_{OK} \sigma_n^2/\sigma_w^2} \right)^{1/2} \quad (3.19)$$

While Eqn. (3.17) produces oscillations, Eqn. (3.19) smoothly bounds the bottom values. To be conservative, Eqn. (3.19) may be used, although Eqn. (3.19) may be too conservative as the separation between the interferer and the desired steering vector approaches zero. This corresponds to the interferer residing in the main lobe of the beamformer.

Comparison to the Cramér Rao Bound

The spatial frequency/direction of arrival estimation accuracy specified by Eqn. (3.19) results in a prescribed amount of normalized SINR loss, $\xi_{OK}$. This accuracy can be compared to the Cramér Rao (CR) bound for the case of a single plane wave in noise. The CR bound for a given number of snapshots, M, is $$C_{CR}(kd) = \frac{1}{M} \left[ \frac{1}{N\sigma_n^2/\sigma_w^2} + \frac{1}{(N\sigma_n^2/\sigma_w^2)^2} \right] \frac{6}{(N^2 - 1)} \quad (3.20)$$

Model for Covariance

Estimating the covariance matrix may begin by considering a model that incorporates the components that make up the covariance at the output of an N element array for a narrowband, stationary space-time process, $f(t, \Delta \underline{p})$. Using the spectral representation theorem, the space-time process can be represented as a sum of uncorrelated plane waves distributed as function of angle of arrival to the array, $G(\theta, \phi)$, or wavenumber, $G(\underline{k})$. The corresponding wavenumber spectrum for the process is proportional to this normalized distribution, $P_f(\underline{k}) = \alpha G(\underline{k})$, where $\alpha$ accounts for scaling the relative levels defined by $G(\underline{k})$ to the absolute power level seen at the array.

As explained above, a stationary random process may include two uncorrelated components, one corresponding to a continuous spectrum process, and another corresponding to a discrete spectrum, i.e., harmonic, process. Independent, white sensor noise adds a third component to the array output covariance. The $m^{th}$ snapshot containing these components is $$\underline{x}_m = \sum_{k=1}^{K} \underline{v}_k a_k(m) + \underline{n}_{b,m} + \underline{n}_{w,m} \quad (3.21)$$
$$= \underline{v}_{a_m} + \underline{n}_{b,m} + \underline{n}_{w,m}$$

where $\underline{v}_k$ is the array manifold response vector at spatial frequency $\underline{k}_k$. The covariance for this model includes three uncorrelated parts based on these components $$\underline{R}_x = \underline{V} \underline{R}_a \underline{V}^H + \underline{R}_b + \underline{R}_w \quad (3.22)$$

where $$\underline{R}_a = E\{\underline{a}_m \underline{a}_m^H\}, \underline{R}_b = E\{\underline{n}_{b,m} \underline{n}_{b,m}^H\}, \underline{R}_w = E\{\underline{n}_{w,m} \underline{n}_{w,m}^H\} = \sigma_w^2 \underline{I},$$

and spatial stationarity requires the plane waves be uncorrelated, so that $\underline{R}_a=\text{diag}(\sigma_1^2, \sigma_2^2, \ldots, \sigma_K^2)$.

Thus, $$\underline{R}_x = \sum_{k=1}^{K} \sigma_k^2 \underline{v}_k \underline{v}_k^H + \underline{R}_b + \sigma_w^2 I \quad (3.23)$$

Alternatively, grouping the terms for the space-time process, $\underline{R}_f = \underline{V}\underline{R}_a\underline{V}^H + \underline{R}_b$, separately from the sensor noise component:

$$\underline{R}_x = \underline{R}_f + \underline{R}_w \quad (3.24)$$

The matrix $\underline{R}_f$ includes all terms that correspond to physical propagating waves and can be decomposed via eigendecomposition $$\underline{R}_f = \underline{Q}_f \Lambda_f \underline{Q}_f^H \quad (3.25)$$

$$= \sum_{n=0}^{N-1} \lambda_{f,n} \underline{q}_{f,n} \underline{q}_{f,n}^H$$

Depending on the particular form of the space-time process, $f(t, \Delta\underline{p})$, and the array geometry, $\underline{R}_f$ may have rank $N_f < N$. In that event, some of the eigenvalues will be zero valued.

$$\underline{R}_f = \sum_{n=0}^{N_f-1} \lambda_{f,n} \underline{q}_{f,n} \underline{q}_{f,n}^H \quad (3.26)$$

Regardless of the rank of $\underline{R}_f$, the N eigenvectors $\underline{Q}_f$ form a complete orthonormal set for the space $\mathbb{C}^{N \times N}$. Using (3.25) in Eqn. (3.24), with $\underline{Q}_f \underline{Q}_f^H = I$ the matrix $\underline{R}_x$ can be expressed $$\underline{R}_x = \underline{Q}_f \Lambda_f \underline{Q}_f^H + \sigma_w^2 \underline{Q}_f \underline{Q}_f^H \quad (3.27)$$

$$= \sum_{n=0}^{N-1} (\lambda_{f,n} + \sigma_w^2) \underline{q}_{f,n} \underline{q}_{f,n}^H + \sum_{n=N_f}^{N-1} \sigma_w^2 \underline{q}_{f,n} \underline{q}_{f,n}^H$$

$$= \underline{Q}_f \Lambda_x \underline{Q}_f^H$$

As evident in Eqn. (3.27), the white noise contribution from $\underline{R}_w$ guarantees that all the eigenvalues are non-zero, so that overall covariance, $\underline{R}_x$, is full rank.

Estimating Visible Space Covariance, $\hat{\underline{R}}_{vs}$

Consider the covariance associated with the space-time process only, $\underline{R}_f$. As explained above, the transform relationship between the frequency-wavenumber spectrum, $P_f(\underline{k})$, and the space-time covariance, $\underline{R}_f$, is $$\underline{R}_f = (2\pi)^{-C} \int \ldots \int_{vs} P_f(\underline{k}) \underline{v}(\underline{k}) \underline{v}^H(\underline{k}) d\underline{k} \quad (3.28)$$

where C in this expression is the dimension of the wavenumber used, C=1, 2 or 3. In Eqn. (3.28), the range of integration is restricted to the visible region for the array, corresponding to physical propagating waves arriving at the array with some azimuth, $0 \le \phi \le 2\pi$, and elevation, $0 \le \theta \le \pi$. For a given estimate of the visible region frequency-wavenumber spectrum, $\hat{P}_{vs}(\underline{k})$, the corresponding covariance of the space-time process can be determined using Eqn. (3.28)

$$\hat{\underline{R}}_{vs} = (2\pi)^{-C} \int \ldots \int_{vs} \hat{P}_{vs}(\underline{k}) \underline{v}(\underline{k}) \underline{v}^H(\underline{k}) d\underline{k} \quad (3.29)$$

Spectral estimation techniques used to form the estimate $\hat{P}_{vs}(\underline{k})$ may not be able to distinguish between the contribution of the space-time process, $f(t, \Delta\underline{p})$, and the sensor noise component apparent within the visible space. Any basis projection or steered beam power measurement technique will see both the content from $f(t, \Delta\underline{p})$ and the sensor noise.

$$\hat{P}_{vs}(\underline{k}) = \hat{P}_f(\underline{k}) + \hat{\sigma}_w^2 \quad (3.30)$$

$\hat{\underline{R}}_{vs}$ from Eqn. (3.29) will contain the sum of both.

$$\hat{\underline{R}}_{vs} = \hat{\underline{R}}_f + \hat{\sigma}_w^2 (2\pi)^{-C} \int \ldots \int_{vs} \underline{v}(\underline{k}) \underline{v}^H(\underline{k}) d\underline{k} \quad (3.31)$$

Observe from Eqn. (3.31) that the contribution due to the sensor noise component, when viewed only across the visible region, appears as an additional isotropic noise in the environment.

Visible and Virtual Space

For certain array geometries, or when operating below the design frequency, there may be a significant additional virtual space in addition to the visible space available to the array. To define virtual space, the subspace spanned by the columns of a matrix $\underline{A}$ may be denoted as span $(\underline{A}) = $ "$\underline{A}$". As explained above, with a sensor noise component present, $\underline{R}_x \in \mathbb{C}^{N \times N}$, and is full rank, thus "$\underline{R}_x$"="$\mathbb{C}^{N \times N}$". The visible space for a particular geometry and operational frequency may only occupy a subspace of $\mathbb{C}^{N \times N}$. "$\underline{R}_x$" then includes two subspaces, one corresponding to a visible region, indicated with subscript vs, and one corresponding to a virtual region, indicated with subscript vr.

$$<\underline{R}_x> = <\underline{R}_{vs}> + <\underline{R}_{vr}> \quad (3.32)$$

Wavenumbers in the virtual space do not correspond to physical propagating waves. Use of Eqn. (3.29) directly as an estimate of covariance with failure to account for the sensor noise component within the virtual region subspace may lead to poor sidelobe behavior within the virtual region, and adaptive beamformers developed using this covariance alone may suffer an overall loss in SINR.

Regularly and Uniformly Spaced Array Geometry

A regularly spaced array geometry is described by an interelement spacing that is a multiple of a fixed quantity, d, in Cartesian coordinates. Uniform arrays are a special case of this with the interelement spacing simply the constant, d. The uniform linear array, in terms of spatial sampling, is analogous to uniform sampled time series and the results of stationary processes and Fourier transform pairs and properties may apply directly. The discussion below concentrates on the uniform linear array, with some discussion of the implications of regularly spaced arrays. Extensions to higher dimension processing are envisioned.

The narrowband space-time process, $f(t, \Delta\underline{p})$, at frequency $\omega$ includes plane waves propagating in a homogeneous medium with velocity c. These waves are solutions to the homogeneous wave equation, and are constrained in wavenumber such that $|\underline{k}| = \omega/c = 2\pi/\lambda$. This indicates that the frequency-wavenumber spectrum, $P_f(\omega, \underline{k})$, for this process exists on the surface of a sphere in wavenumber space with radius $|\underline{k}|$.

Consider an N element uniform linear array with design frequency $\omega_o$ (spacing $d=\lambda_o/2$) and sensor elements at locations on the z axis, $p_n=(n-1)d$ for $n=0, \cdots, N-1$. With no ability to resolve spatial components in the $k_x$ or $k_y$ direction, the frequency-wavenumber spectrum, $P_f(\omega, \underline{k})$, may be projected down onto the $k_z$ axis. After projection the spec trum maintains the strict bandlimiting to the range $|k_z| \leq 2\pi/\lambda$. Using sampling of random processes, as explained above:

$$R_f(\Delta p) = \frac{1}{2\pi} \int_{-2\pi/\lambda_o}^{2\pi/\lambda_o} P_f(k_z) e^{-j\Delta p k_z} dk_z \qquad (3.33)$$

where $\Delta p = ld$ for integer $l$. For operation below the array design frequency, $\omega < \omega_o$, the wavenumber spectrum $P_f(k_z)$ is non-zero only over the range corresponding to the visible region of the array, $|k_z| \leq 2\pi/\lambda$, and the range of integration may be reduced to $\int_{-2\pi/\lambda}^{2\pi/\lambda}$. Now consider the uncorrelated sensor noise component $$R_w(\Delta p) = \sigma_w^2 \delta(\Delta p) \qquad (3.34)$$

Even though it does not correspond to a component of a physically propagating space-time process, a wavenumber-spectrum and covariance Fourier transform pair can be defined:

$$P_w(k_z) = \sum_{m=-\infty}^{\infty} R_w(\Delta p) e^{j\Delta p k_z} = \sigma_w^2 \qquad (3.35)$$

$$R_w(\Delta p) = \frac{1}{2\pi} \int_{-2\pi/\lambda_o}^{2\pi/\lambda_o} P_w(k_z) e^{-j\Delta p k_z} dk_z \qquad (3.36)$$

The difference between $P_f(k_z)$ and $P_w(k_z)$ is that $P_w(k_r)$ is non-zero over the entire interval, $|k_z| \leq 2\pi/\lambda_o$. The covariance for the output of the array of interest is the sum of the two $$R_x(\Delta_p) = R_f(\Delta p) + R_w(\Delta_p) \qquad (3.37)$$

The two wavenumber spectra, one for the space-time process and the other for the sensor noise component, can be added to produce a composite spectrum $$P_x(k_z) = P_f(k_z) + P_w(k_z), |k_z| \leq 2\pi/\lambda_o \qquad (3.38)$$

so that the covariance is related via $$R_x(\Delta p) = \frac{1}{2\pi} \int_{-2\pi/\lambda_o}^{2\pi/\lambda_o} [P_f(k_z) + P_w(k_z)] e^{-j\Delta p k_z} dk_z \qquad (3.39)$$

For convenience, the expressions can be converted to normalized wavenumber, $\psi = -k_z d$ space. Defining the $\psi$ spectrum as $$P_{\psi,a}(\psi) = \frac{1}{d} P_a(k) \bigg|_{k=-\psi/d, a=x,f,w} \qquad (3.40)$$

the covariance sequence $R_{l,x}$ (l) and $\psi$ spectrum are related $$R_{l,x}(l) = R_x(ld) = \frac{1}{2\pi} \int_{-\pi}^{\pi} P_{\psi,x}(\psi) e^{j\psi l} d\psi \qquad (3.41)$$

$P_{\psi,x}(\psi)$ may be estimated over the entire range, $|\psi| \leq \pi$, from the snapshot data, $\underline{x}_m$, using classical power spectral estimation techniques. By accepting a fixed resolution in $\psi$ space (which is non-uniform in angle space, $\theta$) this can be done efficiently with FFT based processing. Using the estimate $\hat{P}_{\psi,x}(\psi)$ in Eqn. (3.41)

$$\hat{R}_{l,x}(l) = \frac{1}{2\pi} \int_{-\pi}^{\pi} \hat{P}_{\psi,x}(\psi) e^{j\psi l} d\psi \qquad (3.42)$$

As long as the limits of integration in Eqn. (3.42) are over the entire range, $\int_{-\pi}^{\pi}$, the covariance estimate will contain the appropriate components for both the space-time process and the uncorrelated sensor noise.

The process itself may be bandlimited, and if the sensor noise component is estimated in the transform domain, it should have the appropriate form such that it equates to $\hat{\sigma}_w^2 \underline{I}$ within the final covariance matrix estimate.

Positive Definiteness

In order for the estimated covariance to have value for adaptive beamforming, the covariance should be Hermitian, $\hat{\underline{R}}_x = \hat{\underline{R}}_x^H$, and invertible. The Hermitian property and invertibility imply that the eigenvalues of $\hat{\underline{R}}_x$ are all real valued and greater than zero, or more simply that the matrix $\hat{\underline{R}}_x$ is positive definite. For arbitrary vector $\underline{x}$, not equal to the null vector ($\underline{x}^H \underline{x} \neq 0$), the matrix A is positive semi-definite if $$\underline{x}^H \underline{A} \underline{x} \geq 0 \qquad (3.43)$$

and is indicated notationally as $\underline{A} \geq 0$. The matrix $\underline{A}$ is positive definite if $$\underline{x}^H \underline{A} \underline{x} > 0 \qquad (3.44)$$

and is indicated notationally as $\underline{A} > 0$.

For simplicity of explanation, consider a regularly spaced linear array (though higher dimension regular arrays may follow similarly). From Eqn. (3.42), the covariance matrix estimate is based on the estimate of the wavenumber spectrum, given in normalized wavenumber space, $\psi = -kd$ $$\hat{\underline{R}}_x = \frac{1}{2\pi} \int_{-\pi}^{\pi} \hat{P}_{\psi,x}(\psi) \underline{v}_\psi(\psi) \underline{v}_\psi^H(\psi) d\psi \qquad (3.45)$$

The $\psi$-spectrum estimates, $\hat{P}_{\psi,x}(\psi)$, may be restricted to be real-valued and greater than zero. This has implications in choice of algorithm but is a reasonable for a power spectral estimator when the observed process has a white noise component. With this restriction, $\hat{P}_{\psi,x}(\psi)$ may be expressed in the form $$\hat{P}_{\psi,x}(\psi) = \hat{P}_{\psi,f}(\psi) + \hat{\sigma}_w^2 \qquad (3.46)$$

where $\hat{P}_{\psi,f}(\psi)$ is the estimate of the space-time process spectrum, $\hat{P}_{\psi,x}(\psi) \geq 0$, and $\hat{\sigma}_w^2$ is the estimate of the sensor noise $\hat{\sigma}_w^2 > 0$. Now $$\underline{x}^H \hat{\underline{R}}_x \underline{x} = \underline{x}^H \left( \frac{1}{2\pi} \int_{-\pi}^{\pi} [\hat{P}_{\psi,f}(\psi) + \hat{\sigma}_w^2] \underline{v}_\psi(\psi) \underline{v}_\psi^H(\psi) d\psi \right) \underline{x} \qquad (3.47)$$

$$= \underline{x}^H (\hat{\underline{R}}_f + \hat{\underline{R}}_w) \underline{x}$$

The first term is $$\underline{x}^H \hat{\underline{R}}_f \underline{x} = \frac{1}{2\pi} \int_{-\pi}^{\pi} \hat{P}_{\psi,f}(\psi) |\underline{x}^H \underline{v}_\psi(\psi)|^2 d\psi \qquad (3.48)$$

Both quantities in the integral in Eqn. (3.48), $\hat{P}_{\psi,y}(\psi)$ and $|x^H v_\psi(\psi)|^2$, are real-valued and greater than or equal to zero, therefore $\hat{\underline{R}}_y \geq 0$. The second term may be evaluated as $$\underline{x}^H \hat{\underline{R}}_w \underline{x} = \hat{\sigma}_w^2 \underline{x}^H \left[ \frac{1}{2\pi} \int_{-\pi}^{\pi} \underline{v}_\psi(\psi) \underline{v}_\psi^H(\psi) d\psi \right] \underline{x} \quad (3.49)$$

The integral in Eqn. (3.29) can be reduced to $$\frac{1}{2\pi} \int_{-\pi}^{\pi} \underline{v}_\psi(\psi) \underline{v}_\psi^H(\psi) d\psi = I \quad (3.50)$$

so that $$\underline{x}^H \hat{\underline{R}}_w \underline{x} = \hat{\sigma}_w^2 \underline{x}^H \underline{x} > 0 \quad (3.51)$$

and $\hat{\underline{R}}_w$ is positive definite. The sum of a positive semi-definite matrix and a positive definite matrix is positive definite, so $\hat{\underline{R}}_x > 0$ when $\hat{P}_{\psi,y}(\psi)$ is real-valued and greater than zero.

Performance when Using Classical PSD Techniques

The analysis of performance of estimating covariance from spatial spectrum (CSS) may begin by considering estimates of the wavenumber spectrum found using classical spectral estimation techniques. For ease of explanation, a uniform linear array with spacing $d = \lambda_o/2$ is considered. For a given fixed window function (or taper), $\underline{w} = ((w[n]))_n$, the windowed snapshot data is $$\underline{y}_m = ((x_m[n]w[n]))_n = \underline{x}_m \odot \underline{w} \quad (3.52)$$

The windowed data may be used to form an averaged windowed periodogram estimate of the spectrum. Writing the array manifold response vector, $\underline{v}_k(k_z) = ((e^{-jk_z dn}))_n$ in $\psi = -k_z d$ space, $\underline{v}_\psi(\psi) = ((e^{j\psi n}))_n$, the estimate may be developed in two steps. First, compute the Fourier transform of the windowed data.

$$\underline{Y}_m(\psi) = \sum_{n=0}^{N-1} y_m(n) e^{-j\psi n} = \underline{v}_\psi^H(\psi) \underline{y}_m \quad (3.53)$$

The final spectral estimated is the averaged, magnitude squared value of the Fourier transforms $$\hat{P}_y(\psi) = \frac{1}{M} \sum_{m=1}^{M} |Y_m(\psi)|^2 \quad (3.54)$$
$$= \frac{1}{M} \sum_{m=1}^{M} \underline{v}_\psi^H(\psi) \underline{y}_m \underline{y}_m^H \underline{v}_\psi(\psi)$$

$\hat{P}_\psi(\psi)$ is periodic in $\psi$ with period $2\pi$. The range $|\psi| \leq \pi$ may be referred to as the region of support. The visible region of the array, when operating at frequency $f = c/\lambda$, $(f \leq f_o)$, is restricted to the range $|\psi| \leq \pi(\lambda_o/\lambda)$. As explained above, the remainder outside the visible region is referred to as the virtual region. The fixed window function, $\underline{w}$, provides a fixed resolution, e.g., "bin width", across $\psi$ space. This allows $\hat{P}_\psi(\psi)$ to be computed efficiently at several equal spaced locations throughout the supported region using FFT techniques. It is also possible to have the window function vary as a function of $\psi$, represented as $\underline{w}_\psi$. In this way, one can design for fixed resolution in angle space. This results in non-uniform "bin width" in $\psi$ space. Multi-taper spectral estimation techniques lend themselves to this method of design. FFT techniques may not be directly applicable, though, when the window function is not fixed so increased computational cost may be associated with the approach.

An alternate perspective on the estimated $\hat{P}_\psi(\psi)$ spectrum may be considered in terms of an auto-correlation sequence $\hat{\rho}_y[n]$ defined by the windowed sensor outputs. Based on the Fourier transform property $$|Y_m(\psi)|^2 = F\left( \sum_{\beta=0}^{N-1} y_m[\beta] y_m^*[\beta - n] \right) \quad (3.55)$$

The sample autocorrelation per snapshot is $$\hat{\rho}_{y,m}[n] = \sum_{\beta=0}^{N-1} y_m[\beta] y_m^*[\beta - n], 0 \leq n < N, \hat{\rho}_{y,m}[-n] = \hat{\rho}_{y,m}^*[n] \quad (3.56)$$

where the sequence $y_m[\beta]$ has value in the range $[0, N-1]$, and is zero elsewhere. As a convention, $\hat{\rho}[n]$ may be used to represent a sample autocorrelation from the data itself, while reserving $R[n]$ is to indicate an auto-correlation based on the ensemble, $E\{\cdot\}$. The overall sample autocorrelation is the average over all snapshots $$\hat{\rho}_y[n] = \frac{1}{M} \sum_{m=1}^{M} \hat{\rho}_{y,m}[n] \quad (3.57)$$

Using Eqns. (3.55), (3.56), and (3.57), in Eqn. (3.54):

$$\hat{P}_y[\psi] = \sum_{n=-(N-1)}^{N-1} \hat{\rho}_y[n] e^{-j\psi n} \quad (3.58)$$

The estimated power spectrum and auto-correlation sequence are a Fourier transform pair, with corresponding inverse transform relationship $$\hat{\rho}_y[n] = (2\pi)^{-1} \int_{-\pi}^{\pi} \hat{P}_y(\psi) e^{j\psi n} d\psi \quad (3.59)$$

The covariance matrix for the array is formed from the $\hat{\rho}_y[n]$ values in a Toeplitz structure $$\hat{\underline{R}}_y = ((\hat{\rho}_y[r - c]))_{r,c} \quad (3.60)$$

Expressed directly in matrix notation based on Eqn. (3.59) this can be also be expressed as $$\hat{\underline{R}}_y = (2\pi)^{-1} \int_{-\pi}^{\pi} \hat{P}_y(\psi) \underline{v}_\psi(\psi) \underline{v}_\psi^H(\psi) d\psi \quad (3.61)$$

It is also useful when comparing related techniques to understand how the formation of $\hat{\underline{R}}_y$ relates to the operations used in the traditional sample covariance matrix. Eqn. (3.57) is equivalent in result to Eqn. (3.59), but operates directly on the snapshot data in space-time domain. First, define a windowed sample covariance matrix $$\underline{R}_{w,SCM} = \frac{1}{M}\sum_{m=1}^{M}(\underline{x}_m \square \underline{w})(\underline{x}_m \square \underline{w})^H \qquad (3.62)$$

The classical sample covariance matrix, $$\underline{R}_{SCM} = \frac{1}{M}\sum_{m=1}^{M} \underline{x}_m \underline{x}_m^H,$$

uses Eqn. (3.62) with $\underline{w}=1$, the all one's vector. Showing the entries in the matrix in Eqn. (3.62) explicitly:

$$\underline{R}_{w,SCM} = \frac{1}{M}\sum_{m=1}^{M}\begin{pmatrix} x_{m,[0]}w_{[0]}x_{m,[0]}^*w_{[0]}^* & x_{m,[0]}w_{[0]}x_{m,[1]}^*w_{[1]}^* & & \\ x_{m,[1]}w_{[1]}x_{m,[0]}^*w_{[0]}^* & x_{m,[1]}w_{[1]}x_{m,[1]}^*w_{[1]}^* & \cdots & x_{m,[0]}w_{[0]}x_{m,[N-1]}^*w_{[N-1]}^* \\ x_{m,[2]}w_{[2]}x_{m,[0]}^*w_{[0]}^* & x_{m,[2]}w_{[2]}x_{m,[1]}^*w_{[1]}^* & & \\ \vdots & & \ddots & \\ x_{m,[N-1]}w_{[N-1]}x_{m,[0]}^*w_{[0]}^* & & \cdots & x_{m,[N-1]}w_{[N-1]}x_{m,[N-1]}^*w_{[N-1]}^* \end{pmatrix} \qquad (3.63)$$

Comparing Eqn. (3.56) to Eqn. (3.63) shows that $\hat{\rho}_{y,m}[n]$ is the sum down each of the diagonals in the inner matrix in Eqn. (3.63), where the diagonals correspond to the numbered index n as main, sub, or super diagonal according to:

$$\begin{pmatrix} 0 & -1 & -2 & \cdots & -(N-1) \\ 1 & \square & \square & & \square \\ 2 & \square & & & \\ \vdots & \square & & & \\ N-1 & & & & \end{pmatrix} \qquad (3.64)$$

By averaging over multiple snapshots, therefore, $\hat{\rho}_y[n]$ is the sum down the diagonals of $\underline{R}_{w,SCM}$. The covariance matrix $\underline{\hat{R}}_y$ is then populated with entries from $\hat{\rho}_y[n]$. Going forward as a convention, this operation is referred to herein as a diagonal-sum-replace (DSR), with a notation indicating the operation as $$\underline{\hat{R}}_y = \text{DSR}(\underline{R}_{w,SCM}) \qquad (3.65)$$

The DSR operation acts in a linear fashion for addition of matrices $\underline{A}, \underline{B} \in \mathbb{C}^{N \times N}$ $$\text{DSR}(\underline{A}+\underline{B}) = \text{DSR}(\underline{A}) = \text{DSR}(\underline{B}) \qquad (3.66)$$

as well as in regards to the expectation operator $$E\{\text{DSR}(\underline{A})\} = \text{DSR}(E\{\underline{A}\}) \qquad (3.67)$$

Expected Value-Stationary Random Process

The expected value of the covariance, $\underline{\hat{R}}_y$, for the WSS space-time process is considered below. From Eqn. (3.58), the expected value of $\hat{P}_y[\psi]$ is related to the sample autocorrelation, $\hat{\rho}_y[n]$, $$E\{\hat{P}_y[\psi]\} = \sum_{n=-(N-1)}^{N-1} e^{-j\psi n} E\{\hat{\rho}_y[n]\} \qquad (3.68)$$

The expected value of $E\{\hat{\rho}_y\} = E\{\hat{\rho}_{y,m}\}$.

$$E\{\hat{\rho}_{y,m}[n]\} = R_x[n]\sum_{\beta=0}^{N-1} w[\beta]w^*[\beta-n] \qquad (3.69)$$

where $R_x[n]$ is the ensemble covariance. The remaining summation term is the sample autocorrelation of the window, $$\rho_w[n] = \sum_{m=0}^{N-1} w[m]w^*[m-n].$$

The final result for the expectation is then $$E\{\hat{\rho}_y[n]\} = R_x[n]\rho_w[n] \qquad (3.70)$$

From Eqn. (3.70), the expected value of the covariance matrix is $$E\{\underline{\hat{R}}_y\} = \underline{R}_x \square \underline{R}_w \qquad (3.71)$$

where $\underline{R}_w = \text{DSR}(\underline{w}\underline{w}^H) = ((\rho_w[r-c]))_{r,c}$. Looking at the result in the frequency domain, using Eqn. (3.70) in Eqn. (3.68) results in:

$$E\{\hat{P}_y(\psi)\} = \sum_{n=-(N-1)}^{N-1} R_x[n]\rho_w[n]e^{-j\psi n} \qquad (3.72)$$

This can be expressed in the $\psi$ domain as the convolution of the power pattern of the window, $C_w(\psi) = |W(\psi)|^2 = F(\rho_w[n])$, with the underlying model spectrum, $P_{x,\psi}(\psi)$ $$E\{\hat{P}_y(\psi)\} = C_w(\psi) \# P_{x,\psi}(\beta) \qquad (3.73)$$

$$= \frac{1}{2\pi}\int_{-\pi}^{\pi} C_w(\psi-\beta)P_{x,\psi}(\beta)\,d\beta$$

Performance Based on Expected Value

The result for the expected value of the covariance of Eqn. (3.71) can be used to assess performance of the algorithm. For a given window function (a.k.a. taper), $\underline{w}$, first determine the matrix $\underline{R}_w = \text{DSR}(\underline{w}\underline{w}^H)$. For each particular problem of interest, e.g., single plane wave in uncorrelated noise, form the known model ensemble covariance, $\underline{R}_x$. Using these in the normalized SINR loss expression, adaptive beamformer performance using CSS can be analyzed.

$$\xi = \frac{\underline{s}^H(\underline{R}_x \square \underline{R}_w)^{-1}\underline{s}}{\underline{s}^H \underline{R}_x^{-1}\underline{s}} \cdot \frac{\underline{s}^H(\underline{R}_x \square \underline{R}_w)^{-1}\underline{s}}{\underline{s}^H(\underline{R}_x \square \underline{R}_w)^{-1}\underline{R}_x(\underline{R}_x \square \underline{R}_w)^{-1}\underline{s}} \qquad (3.74)$$

Because of the Hadamard product nature of the relationship several things become apparent:
1. As the window function becomes ideal, the corresponding $\rho_w[n]=1$, and $\underline{R}_w=\underline{1}$, the Hadamard product identity (the all 1's matrix). The estimated covariance goes to the ideal, $\underline{\hat{R}}_y \to \underline{R}_x$, and there is no performance loss. This corresponds to an idealized power pattern $C_w(\psi)=$ $2\pi\delta(\psi)$. Such a power pattern requires an infinite number of elements in the array. For practical arrays there will be a bias to the resultant covariance matrix because of the non-zero width of $C_w(\psi)$, indicating that, in general, this approach will not converge to the optimal solution. Of particular interest is the impact of the bias, and whether there are conditions where the impact to performance is negligible.

2. It is difficult to simplify analysis because of the element-by-element nature of the operation. There is no easy expression for the inverse of a Hadamard product, and other properties that are available are not helpful in the analysis of normalized SINR loss. Thus, defined scenarios may be considered and simulated over the range of parameters, such as $(\psi_s-\psi_o)$ and $\sigma_n^2/\sigma_w^2$ in the single plane wave interferer case.

3. The particular form of the classical window functions used for spectral estimation result in $\underline{R}_w$ that is a normalized diagonally homogeneous correlation matrix, meaning it has a constant value on its main diagonal. From the eigenvalue majorization theorem, the eigenvalue spread of $\underline{R}_x \odot \underline{R}_w$ is less than or equal to the eigenvalue spread of $\underline{R}_x$. One can also arrive at the same conclusion by considering that: 1) the eigenvalues are bounded by the min/max of the power spectrum; and 2) the technique used here effectively convolves the underlying power spectrum with a smoothing window (the power pattern), which will decrease the resultant min/max of the smoothed spectrum compared to the original. This property may lower the condition number of the matrix, cond $$(\underline{A}) = \frac{\lambda_{max}(\underline{A})}{\lambda_{min}(\underline{A})};$$

however this property does not give any further insight into performance, since the matrix product, $\underline{R}_x \odot \underline{R}_w$, is biased compared to the ensemble covariance $\underline{R}_x$.

4. The analysis is for expected value, and assumes that the $\hat{P}_y(\psi)$ spectrum is the ideal $P_x(\psi)$ convolved with the function $C_w(\psi)$. In practice, classical power spectral density (PSD) techniques will average over the M snapshots to reduce the variability in the estimate of the spectrum.

Prototype Power Pattern

To assist in the normalized SINR loss analysis, a "prototype" window function may be defined. A power pattern, $C_w(\psi)$ may be defined by an ideal bandlimited portion, which may be useful for identifying the impacts of mainlobe width and a constant offset portion, which may be useful for identifying the impacts of sidelobes or spectral leakage. Given definition for these regions, the analysis is more straightforward and the two factors may be considered individually. Classically defined windows incorporate both features together, in some trade-off related to their design, making the analysis of individual window functions less insightful. The prototype window is defined herein using subscripts as follows: lb denotes local bias and relates to the main lobe region, bb denotes broadband bias and corresponds to the sidelobe levels. $C_w(\psi)$ is a periodic function with a period $2\pi$, and is defined explicitly over the region of support, $|\psi| \leq \pi$, as $$C_w(\psi) = C_{lb}(\psi) + C_{bb}(\psi) \tag{3.75}$$

The mainlobe is defined by an ideal bandlimited function $$C_{lb}(\psi) = \begin{cases} A_{lb} & |\psi| \leq \psi_{lb} \\ 0 & |\psi| > \psi_{lb} \end{cases} \tag{3.76}$$

and the sidelobe level is defined by a constant $$C_{bb}(\psi) = A_{bb}, |\psi| \leq \pi \tag{3.77}$$

The scale factors, $A_{lb}$ and $A_{bb}$, may be constrained according to the normalization $$\frac{1}{2\pi}\int_{-\pi}^{\pi} C_w(\psi)d\psi = 1 \tag{3.78}$$

By specifying two of the three parameters, $\{A_{lb}, A_{bb}, \psi_{lb}\}$, e.g., the latter two, and varying them separately, their respective influence on performance can be examined. This provides a general feel for behavior of normalized SINR loss using classical PSD techniques. As explained above, $E\{\hat{R}_y\} = \underline{R}_x \square \underline{R}_w$. Thus, it is sufficient to find $\underline{R}_w$ for the prototype window. For the definition in Eqn. (3.75), there is a closed form solution based on the parameters. Starting with the Fourier transform relationship $$\rho_w[n] = \frac{1}{2\pi}\int_{-\pi}^{\pi} C_w(\psi)e^{j\psi n}d\psi \tag{3.79}$$

substituting in the definition for $C_w(\psi)$ showing the explicit local and broadband bias terms $$\rho_w[n] = \frac{1}{2\pi}\int_{-\pi}^{\pi} [C_{lb}(\psi) + C_{bb}(\psi)]e^{j\psi n}d\psi \tag{3.80}$$

The solution includes two terms, $\rho_w[n] = \rho_{lb}[n] + \rho_{bb}[n]$. The first term, $\rho_{lb}[n]$, is:

$$\rho_{lb}[n] = \frac{1}{2\pi}\int_{-\pi}^{\pi} C_{lb}(\psi)e^{j\psi n}d\psi = A_{lb}(\psi_{lb}/\pi)\text{sinc}([\psi_{lb}/\pi]n) \tag{3.81}$$

where sin c (x) $\equiv \sin(\pi x)/(\pi x)$. The second term, $\rho_{bb}[n]$, is $$\rho_{bb}[n] = \frac{1}{2\pi}\int_{-\pi}^{\pi} C_{bb}(\psi)e^{j\psi n}d\psi = A_{bb}\delta[n] \tag{3.82}$$

The complete autocorrelation sequence, $\rho_w[n]$, is the sum of the two $$\rho_w[n] = A_{lb}(\psi_{lb}/\pi)\sin c([\psi_{lb}/\pi]m) + A_{bb}\delta[m] \tag{3.83}$$

Expressed in matrix form, where $\underline{R}_{lb,bb} = ((\rho_{lb,bb}[r-c]))_{r,c}$:

$$\underline{R}_w = \underline{R}_{lb} + \underline{R}_{bb} \tag{3.84}$$

The resultant expected value of the estimated covariance matrix is then $$E\{\hat{\underline{R}}_y\} = \underline{R}_x \square [\underline{R}_{lb} + \underline{R}_{bb}] \tag{3.85}$$

Observe in Eqn. (3.85) that the broadband bias term, $\underline{R}_{bb}$, is a diagonal matrix with constant diagonal $A_{bb}$. The overall affect of the broadband bias term is the same as a diagonal loading in that it increases the main diagonal of the estimated covariance matrix. This is accomplished as a multiplicative, not additive, effect.

The prototype window described by Eqn. (3.75) is not realizable with any array of finite length. So it is not possible to determine a set of coefficients, $\underline{w}$, that would result in a power pattern of this type. This does not prevent analysis, however, since it is assumed that the estimated spectra is available, $\hat{P}_y(\psi)=C_w(\psi) \ne P_{x,\psi}(\psi)$, and not how it was computed. The approach is to understand performance issues when using classical techniques, and to show where they work well and where they do not. These results can then guide development to extend the range of situations allowing useful operation.

Prototype Window Normalized SINR Loss

Eqn (3.84) may be used in the expression for SINR loss of Eqn. (3.74). The Hadamard product structure within the expression of Eqn. (3.74) prevents a more compact form. Strictly speaking, the value of $\xi$ found using Eqn. (3.74) is not a random variable but a constant, since the expected value of the estimated covariance, $E\{\hat{R}_y\}$, is being used. To understand the statistical behavior of $\xi$, one may insert the computational form of the estimated covariance given in Eqn. (3.65) into Eqn. (3.74). This is also not easily reducible to a more compact form.

The conclusion is that for this type of structured covariance matrix estimation algorithm, the normalized SINR loss cannot be simplified into an expression that does not involve the particular covariance, $\underline{R}_x$, for the problem. This is unlike sample covariance matrix methods, where the performance can be derived in closed form as a random variable and shown to be function of number of elements and snapshots only. Performance of this structured covariance method depends on the problem. Eqn. (3.74) can still be used to understand SINR loss performance, but the scenarios analyzed may be specified.

By specifying the parameters of the prototypical window function ([$A_{lb}$ or $A_{bb}$], $\psi_{lb}$), for particular types of interference problems, Eqn (3.74) may be used to predict performance. For example, the single plane wave interferer in uncorrelated noise case may be considered with a signal of interest not present. This case highlights some of the features of the approach.

Single Plane Wave Interferer

The impact of using CSS for the single plane wave in uncorrelated noise case may be analyzed using Eqn. (3.74). Normalized SINR loss may be computed as a function of distance between the desired signal direction of arrival and the interferer location in $\psi$-space, $\Delta\psi=(\psi_s-\psi_o)$. For each $\Delta\psi$ the difference between the per element INR and a fixed sidelobe level, $A_{bb}$, may be varied. This may be done, for example, for three values of $\psi_{lb}$, set to multiples of the mainlobe half width of the array, $$(1, 2, 3)\frac{2\pi}{N}.$$

By increasing $\psi_{lb}$ an indication of performance when using wider mainlobe windows or when operating below the design frequency may be determined.

Simulation results indicate that for CSS covariance matrix estimation based on classical power spectral based methods, near optimal SINR loss performance can be achieved when the interference has sufficient separation from the desired signal, or in the event the interferer is near the desired signal, its power per sensor element is substantially below the sidelobe level of the window used.

Analysis of a simple single plane wave interferer in white noise showed that the adaptive processor is relatively insensitive to estimation error of INR. Performance is more effected by wavenumber estimation accuracy in direct relation to the accurate placement of nulls, but acceptable performance is achievable in few or even one snapshot. The CR bound is proportional to $M^{-1}$ and $N^{-2}$, so a larger number of sensors is beneficial. This is in contrast to the closed form performance of sample covariance matrix techniques, where performance does not depend on the number of sensors, just the number interferers and snapshots (with use of diagonal loading). Covariance matrix estimates developed using classical power spectral estimation techniques were seen to be biased. The normalized SINR loss performance indicated that to broaden the conditions under which useful performance can be achieved an additional step of harmonic analysis may be used, including the detection and subtraction of line components from the data.

Structured Covariance Estimation with Multi-Taper Spectral Estimation (MTSE)

The performance of adaptive beamforming using covariance matrix estimates based on the wavenumber spectrum using classical spectral estimation techniques, e.g., power spectral distribution (PSD), is described above. The expected value of the estimated covariance when using PSD is biased, $E\{\underline{R}_{PSD}\}=\underline{R}_x \odot \underline{R}_w$, so in general adaptive beamformers based on the CSS covariance do not converge to the optimal solution. However, analysis of the SINR loss performance for the uniform linear array case, as function of interferer to desired signal spacing, $\Delta\psi$, window characteristics, and INR showed that performance is within a few tenths of a dB from optimal under some conditions.

To maintain good normalized SINR loss performance, the interferer should have sufficient separation from the desired signal, in proportion to the window mainlobe width, $\Delta\psi \ge 2\psi_{lb}-3\psi_{lb}$, with an interferer to noise ratio such that $(INR_{PE}+A_{bb}) \le 10 \log 10(N)$ (dB). To continue to achieve good performance with smaller separation, the condition $(INR_{PE}+A_{bb}) \ll 0$ (dB) may be used. Neither of these conditions can be guaranteed in practice. These concerns motivate use of multi-taper spectral estimation (MTSE), e.g., Thompson's MTSE, in forming the estimate of the frequency-wavenumber spectra instead of the classical techniques. This is for at least three reasons:

1. First, while the equivalent MTSE mainlobe width is larger than traditional window functions it provides two benefits: 1) averaging increased number of uncorrelated estimates of power within a particular band in wavenumber-space results in lower variance locally 2) estimates of the eigencoefficients within a particular band in wavenumber-space allow for direct formulation of a detection problem for line components based on the underlying model for the stationary process and the Cramér spectral representation theorem. This eliminates the need to design new detection procedures based on estimated spectrum only, such as local noise floor averaging, etc., and can be done prior to forming the covariance matrix.

2. The parameters, amplitude, frequency and phase of the detected line components may be used to coherently cancel (subtract) them from the data and the estimation process may be repeated on the residual. This process is known as harmonic analysis and can be carried out iteratively.

3. Combination of the various eigenspectra may be accomplished via an adaptive weighting mechanism designed to minimize local and broadband bias, which may result in an equivalent window with very low sidelobe level, e.g., below −60 dB.

Covariance from Spatial Spectra (CSS) with MTSE

The discussion below provides a procedural outline for using MTSE with harmonic analysis to estimate the frequency-wavenumber spectra used to form an estimate of the covariance matrix at the output of the array. The discussion considers an N element uniform linear array, and extension to more general geometries is considered further below. The process has a mixed spectrum, with K point source signals have independent, random complex-valued amplitudes, $$a_k(m) \stackrel{d}{\to} CN(0, \sigma_k^2).$$

M snapsnots are available for processing. The snapshot model is $$\underline{x}_m = \sum_{k=1}^{K} \underline{v}_k a_k(m) + \underline{n}_{b,m} + \underline{n}_{w,m}, \underline{x}_m \stackrel{d}{\to} CN_N \quad (4.1)$$

An estimate for the frequency-wavenumber spectra, for both process and sensor noise, $\hat{P}_x(\psi)$, may be formed using MTSE and used to compute an estimate of the covariance.

$$\hat{R}_x = (2\pi)^{-1} \int_{-\pi}^{\pi} \hat{P}_x(\psi) \underline{v}_\psi(\psi) \underline{v}_\psi^H(\psi) d\psi \quad (4.2)$$

The integral in Eqn. (4.2) may be implemented using a numerical summation $$\hat{R}_x = \frac{\Delta k}{2\pi} \sum_{b=-L/2}^{L/2-1} \hat{P}_x(l\Delta k) \underline{v}(l\Delta k) \underline{v}^H(l\Delta k) \quad (4.3)$$

Alternatively, for a uniform linear array one can take advantage of the frequency-wavenumber spectrum and covariance being single dimension, and relate them by the 1-D inverse Fourier transform $$\hat{R}_x[n] = \frac{1}{2\pi} \sum_{l=0}^{L-1} \hat{P}_x(l\Delta k) e^{jl\Delta kn} \quad (4.4)$$

and populate the covariance matrix as $\hat{\underline{R}}_x = ((\hat{R}_x[r-c]))_{r,c}$. Fast Fourier transform techniques may be a particularly efficient implementation when the value of L permits their use.

Number of Tapers, D

To exploit the efficiencies of FFT based processing when using MTSE to estimate the spectrum, $\hat{P}_x(\psi)$, the spectral estimation may maintain a fixed resolution in normalized wavenumber space, $\psi = -k_z d$. This allows a single set of tapers to be used. A width of the analysis region, W, may be chosen. Typically choices are NW=1.5, 2.0, 2.5. The number of significant tapers supported by a particular width, W, is D=2 NW−1. The case of NW=1 results in a single usable taper and reverts to a standard classical PSD method. No harmonic analysis may be used in this scenario. As a practical matter, D=2 NW may be selected, resulting in a lower concentration for the last taper. This may increase the number of basis vectors used in the harmonic analysis detection statistic. The D tapers may be designed according to an appropriate eigenvalue or generalized eigenvalue problem. For the ULA case, the resultant tapers are a discrete prolate spheroidal sequences.

$$q_d(n) = \text{dpss}(N, NW), d=1, \ldots, D \quad (4.5)$$

FFT and Zero-Padding

Snapshot data may be windowed and fast Fourier transformed to produce the MTSE eigencoefficients $$y_m^{(d)}(l) = \sum_{n=0}^{N-1} x_m(n) q_d(n) \exp(-j2\pi ln/N_{FFT}) \quad (4.6)$$

for the set of points $l=0, \ldots, N_{FFT}-1$. The FFT size, $N_{FFT}$, may be specified in Eqn. (4.6) independently from the number of array elements, N. The nominal set of points would be $N_{FFT}=N$, with a greater number of points, $N_{FFT}>N$, generated using the zero-padding technique ($N_{FFT}<N$ is possible using polyphase techniques but not likely a case of interest here). The zero-pad operation may be useful for several reasons. First, the detection process within harmonic analysis performs a subtraction of discrete harmonic (point source) components in the data. This is done by estimating the unknown line component parameters: wavenumber, amplitude, and phase. Many algorithms exist for estimating parameters of sinusoids in noise. Assuming that multiple interferers are sufficiently separated, these parameters may be conveniently estimated optimally using FFT techniques. The precision to which this can be accomplished, without additional techniques, such as curve fitting between FFT bins, is directly proportional to the fineness of the FFT spacing in wavenumber space. The zero-padding operation is an efficient method for increasing this fineness. The zero-padding is also useful in the smoothing operation referred to as free parameter expansion, FPE.

Discrete Line Component Processing (Harmonic Analysis)

Harmonic analysis algorithm operates on the eigencoefficients, $Y_{m,d}(l)$, to determine the presence of discrete line components. A detection statistic is computed as a ratio of the power in the line component subspace to the power outside that subspace in the region $[f_o-W<f\leq f_o+W]$.

$$F(f_o) = \frac{\sum_{m=1}^{M} \underline{y}_m^H(f_o) P_q \underline{y}_m(f_o)}{\sum_{m=1}^{M} \underline{y}_m^H(f_o) P_q^\perp \underline{y}_m(f_o)} \underset{H_o}{\overset{H_1}{\gtrless}} \gamma TH \quad (4.7)$$

The choice of threshold, γTH, can be determined using a Neyman-Pearson criteria assuming Gaussian noise statistics. Practically, it may also be useful to define a minimum limit allowable for detection, e.g., $\gamma_{min}^{(dB)}=10 \log_{10}(\gamma_{min})$, such that $$\gamma TH = \max(\gamma_{NP}, \gamma_{min}) \quad (4.8))$$

with $\gamma_{min}^{(dB)}=3$ dB typically. This reduces excessive false detections and has minimal impact on overall performance, since the harmonic analysis is used primarily to eliminate high powered, not low powered, discrete interference. This test is valid for a single line component present within the analysis region, $[f_o-W \leq f \leq f_o+W]$. If the interference environment is dense with respect to the array resolution, additional tests such as a double F line test may be appropriate.

For a detected line component, it may be assumed that the wavenumber remains constant across all snapshots. For the $k^{th}$ line component the wavenumber, $\psi_k$, is used to estimate the remaining parameters per snapshot and form the overall covariance matrix. With sufficient zero-padding, $\psi_k$, can be estimated as $$\hat{\psi}_k = \underset{\psi}{\operatorname{argmax}} F(\psi) > \Upsilon TH \qquad (4.9)$$

The remaining parameters may be estimated per snapshot using matched filter techniques. Defining the reference sinusoid waveform $$\underline{s}_{ref,k} = ((e^{j\psi_k n}))_n \qquad (4.10)$$

the complex-amplitude and interferer power are estimated as $$\hat{a}_k(m) = \frac{1}{N} \underline{s}_{ref,k}^H \underline{x}_m, \quad \hat{\sigma}_k^2 = \frac{1}{M} \sum_{m=1}^{M} |\hat{a}_k(m)|^2 \qquad (4.11)$$

While not required for the processing, the interferer to noise ratio for each detected discrete component may be estimated. This is useful when generating a composite spectrum for visualization. A composite spectrum may be generated based on the estimated continuous background spectrum of the residual snapshot data (post harmonic analysis), with numerical insertion of the discrete components. The insertion technique may use knowledge of the INR to properly represent the uncertainty of a particular estimate.

$$I\hat{N}R_k = \frac{\sum_{m=1}^{M} |\hat{a}_k(m)|^2}{(D-1)^{-1} \sum_{m=1}^{M} \underline{y}_m^H(\hat{\psi}_k) \underline{P}_{\bar{q}}^{\perp} \underline{y}_m(\hat{\psi}_k)} \qquad (4.12)$$

Influence of the K detected components may be removed from the snapshot data to produce the residual data snapshots, $\underline{x}_{b,m}$. This can be accomplished with one of two methods.

Method 1. Coherent Subtraction $$\underline{x}_{b,m} = \underline{x}_m - \sum_{k=1}^{K} \hat{a}_k(m) \underline{s}_{ref,k} \qquad (4.13)$$

Method 2. Null Projection $$\underline{P}_{\bar{k}}^{\perp} = \underline{I} - \underline{s}_{ref,k} \left( \underline{s}_{ref,k}^H \underline{s}_{ref,k} \right)^{-1} \underline{s}_{ref,k}^H \qquad (4.14)$$

$$\underline{P}_K^{\perp} = \prod_{k=1}^{K} \underline{P}_k^{\perp} \qquad (4.15)$$

$$\underline{x}_{b,m} = \underline{P}_K^{\perp} \underline{x}_m \qquad (4.16)$$

Continuous Background Spectrum

Once harmonic analysis is complete the residual snapshot data may be used to compute a final smooth, continuous background spectrum. The snapshot data may be windowed and fast Fourier transformed to produce eigencoefficients $$y_{b,m}^{(d)}(l) = \sum_{n=0}^{N-1} x_{b,m}(n) q_d(n) \exp(-j2\pi l n / N_{FFT}) \qquad (4.17)$$

The eigencoefficients may be used to produce the individual eigenspectra.

$$\hat{P}_b^{(d)}(l) = |y_{b,m}^{(d)}(l)|^2 \qquad (4.18)$$

The individual eigenspectra may be linearly combined according to a set of weights $$\hat{P}_{x,b}(l) = \sum_{d=1}^{D} h_d(l) \hat{P}_b^{(d)}(l) \qquad (4.19)$$

The weights, $h_d(k)$, may be fixed (e.g., for an underlying white spectrum) or may be determined adaptively.

Covariance Matrix Computation

The final estimate of the covariance matrix may be formed using line component and continuous background spectrum products.

$$\hat{\underline{R}}_a = \operatorname{diag}(\sigma_1^2, \sigma_2^2, \ldots, \sigma_K^2) \qquad (4.20)$$

$$\hat{\underline{V}} = [\underline{s}_{ref,1}, \underline{s}_{ref,2}, \ldots, \underline{s}_{ref,K}] \qquad (4.21)$$

$$\hat{\underline{R}}_{MTSE} = \hat{\underline{V}} \hat{\underline{R}}_a \hat{\underline{V}}^H + (2\pi)^{-1} \int_{-\pi}^{\pi} \hat{P}_{x,b}(\psi) \underline{v}_{\psi}(\psi) \underline{v}_{\psi}^H(\psi) d\psi \qquad (4.22)$$

Composite Spectrum Generation

In a particular embodiment, the wavenumber spectrum, $\hat{P}_x(\psi)$, may be visualized directly in addition to forming the covariance matrix. The smooth continuous component is the direct output from the MTSE processing of the residual snapshot data, $\underline{x}_{b,m}$, yielding $\hat{P}_{x,b}(\psi)$. The discrete components previously estimated and subtracted are then added back into the numerical spectrum. Two points that may be considered in this context are: 1) numerical power should conserved and 2) better resolution or performance than is available with the data should not be implied.

Unbiased Spectral Estimate in White Noise

In this type of spectral estimation, each point in the spectral estimate is scaled such that it is an unbiased estimate of the noise power for a white noise input. In terms of classical PSD techniques, this implies that the window function has been scaled such that $\underline{w}^H \underline{w} = 1.0$. MTSE tapers may be scaled in accordance with this approach. Plane wave or discrete sinusoidal components experience a processing gain due to the coherent gain of the window function. The maximum gain may be obtained using $$\underline{w} = \frac{1}{\sqrt{N}}\underline{1},$$

and equates to 10 log 10(N) dB. Thus, a snapshot, $$\underline{x}_m \xrightarrow{d} CN_N(\underline{0}, \sigma^2 \underline{I}),$$

will produce an expected value at any power spectral estimate, $E\{\hat{P}(\psi)\}=\sigma 2$, while a snapshot corresponding to a plane wave component, $\underline{x}_m = A_o \underline{v}_\psi(\psi_o)$ will produce a value of $E\{\hat{P}(\psi_o)\} \leq NA_o^2$. The coherent gain of the MTSE tapers can be found by computing $$CG_{MTSE} = \frac{1}{D}\sum_{d=1}^{D}\left|\sum_{n=0}^{N-1} q_d(n)\right|^2 \quad (4.23)$$

Because the choice of coherent gain is somewhat arbitrary for the re-inserted spectral component, it may be convenient to use the maximum theoretical processing gain, CG=10 $\log_{10}$ (N), such that the composite spectrum looks similar, on a relative scale, to that obtained using MVDR techniques.

$$\hat{P}_{dB}(\psi_k) = 10\log_0\left(\frac{1}{M}\sum_{m=1}^{M}|A_k(m)|^2\right) + 10\log_{10}(N) \quad (4.24)$$

Normalized SINR loss performance was assessed via simulation for a number of interference and noise scenarios. Performance was seen to converge with very few snapshots to near optimal, and in many cases with fewer snapshots than interferers. These simulation results are significantly better than what is achievable using diagonal loading or comparable reduced rank techniques. The simulations considered line component, spatially spread, and mixed spectra conditions. It was observed that performance could be improved by increasing the estimation accuracy of the harmonic analysis step to provide better cancellation of the line components within the data.

Correlated Signal and Interference

One of the properties of a wide sense stationary narrowband space-time process (as considered above) is that it can be represented as a sum of uncorrelated plane waves, distributed across all directions of arrival to the array. This model does not describe every situation that may be encountered. An example of another case of interest is when there is correlation between two or more plane wave components observed by the array. This may occur in situations of multipath or smart jamming. Under these conditions the covariance is function of absolute position, not relative, and the process is not wide sense stationary. Failure to account for the correlation within the data can lead to signal cancellation, and an overall loss in output SNR.

In a particular embodiment, the snapshot data may include both the signal of interest and interference correlated with it. Wavenumber or spatial spectra provide no correlation information. Covariance from spatial spectrum (CSS) may provide a level of robustness against the effects of correlated signal and interference on performance. CSS may be biased in two ways. A first bias is in a manner similar to the bias discussed above for the wide sense stationary process case due to the method of spectral estimation. The second bias is specific to the correlation within the data. Performance may be assessed in comparison to CSS operating on uncorrelated data, as well with the effective SINR metric, an appropriate measure of output SINR in the correlated signal and interference scenario. Using simulations, the bias attributable to the correlation component was found to have negligible impact on performance.

Covariance for Correlated Signals

In the case where the point source signals are correlated the space-time process is not spatially stationary. Referring back to the Cramér spectral representation of the stationary space-time process, the correlation violates the condition that disjoint regions in wavenumber space be uncorrelated. In terms of the covariance, the effect is seen as a dependence on absolute as well as relative position. This is visible when examining the covariance matrix based on the model for the snapshot data, $\underline{x}_m$.

$$\underline{x}_m = \sum_{k=1}^{K} \underline{v}_k a_k(m) + \underline{n}_m = \underline{V}\underline{a}_m + \underline{n}_m \quad (5.1)$$

where the background noise component and sensor noise component are combined together, $$\underline{n}_m = \underline{n}_{b,m} + \underline{n}_{w,m}, \underline{n}_m \xrightarrow{d} CN_N(\underline{0}, \underline{R}_n).$$

The covariance matrix is $$E\{\underline{x}_m \underline{x}_m^H\} = \underline{R}_x = \underline{V}\underline{R}_a \underline{V}^H + \underline{R}_n \quad (5.2)$$

where $\underline{R}_a = E\{\underline{a}_m \underline{a}_m^H\}$. At least in this context, $\underline{R}_a$ is not a diagonal matrix. The off diagonal terms represent the cross-correlation between the plane waves. $\underline{R}_a$ can be expressed as a combination of a diagonal matrix and an off-diagonal matrix.

$$\underline{R}_a = \underline{R}_{a,U} + \underline{R}_{a,C} \quad (5.3)$$

The subscript U is used to reinforce that the diagonal matrix relates to uncorrelated plane waves, while the subscript C is used to reinforce that the off-diagonal matrix corresponds to the terms representing the correlation. Thus, $$\underline{R}_x = \underline{V}\underline{R}_{a,U}\underline{V}^H + \underline{R}_n + \underline{R}_{a,C}\underline{V}^H \quad (5.4)$$

The first two terms of Eqn. (5.4) correspond to the covariance for the stationary process model. This portion of the overall covariance as is referred to herein as:

$$\underline{R}_{x,U} = \underline{V}\underline{R}_{a,U}\underline{V}^H + \underline{R}_n \quad (5.5)$$

The remaining portion, due to the off-diagonal entries of the matrix $\underline{R}_a$, is referred to in a similar fashion.

$$\underline{R}_{x,C} = \underline{V}\underline{R}_{a,C}\underline{V}^H \quad (5.6)$$

Expected Value

To proceed in analyzing the expected value of the covariance matrix estimate, CSS with classical power spectral estimation may be used. As explained above, for a stationary process:

$$\underline{x}_m = \sum_{k=1}^{K} \underline{v}_k a_k(m) + \underline{n}_m, \underline{x}_m \xrightarrow{d} CN_N(\underline{0}, \underline{V}R_{a,U}\underline{V}^H + \underline{R}_n) \quad (5.7)$$

where the subscript U is used to reinforce that the process is stationary and that $\underline{R}_{a,U}$ is a diagonal matrix. The CSS covariance matrix estimate may be found from the windowed (tapered) snapshots, $\underline{y}_m = \underline{x}_m \odot \underline{w}$, as $$\hat{\underline{R}}_y = DSR(\underline{R}_{w,SCM}) = DSR\left(\frac{1}{M}\sum_{m=1}^{M} \underline{y}_m \underline{y}_m^H\right) \quad (5.8)$$

with expected value $E\{\hat{\underline{R}}_y\} = \underline{R}_{x,U} \square \underline{R}_w$. Alternatively, the windowed snapshot model for this case may be written as:

$$\underline{y}_m = \sum_{k=1}^{K} (\underline{v}_k \square \underline{w}) a_k(m) + (\underline{n}_m \square \underline{w}) \quad (5.9)$$

$$= \sum_{k=1}^{K} \underline{\overline{v}}_k a_k(m) + \underline{\overline{n}}_m$$

$$= \underline{\overline{V}} \underline{a}_m + \underline{\overline{n}}_m$$

so that the tapered snapshots are distributed as $$\underline{y}_m \xrightarrow{d} CN_N(\underline{0}, \underline{\overline{V}}R_{a,U}\underline{\overline{V}}^H + \underline{\overline{R}}_n) \quad (5.10)$$

From Eqn. (5.8), DSR linearity properties and Eqn. (5.10):

$E\{\hat{\underline{R}}_y\} = DSR\ E\{\underline{y}_m \underline{y}_m^H\} = DSR(\underline{\overline{V}}R_{a,U}\underline{\overline{V}}^H + \underline{\overline{R}}_n)$ The two expressions for the expectation are equivalent. Thus, $$\underline{R}_{x,U} \square \underline{R}_w = DSR(\underline{\overline{V}}R_{a,U}\underline{\overline{V}}^H + \underline{\overline{R}}_n) \quad (5.11)$$

The plane wave components may be correlated, so that $$\underline{y}_m \xrightarrow{d} CN_N(\underline{0}, \underline{\overline{V}}[R_{a,U} + R_{a,C}]\underline{\overline{V}}^H + \underline{\overline{R}}_n) \quad (5.12)$$

Eqn. (5.8) may be used, so that the expected value of the estimated covariance is $$E\{\hat{\underline{R}}_y\} = DSR(\underline{\overline{V}}[R_{a,U} + R_{a,C}]\underline{\overline{V}}^H + \underline{\overline{R}}_n) \quad (5.13)$$

Using the DSR properties, the expected value includes two terms $$E\{\hat{\underline{R}}_y\} = DSR(\underline{\overline{V}}R_{a,U}\underline{\overline{V}}^H + \underline{\overline{R}}_n) + DSR(\underline{\overline{V}}R_{a,C}\underline{\overline{V}}^H) \quad (5.14)$$

From Eqn. (5.11), the first term is the CSS with classical spectral estimation covariance as if the process where in fact stationary, so the final result is $$E\{\hat{\underline{R}}_y\} = \underline{R}_{x,U} \square \underline{R}_w + DSR(\underline{\overline{V}}R_{a,C}\underline{\overline{V}}^H) \quad (5.15)$$

Eqn. (5.15) implies that for a correlated signal and interference problem, the CSS with classical spectral estimation technique produces a covariance matrix estimate that is an estimate of the covariance as if the process were uncorrelated, $\underline{R}_{x,U} \odot \underline{R}_w$, with an additional bias term DSR $(\underline{\overline{V}}R_{a,C} \underline{\overline{V}}^H)$. In terms of addressing signal cancellation, the first term has eliminated the correlation in the estimated covariance.

Thus, an adaptive beamformer based on this part of the estimate would be expected to have a performance consistent with the discussion above, even if the process itself has correlated components. The impact of the remaining bias term on performance is discussed further below.

CSS Performance with Correlated Signal and Interference

Correlated signal and interference introduces the potential for signal cancellation for some adaptive beamforming algorithms. A minimum variance distortionless response (MVDR) beamformer may be derived to be optimal when observing uncorrelated noise and interference only, a spatially stationary space-time process. The MVDR approach can be extended when both the desired signal and interference are present in the snapshot data, the so called minimum power distortionless response (MPDR) beamformer. MPDR attempts to minimize output power while constrained to be distortionless in the direction of the desired signal, $w_{MPDR} \propto \underline{R}^{-1} \underline{s}$. This allows the desired signal through due to the distortionless constraint, but in the event of correlated interference the processor may use the interferer to destructively cancel the desired signal in the overall attempt to minimize output power.

Relative Contribution of Correlated and Uncorrelated Components

Questions that may be of interest for adaptive beamformers based upon the covariance from spatial spectrum estimate, referred to as $\hat{\underline{R}}_{CSS}$, include: 1) does $\hat{\underline{R}}_{CSS}$ convey any information regarding the correlation component in the data if it exists, and 2) how well do beamformers based upon $\hat{\underline{R}}_{CSS}$ perform compared to an adaptive processor using a covariance for the data where there is no correlation present? As explained above, the expected value of $\hat{\underline{R}}_{CSS}$ contains the covariance if the data were uncorrelated plus an additional term.

$$E\{\hat{\underline{R}}_{CSS}\} = \underline{R}_{x,U} \square \underline{R}_w + DSR(\underline{V}R_{a,C}\underline{V}^H) \quad (5.16)$$

$$= R_{CSS,U} + R_{CSS,C}$$

The influence of the second term can be considered a bias. By considering the case of two interferers with no noise component, explicit expressions for the bias term show that for redundancy averaging the bias is not guaranteed to go to zero even if the array length is extended infinitely. Using the ratio of the Froebenius norm squared, $\|\|_F^2$, of the bias component to the unbiased component, as array length is extended to infinity, the ratio goes to zero. This implies that while the bias term exists, its impact as measured by the relative power indicated by $\|\|_F^2$ may become insignificant as the array length increases.

A similar line of analysis may be followed using a two tone scenario with no noise. The signals may have angles of arrival denoted as $\psi_1, \psi_2$ with corresponding array manifold response vectors, $\underline{v}_1, \underline{v}_2$, and respective variances $\sigma_1^2, \sigma_2^2$. The correlation between the two may be described by a magnitude and phase as $\zeta = E\{a_1(m)a_2^*(m)\} = A_\zeta e^{j\square_\zeta}$. The ensemble covariance may include correlated and uncorrelated terms.

$$R = \underline{V}R_{a,U}\underline{V}^H + \underline{V}R_{a,C}\underline{V}^H \quad (5.17)$$

$$= R_U + R_C$$

Of interest is where the relative ratio of $\|\|\|_F^2$ shows that the bias term is insignificant within $E\{\hat{\underline{R}}_{CSS}\}$, compared to the same ratio for the ensemble covariance, $$\frac{\|\hat{R}_{CSS,C}\|_F^2}{\|\hat{R}_{CSS,U}\|_F^2} \square \frac{\|R_C\|_F^2}{\|R_U\|_F^2} \quad (5.18)$$

When Eqn. (5.18) is valid, it indicates that CSS has substantially diminished the contributed of the correlated component, as measured using $\|\|\|_F^2$. Consider the problem for an N element uniform linear array. The uncorrelated and correlated components for the ensemble covariance are $$\|R_U\|_F^2 = N^2(\sigma_1^4 + \sigma_2^4) + 2\sigma_1^2\sigma_2^2|\underline{v}_1^H\underline{v}_2|^2 \quad (5.19)$$

$$\|R_C\|_F^2 = 2\sigma_1^2\sigma_2^2 A_\zeta^2 \left[N^2 + \cos(2\square\zeta + \Delta\psi[N-1])\frac{\sin^2(\Delta\psi N/2)}{\sin^2(\Delta\psi/2)}\right] \quad (5.20)$$

where $\Delta\psi = \psi_2 - \psi_1$. The expressions for the components of $E\{\hat{\underline{R}}_{CSS}\}$ use the following property. For a Hermitian, Toeplitz matrix, $$\underline{A} = \begin{pmatrix} \rho[0] & \rho^*[0] & \rho^*[2] & \cdots \\ \rho[1] & \rho[0] & \rho^*[1] & \\ \rho[2] & \rho[1] & \rho[0] & \ddots \\ \vdots & & \ddots & \ddots \end{pmatrix} \quad (5.21)$$

The Froebenius norm squared of $\underline{A}$ is $$\|\underline{A}\|_F^2 = \sum_{n=-(N-1)}^{N-1}(N-|n|)|\rho[n]|^2 \quad (5.22)$$

This yields a simplified expression for the $\|\|\|_F^2$ of the uncorrelated component of $E\{\hat{\underline{R}}_{CSS}\}$.

$$\|\hat{R}_{CSS,U}\|_F^2 = \sum_{n=-(N-1)}^{(N-1)}(N-|n|)|\rho_w[n]|^2[(\sigma_1^4+\sigma_2^4)+2\sigma_1^2\sigma_2^2\cos(\Delta\psi n)] \quad (5.23)$$

where $\rho_w[n]$ is the sample autocorrelation of the taper used, $\underline{w}$. The correlated component cannot be similarly reduced because of the summation term in the sample autocorrelation, $\rho_{CSS,C}[n]$, with a simplest expression for arbitrary $\underline{w}$ given as $$\|\hat{R}_{CSS,C}\|_F^2 = \sum_{n=-(N-1)}^{N-1}(N-|n|)|\rho_{CSS,C}[n]|^2 \quad (5.24)$$

where $$\rho_{CSS,C}[n] = \quad (5.25)$$

$$\sum_{r=n}^{N-1}\sigma_1\sigma_2 w(r)w^*(r-n)[\zeta e^{j\psi_2 r - \psi_1[r-n]} + \zeta^* e^{j\psi_1 r - \psi_2[r-n]}]$$

$$n \geq 0, \; \rho_{CSS,C}[-n] = \rho_{CSS,C}^*[n]$$

$$|\rho_{CSS,C}[n]|^2 = \quad (5.26)$$

$$A_\zeta^2 \sigma_1^2 \sigma_2^2 \left|\sum_{r=n}^{N-1} w(r)w^*(r-n)[e^{j\psi_2 r - \psi_1[r-n]+\square\zeta} + \rho^* e^{j\psi_1 r - \psi_2[r-n]-\square\zeta}]\right|^2$$

Normalized SINR Loss w.r.t. Uncorrelated Ensemble Covariance

Normalized SINR loss provides a useful performance metric for practical array lengths. Because MVDR is not designed for the correlated signal and interference case, normalized SINR loss calculations based on the ensemble covariance containing the correlation may be inappropriate. For example, they do not predict the detrimental effects of the signal cancellation described earlier. The normalized SINR loss may be used to understand performance, and the ensemble covariance may be used for the uncorrelated data scenario, $\underline{R}_{x,U}$, as the reference covariance. This effectively compares the performance of CSS with the optimal beamformer as if there were no correlation contained in the data. The subscript $\underline{R}_C$ is used to indicate that this is the normalized SINR loss for correlated data case.

$$\xi_{R_C} = \frac{\underline{s}^H(\hat{R}_{CSS,U}+\hat{R}_{CSS,C})^{-1}\underline{s}}{\underline{s}^H \underline{R}_{x,U}^{-1}\underline{s}} \times \quad (5.28)$$

$$\frac{\underline{s}^H(\hat{R}_{CSS,U}+\hat{R}_{CSS,C})^{-1}\underline{s}}{\underline{s}^H(\hat{R}_{CSS,U}+\hat{R}_{CSS,C})^{-1}\underline{R}_{x,U}(\hat{R}_{CSS,U}+\hat{R}_{CSS,C})^{-1}\underline{s}}$$

As a second measure of performance in addition to $\xi_{R_C}$, which is an absolute measure, the relative performance compared to CSS when there is no correlation within the data may be of interest. This performance is referred to as $\xi_{R_C}$, where $$\xi_{R_U} = \frac{\underline{s}^H(\hat{R}_{CSS,U})^{-1}\underline{s}}{\underline{s}^H \underline{R}_{x,U}^{-1}\underline{s}} \cdot \frac{\underline{s}^H(\hat{R}_{CSS,U})^{-1}\underline{s}}{\underline{s}^H(\hat{R}_{CSS,U})^{-1}\underline{R}_{x,U}(\hat{R}_{CSS,U})^{-1}\underline{s}} \quad (5.29)$$

The difference between the performance measures of Eqn. (5.28) and Eqn. (5.29) is $$\Delta\xi_{dB} = \xi_{R_C}^{dB} - \xi_{R_U}^{dB} \quad (5.30)$$

where $\xi_{dB} = -10\log_{10}\xi$.

Simulation was performed for a case of an N=32 uniform linear observing correlated signal and interference. The simulation determined a predicted normalized SINR loss (dB) of CSS with classical spectral estimation as a function of separation between the sources and the correlation angle with correlation magnitude fixed at $\zeta=1$. Performance was determined with respect to an optimal processor using an ensemble covariance where the signal and interference were uncorrelated. Such a processor may be the best possible when a goal is to reduce the impact of the correlation in the data. The simulated performance was within 0.2 dB almost everywhere, except when the sources were very close. Thus, the simulations indicate that CSS may perform nearly identically whether the signal and interference are correlated or not.

Results of the simulations indicate that while $E\{\hat{R}_{CSS}\}$ has a bias component when correlated signal and interference are present, the impact of the bias component is negligible as performance is nearly identical to the uncorrelated signal and interference case. Covariance estimates based on frequency wavenumber spectrum have a decorrelating effect when signal and interference are correlated, and reduce the potential for signal cancellation to negatively impact performance. These results indicate that CSS techniques should perform consistently in the presence of correlated signal and interference, regardless of correlation coefficient or angle. Also, the performance should be in line with CSS performance as if the data were uncorrelated.

Redundancy Averaging

Redundancy averaging may be used to address a correlated signal and interference problem. Redundancy averaging takes advantage of the multiple available estimates of the space-time correlation at a given spatial lag by averaging them, and then generates a covariance matrix using the averaged values. For the uniform line array, this amounts to replacing diagonals in the sample covariance matrix with the average diagonal values. For redundancy averaging, an averaged diagonal value may be defined for the $n^{th}$ diagonal for the $m^{th}$ snapshot, $\underline{x}_m=((x_m[n]))_n$ $$\rho_{RA,m}[n] = \frac{1}{N-|n|}\sum_{\beta=0}^{N-1} x_m[\beta]x_m^*[\beta-n] \quad (5.31)$$

where it is assumed that the sequence $x_m[\beta]=0$ for $\beta<0$, $\beta\geq N$. The sample autocorrelation for the each snapshot, $\underline{x}_m$, is $$\rho_{x,m}[n] = \sum_{\beta=0}^{N-1} x_m[\beta]x_m^*[\beta-n] \quad (5.32)$$

Eqn. (5.31) applies a sample autocorrelation, $\rho_w[n]$, to the data sample autocorrelation, where $$\rho_w[n] = \frac{1}{N-|n|} \quad (5.33)$$

With these, the redundancy averaged values of Eqn. (5.31) can be written as $$\rho_{RA,m}[n]=\rho_{x,m}[n]\rho_w[n] \quad (5.34)$$

The final values may be averaged over all snapshots, $$\rho_{RA}[n] = \frac{1}{M}\sum_{m=1}^{M} \rho_{RA,m}[n].$$

The covariance matrix for redundancy averaging is then formed from the sequence as $$\underline{R}_{RA}=((\rho_{RA}[r-c]))_{r,c} \quad (5.35)$$

In terms of the DSR operation, $$\underline{R}_{RA}=DSR(\underline{R}_{SCM})\odot \underline{T}_{RA} \quad (5.36)$$

where $$\underline{T}_{RA}=((\rho_w[r-c]))_{r,c} \quad (5.37)$$

By way of comparison to the CSS technique discloses herein, the DSR operation in Eqn. (5.8), which is related to the CSS technique, is defined as sum, not average. The particular window sample autocorrelation, $\rho_w[n]=(N-|n|)^{-1}$, used for redundancy averaging results in an unbiased expected value, $E\{\rho_{RA}[n]\}=R_x[n]$ and $E\{\underline{R}_{RA}\}=\underline{R}_x$, if the data is uncorrelated. However, it is also results in $\underline{R}_{RA}$ being an indefinite matrix. This is a familiar result in the context of time series analysis, as Eqn. (5.31) is the form of the unbiased estimator for the auto-correlation of a sequence.

While unbiased, its form in Eqn. (5.34) shows the sequence is a product of two functions. The Fourier transform of this product is the estimate of the power spectral density. It is the convolution $$\hat{P}_{RA}(\psi) = \frac{1}{2\pi}\int_{-\pi}^{\pi} C_w(\psi-\beta)\hat{P}_{px,\psi}(\beta)d\beta \quad (5.38)$$

where $\hat{P}_{px,\psi}(\psi)=F(\rho_x[n])$ and $C_w(\psi)=F(\rho_w[n])$. For the particular $\rho w[n]$ used in redundancy averaging, $C_w(\psi)$ is not strictly greater than zero, and as a result portions of $\hat{P}_{RA}(\psi)$ may become negative valued. This is an invalid condition for a power spectral density. In its matrix form, this condition presents itself by making the covariance $\underline{R}_{RA}$ indefinite. This is undesirable, and is particular concern for the redundancy averaging approach.

Covariance Matrix Tapers

Covariance matrix tapers is a technique that provides a measure of robustness to sample covariance matrix processing by modifying the sample covariance matrix with a taper matrix, $\underline{T}_{CMT}$, according to $$\underline{R}_{CMT}=\underline{R}_{SCM}\odot \underline{T}_{CMT} \quad (5.39)$$

The taper matrix, $\underline{T}_{CMT}$, is designed specifically to impart null widening properties, diagonal loading, or other features. The taper matrix is positive semi-definite, $\underline{T}_{CMT}\geq 0$, and Hermitian, $\underline{T}_{CMT}=\underline{T}_{CMT}^H$. Additionally, the $\underline{T}_{CMT}$ may be a normalized diagonally homogeneous (NDH) matrix, meaning it is a constant down its main diagonal. Because it is based on the sample covariance matrix, CMT does not attempt to address the correlated signal and interference condition. Additional processing, such as spatial smoothing is necessary to mitigate signal cancellation.

Comparison Summary

Thus, the CSS technique disclosed herein provides benefits found in RA and CMT as well as additional benefit. The CSS technique uses the DSR operation which is beneficial for correlated signal and interference. As additional positive attributes, CSS maintains positive definiteness with reasonable restrictions on the choice of window function and resultant power spectral density estimate. The DSR processing provides additional data averaging, or alternatively an increase in effective sample size over CMT which uses only the sample covariance matrix.

Non-Ideal Array Manifold Response

Certain CSS methods disclosed herein assume an underlying structure based upon the observed narrowband space-time process including sums of physically propagating plane waves. For an array of ideal omnidirectional sensors, the array manifold response takes on a form based on the complex-exponential, $\underline{v}(\underline{k})=((\exp[-j\underline{k}^T\underline{p}_n]))_n$. Real-world sensors and arrays may exhibit perturbations to this ideal response that alter the form of the encountered covariance from its assumed structure. For a uniform linear array, the ideal manifold response results in a Toeplitz covariance matrix. With array manifold response error, this Toeplitz structure may no longer hold. This is similar to the effect encountered when investigating the correlated signal and interference scenario. The ML estimate of an unstructured covariance is the sample covariance matrix, and the set of algorithms that build upon it are most applicable if the underlying problem is unstructured.

Non-ideal array manifold responses and their impact on structured covariance beamformer performance are discussed below. A technique to mitigate the impact based on data already available via CSS with MTSE processing is described. This is done by estimating the array manifold response corresponding to detectable line components in the spectrum, since these typically dominate the overall performance, and incorporating this discrete set of non-ideal response vectors into the covariance.

This approach differs from techniques that concentrate on estimating the steering vector (such as a principal eigenvector of a clutter covariance matrix for radar) or that concentrate on estimates of the actual sensor positions (such as for towed arrays). Such techniques may use GPS data for the tow vessel and a water pulley model for the array, and algorithms to optimize the "focus" or sharpness of the wavenumber spectrum or observations of broadband signals in the environment. As a narrowband processing algorithm operating directly on the snapshot data, the CSS technique disclosed herein may be valuable in concert with legacy techniques as the array displacement becomes significant, in particular in light of the similarity between the circular bow array deformity and observed array behavior during turning maneuvers.

Types of Non-Ideal Array Manifold Responses

Random Errors

Random errors in array manifold response may be considered zero mean perturbations from the nominal array response values. These may arise from non-ideal sensor gain or phase, manufacturing precision, or other component tolerances. Two approaches for describing these effects are described. The first provides a random error term for each physical quantity related to each sensor, namely, position, amplitude response, and phase response.

Each error term, $\Delta_i$, is specified as a Gaussian random variable, $$\Delta_i \xrightarrow{d} N(0, \sigma_i^2).$$

The "actual" value of a quantity, x, may be denoted using a subscript a (e.g., $x_a$). The effective position of the $n^{th}$ sensor element with nominal position $p_n$ is $$\underline{p}_{n,a} = \underline{p}_n + [\Delta_x, \Delta_y, \Delta_z]^T \tag{6.1}$$

and the overall array manifold response is $$\underline{v}_a = (([1+\Delta_A]\exp[j\Delta_\Theta]\exp[-j(\underline{k}^T \underline{p}_{n,a})]))_n \tag{6.2}$$

This provides complete specification of the potential random errors, $(\Delta_x, \Delta_y, \Delta_z, \Delta_A, \Delta_\Theta)$, and is useful for analysis of performance impacts in relation to each of the individual quantities. A simpler model reduces the random error contribution to a multiplicative effect on the amplitude and phase only. Define the vector $$\underline{h} = c_h \underline{1} + \underline{g}, \underline{g} \xrightarrow{d} CN_N(0, \sigma_g^2 I) \tag{6.3}$$

The non-ideal array manifold response is $$\underline{v}_a = \underline{v} \odot \underline{h} = c_h \underline{v} + \underline{v}_g \tag{6.4}$$

The constant $c_h$ is chosen such that $$v_a^H \underline{v}_a = \underline{v}^H \underline{v} \tag{6.5}$$

The ratio $\sigma_g^2/c_h^2$ is a single metric that provides a measure of the difference between the ideal and actual array manifold responses. Expressed in dB as $10 \log_{10}(\sigma_g^2/c_h^2)$, this value gives some indication of "how far down" the perturbation components are from the nominal response. A simpler model may be useful for varying array response as a function of angle of arrival, while the more explicit model may be more appropriate for analyzing operation below the design frequency where there is a non-zero virtual region and isotropic noise component.

Deterministic Errors

In addition to random errors, arrays may experience more deterministic types of array manifold response perturbation. For example, deformation of the array may cause a non-zero mean, non-random disturbance in the positions of the elements. With underwater acoustic arrays, such deformation can occur due to hydrodynamics for towed arrays in motion. Two types of positional errors for linear arrays, circular and partial circular bows, are considered below.

Impact to Structured Covariance Matrix ABF Performance

The technique of computing covariance based on estimates of the wavenumber spectrum may be influenced by factors that would impact the ability to accurately estimate that spectrum, or how accurately that spectrum (based on complex exponentials) represents the true underlying situation. Using the simple model described above, the actual array manifold response vector is $\underline{v}_a = c_h \underline{v} + \underline{v}_g$. The true array manifold response, $\underline{v}$, is scaled and the additional bias term is $\underline{v}_g = \underline{v} \odot \underline{g}$. Because $\underline{v}(\underline{k}) = ((e^{-j\underline{k}^T \underline{p}_n}))_n$:

$$\underline{g}, \underline{v}_g \xrightarrow{d} CN_N(0, \sigma_g^2 I) \tag{6.6}$$

so that the bias in any given realization is a complex Gaussian random vector. Consider a single interferer in uncorrelated white noise.

$$\underline{x}_m = \underline{v}_a a(m) + \underline{n}_m \tag{6.7}$$

The covariance for this case for a given instance of $\underline{v}_g$ is $$E\{\underline{x}_m \underline{x}_m^H | \underline{v}_g\} = \sigma^2(|c_h|^2 \underline{v}\underline{v}^H + c_h \underline{v}\underline{v}_g^H + c_h^* \underline{v}_g \underline{v}^H + \underline{v}_g \underline{v}_g^H) + \underline{R}_n \tag{6.8}$$

In any given instance of this scenario, the error is unknown but non-random, and will produce a particular wavenumber spectrum. The covariance over the ensemble of error vectors, $\underline{v}_g$, is $$E\{\underline{x}_m \underline{x}_m^H\} = \sigma^2 |c_h|^2 \underline{v}\underline{v}^H + \underline{R}_n + \sigma^2 \sigma_g^2 I \tag{6.9}$$

The ensemble power spectrum for this case appears as the original with the line component scaled $|c_h|^2$, with an elevated noise floor corresponding to the $\sigma^2 \sigma_g^2 I$ term. In a given realization though, it is a single vector, $\underline{v}_g$, causing the elevated sidelobes and not an ensemble of plane waves from all directions. As the ratio $\sigma_g/c_h^2$ increases there is larger and larger array manifold error, and the rise in the perceived noise floor is clear.

The normalized SINR loss performance of structured covariance techniques may degrade due to random errors and may be proportional to the difference between the sidelobe levels due to the errors and the true noise floor. The expected increase in normalized SINR loss is equal to the rise in the noise floor.

$$\Delta \xi_{dB} \approx \max(0, \text{INR}_{dB} + (\sigma_g^2/c_h^2) dB) \tag{6.10}$$

Deterministic array manifold response error also causes an impact to the estimated wavenumber spectrum. This impact is a function of both the positional displacement and the angle of arrival of the discrete point source. Due to the symmetry of the array bend, the sidelobe structure resulting from the circular bow is expected to be symmetric in wavenumber space. The circular bow distortion causes the single discrete source to appear as a symmetric, spatially spread interference.

Mitigation Techniques

Non-ideal array manifold response may be expressed in a snapshot model by adding an error vector (or calibration error), $\underline{u}_k$, to the ideal response vector, $\underline{v}_k$, in building the snapshots.

$$\underline{x}_m = \sum_{k=1}^{K} (\underline{v}_k + \underline{u}_k) a_k(m) + \underline{n}_m \qquad (6.11)$$

The impact of combinations of array manifold response errors and the background noise, $\underline{n}_m$, are not considered since the dominant source of performance degradation is assumed to be caused by the large INR line components. Because the error vectors are additive to the ideal response vector, the snapshots include a set of terms corresponding to the ideal array manifold response and the additional error terms.

$$\underline{x}_m = \left[\sum_{k=1}^{K} \underline{v}_k a_k(m) + \underline{n}_m\right] + \sum_{k=1}^{K} \underline{u}_k a_k(m) \qquad (6.12)$$

The ideal array manifold response drives the structure in the CSS algorithms. The case considered here is where the array manifold response errors exist, but are small in magnitude compared to the true array manifold response. This situation is referred to herein as "partially structured", to reflect that the ideal array manifold response is still somewhat discernible in the data. The MTSE harmonic analysis still provides the estimates of the observable plane wave components, provided they maintain a sufficient SNR over the apparent raised noise floor such that line component detection is possible.

The random error case may be considered as a starting point to develop an algorithm to deal with random array manifold perturbation. In a particular embodiment, an optimal algorithm to deal with deterministic array manifold errors may estimate the error model parameters, H for a circular bow, and H and L2 for a partial circular bow, or parabolic parameters in, and may use that information to assist in estimating the array manifold errors. The discussion below further describes a particular technique developed for random errors, and considers to what extent deterministic errors may be processed effectively for two types of non-random errors that are considered.

MMSE Unbiased Linear Estimate of Calibration Errors

A minimum mean squared error, linear unbiased estimate of calibration errors is explained below. For ease of explanation, there are assumed to be K line components, and M≥K snapshots observed. A snapshot model containing non-ideal array manifold responses, $\underline{v}_{k,a} = \underline{v}_k + \underline{u}_k$, provides a starting point. The collection of snapshots, m=1, . . . , M can be arranged as a matrix $$\underline{X} = [\underline{x}_1, \underline{x}_2, \dots, \underline{x}_M] = (\underline{V} + \underline{U})\underline{A} + \underline{N} \qquad (6.13)$$

where the individual matrices similarly include the original vectors, $\underline{V} = [\underline{v}_1, \underline{v}_2, \dots, \underline{v}_K]$, $\underline{U} = [\underline{u}_1, \underline{u}_2, \dots, \underline{u}_K]$, $\underline{A} = [\underline{a}_1, \underline{a}_2, \dots, \underline{a}_M]$, and $\underline{N} = [\underline{n}_1, \underline{n}_2, \dots, \underline{n}_M]$. Here, a priori knowledge of the ideal array manifold responses, $\underline{V}$, and signal amplitudes, $\underline{A}$, may be assumed. In practice, the estimates provided by the MTSE harmonic analysis processing may be used for these values. The matrix $\underline{A}$ may be represented in an additional way, with each row representing the amplitude time series for the corresponding point source signal.

$$\underline{\alpha}_k^T = [a_k(1), a_k(2), \dots, a_k(M)] \qquad (6.14)$$

$$\underline{A} = [\underline{\alpha}_1, \underline{\alpha}_2, \dots, \underline{\alpha}_K]^T \qquad (6.15)$$

The array calibration errors $\underline{U}$ may be estimated given $\underline{V}$ and $\underline{A}$. An initial step may be performed to subtract out the known line components.

$$\underline{Y} = \underline{X} - \underline{V}\underline{A} = \underline{U}\underline{A} + \underline{N} \qquad (6.16)$$

Additional calculations may be performed subject to the following assumptions:

The array calibration errors, $\underline{u}_k$, are non-random but unknown and are different for each source, k=1 . . . K.

The noise terms are zero mean and independent of the array manifold responses and signal amplitudes, with covariance, $E\{\underline{n}_m \underline{n}_m^H\} = \underline{R}_n$.

The snapshots for different sample indices, m, are independent.

rank($\underline{A}$)=K, which is discussed further below. This rank deficient situation may occur when two signals are perfectly correlated with one another (the magnitude of the correlation coefficient is unity), or when the number of interferers exceeds the number of snapshots, K>M.

In a particular embodiment, a linear processor can be used to estimate the array manifold response error vectors from the observations. For each error vector (or for all $\hat{\underline{u}}_k$ simultaneously)

$$\hat{\underline{u}}_k = \underline{Y}\underline{w}_k, \hat{\underline{U}} = \underline{Y}\underline{W} \qquad (6.17)$$

where the matrices are $\underline{W} = [\underline{w}_1, \underline{w}_2, \dots, \underline{w}_K]$ and $\hat{\underline{U}} = [\hat{\underline{u}}_1, \hat{\underline{u}}_2, \dots, \hat{\underline{u}}_K]$. The processor may be unbiased, so that $E\{\hat{\underline{u}}_k\} = \underline{u}_k$, $E\{\hat{\underline{U}}\} = \underline{U}$. Expanding out the expectation $$E\{\hat{\underline{u}}_k\} = E\{\underline{Y}\underline{w}_k\} = \underline{U}\underline{A}\underline{w}_k \qquad (6.18)$$

This implies that to be unbiased $\underline{U}\underline{A}\underline{w}_k = \underline{u}_k$, or $$\underline{A}\underline{w}_k = \underline{e}_k, \text{or} \underline{A}\underline{W} = \underline{I} \qquad (6.19)$$

where $\underline{e}_k$ is the elementary vector which is all zeros with a 1 in the $k^{th}$ position. This places K constraints on each weight vector, $\underline{w}_k$. Written out explicitly using a row definition of $\underline{A}$ $$\underline{\alpha}_j^T \underline{w}_k = \delta[j-k] \qquad (6.20)$$

where $\delta[j-k]$ is a Kronecker delta. In a particular embodiment, the estimation error variance may be minimized at the output for each filter, $\underline{w}_k$, given by $$\sigma_{w,k}^2 = E[(\underline{u}_k - \hat{\underline{u}}_k)^H (\underline{u}_k - \hat{\underline{u}}_k)] \qquad (6.21)$$

Using Eqn. (6.17) in Eqn. (6.21), the expression for the variance reduces to $$\sigma_{w,k}^2 = \underline{w}_k^H E[\underline{N}^H \underline{N}] \underline{w}_k \qquad (6.22)$$

To find $E\{\underline{N}^H \underline{N}\}$ recall that $\underline{N} = [\underline{n}_1, \underline{n}_2, \dots, \underline{n}_M]$, where the individual $\underline{n}_m$ are i.i.d. with covariance, $\underline{R}_n$.

$$E\{\underline{N}^H \underline{N}\} = E\left\{\begin{pmatrix} \underline{n}_1^H \underline{n}_1 & \underline{n}_1^H \underline{n}_2 & \cdots & \underline{n}_1^H \underline{n}_M \\ \underline{n}_2^H \underline{n}_1 & \underline{n}_2^H \underline{n}_2 & & \\ \vdots & & \ddots & \\ \underline{n}_M^H \underline{n}_1 & & & \underline{n}_M^H \underline{n}_M \end{pmatrix}\right\} \qquad (6.23)$$

$$= tr(\underline{R}_n)\underline{I}$$

Inserting Eqn. (6.23) into Eqn. (6.22) gives the noise output power.

$$\sigma_{w,k}^2 = tr(\underline{R}_n)\underline{w}_k^H \underline{w}_k \tag{6.24}$$

The constrained optimization problem may be set up to find the individual weights, $\underline{w}_k$.

$$\underset{\underline{w}_k}{\text{argmin}} \; tr(\underline{R}_n)\underline{w}_k^H \underline{w}_k \text{ subject to } \underline{\alpha}_j^T \underline{w}_k = \delta_{jk} \tag{6.25}$$

The following cost function may be minimized using the method of Lagrange multipliers.

$$J(\underline{w}_k) = tr(\underline{R}_n)\underline{w}_k^H \underline{w}_k + \sum_{l=1}^{K} \lambda_{kl}(\underline{\alpha}_l^T \underline{w}_k - \delta_{lk}) + \sum_{l=1}^{K} \lambda_{kl}^*(\underline{w}_k^H \underline{\alpha}_l^* - \delta_{lk}) \tag{6.26}$$

Taking the gradient w.r.t. $\underline{w}_k$ and setting to 0

$$\frac{\partial}{\partial \underline{w}_k} J(\underline{w}_k) = 0 \big|_{\underline{w}_k = \underline{w}_{k,opt}} \tag{6.27}$$

yields the following expression $$\underline{w}_k^H = -\frac{1}{tr(\underline{R}_n)} \sum_{l=1}^{K} \lambda_{kl} \underline{\alpha}_l^T \tag{6.28}$$

Defining the vector $\underline{\lambda}_k$ and matrix $\Lambda$ respectively, $$\underline{\lambda}_k = [\lambda_{k,1}, \lambda_{k,2}, \ldots, \lambda_{k,K}], \underline{\Lambda} = [\underline{\lambda}_1^T, \underline{\lambda}_2^T, \ldots, \underline{\lambda}_K^T]^T \tag{6.29}$$

then Eqn. (6.28) can be written as $$\underline{w}_k^H = -\frac{1}{tr(\underline{R}_n)} \underline{\lambda}_k \underline{A} \tag{6.30}$$

The entire solution can be expressed for all k simultaneously as $$\underline{W}^H = -\frac{1}{tr(\underline{R}_n)} \Lambda \underline{A} \tag{6.31}$$

Inserting Eqn. (6.31) into the constraint Eqn. (6.19), and solving for the constraint matrix, $\Lambda$ $$\underline{\Lambda} = -tr(R_n)(\underline{AA}^H)^{-1} \tag{6.32}$$

The earlier assumption that $rank(\underline{A})=K$ implies that $(\underline{AA}^H)^{-1}$ exists. Inserting Eqn. (6.32) back into Eqn. (6.31) produces the overall solution for the weights.

$$\underline{W} = \underline{A}^H (\underline{AA}^H)^{-1} \tag{6.33}$$

which is the Moore-Penrose pseudo-inverse of $\underline{A}$. Using Eqn. (6.33) in Eqn. (6.17), the minimum variance unbiased linear estimate of the non ideal array manifold response error vectors is $$\hat{\underline{U}} = \underline{Y}\underline{W} = \underline{Y}\underline{A}^H (\underline{AA}^H)^{-1} \tag{6.34}$$

In situations where M<K, then $rank(\underline{A})<K$ and the inverse $(\underline{AA}^H)^{-1}$ does not exist. In this situation, the processing may be restricted to estimate a subset of the array manifold error vectors, $\hat{\underline{u}}_k$, corresponding to the M largest sources. In practice, there may be practical issues with the conditioning of the matrix $\underline{AA}^H$ and a value less than M may work better numerically. Performance may degrade in these scenarios compared to an optimal adaptive beamformer because there is not enough snapshot information to estimate all the random error vectors from the data.

Maximum Likelihood Estimate of Calibration Errors

In the discussion above, the minimum mean square error linear unbiased estimate of the array manifold response error vectors was determined. This used knowledge of the number of point source signals, K, the signal amplitudes, $\underline{A}$, and the ideal array manifold response vectors, $\underline{V}$. The snapshots were assumed to be independent. The solution did not require definition of the statistics of the noise term, $\underline{n}_m$, other than to state that the noise was independent of the other quantities in the data. In the discussion below, the maximum likelihood estimation of the array manifold response error vectors is derived. The same assumptions are used as were used above. Additionally, the noise terms are specified as complex Gaussian, $$\underline{n} \xrightarrow{d} CN_N(\underline{0}, \underline{R}_n).$$

The individual snapshots $$\underline{x}_m = (\underline{V} + \underline{U})\underline{a}_m + \underline{n}_m \tag{6.35}$$

are complex Gaussian random vectors, with non-zero mean, $\underline{m}_m = [\underline{V} + \underline{U}]\underline{a}_m$ $$\underline{x}_m \xrightarrow{d} CN_N(\underline{m}_m, \underline{R}_n) \tag{6.36}$$

Grouping all snapshots, $\underline{X} = [\underline{x}_1, \underline{x}_2, \ldots, \underline{x}_M]$ and amplitude values, $\underline{A} = [\underline{a}_1, \underline{a}_2, \ldots, \underline{a}_M]$, the complex Gaussian random matrix $\underline{X}$ has non-zero mean $\underline{M} = (\underline{V} + \underline{U})\underline{A}$. With the snapshots being independent, the probability density for $\underline{X}$ is $$f_{\underline{X}}(\underline{X}) = \pi^{-NM} \det(\underline{R}_n)^{-M} \exp\left(-\sum_{m=1}^{M} (\underline{x}_m - \underline{m}_m)^H \underline{R}_n^{-1} (\underline{x}_m - \underline{m}_m)\right) \tag{6.37}$$

Eqn. (6.37) can be expressed using the trace operator, $tr(\;)$.

$$f_{\underline{X}}(\underline{X}) = \pi^{-NM} \det(\underline{R}_n)^{-M} \exp(-tr[(\underline{X} - \underline{M})^H \underline{R}_n^{-1} (\underline{X} - \underline{M})]) \tag{6.38}$$

For the available snapshot data, the likelihood function for a given estimate of the array manifold errors is $$f_{\underline{X}|\hat{\underline{U}}}(\underline{X}|\hat{\underline{U}}) \pi^{-NM} \det(\underline{R}_n)^{-M} \exp(-tr[(\underline{X} - \underline{M}(\hat{\underline{U}}))^H \underline{R}_n^{-1} (\underline{X} - \underline{M}(\hat{\underline{U}}))]) \tag{6.39}$$

The maximum likelihood estimate of the array manifold error vectors, $\hat{\underline{U}}_{ML}$, is a matrix that maximizes $f_{\underline{X}|\hat{\underline{U}}}(\underline{X}|\hat{\underline{U}})$.

$$\hat{\underline{U}}_{ML} = \underset{\hat{\underline{U}}}{\text{argmax}} \; f_{\underline{X}|\hat{\underline{U}}}(\underline{X}|\hat{\underline{U}}) \tag{6.40}$$

Beginning with the log-likelihood function, $\ell_{X|\hat{U}}(X|\hat{U}) = \ln f_{X|\hat{U}}(X|\hat{U})$.

$$\ell_{X|\hat{U}}(X|\hat{U}) = C_1 + C_2 - tr\left[(X - M(\hat{U}))^H R_n^{-1}(X - M(\hat{U}))\right] \quad (6.41)$$

where the constants $C_1$, $C_2$ are not functions of $\hat{U}$. Because it is a maximum of $\ell_{X|\hat{U}}(X|\hat{U})$.

$$\frac{\partial}{\partial \hat{U}} \ell_{X|\hat{U}}(X|\hat{U})\bigg|_{\hat{U}=\hat{U}_{ML}} = 0 \quad (6.42)$$

Expanding out terms in Eqn. (6.41), and applying the partial derivative through the tr( ) function $$\hat{U}_{ML} = XA^H(AA^H)^{-1} - V \quad (6.43)$$

Alternatively, starting with $$Y = X - VA \quad (6.44)$$

and applying the same procedure $$\hat{U}_{ML} = YA^H(AA^H)^{-1} \quad (6.45)$$

Eqn. (6.45) matches the result Eqn. (6.34). It is interesting to note is that the covariance of the noise term $n_m$ does not have an impact on the final solution. This is particularly useful, since this covariance is not known at this point in the processing. Also, it establishes that problems should not be encountered if the underlying noise is non-white, due to either spatially spread interference or the combination of visible/virtual space when operating below the design frequency.

Where a non-white noise may still cause issues is in situations where the dynamic range of the noise, spectrally, is very large. This could be the case when operating below design frequency where the isotropic noise component is much larger than the sensor noise component. The apparent increase in noise floor due to the effects of array manifold response errors accumulated by the spatially spread isotropic noise process may mask the true sensor noise components.

Procedure

The discussion below describes a procedure to use the results from derivation of Eqns. (6.45) and (6.34) to supplement the CSS with MTSE approach with additional non-ideal array manifold response error vector information. The dominant sources of normalized SINR loss are the error vectors associated with the high INR point sources in the data. The term partially structured is used to indicate that some observation of the underlying structure remains observable. Fundamentally, being partially structured implies that the high INR line components in the spectrum can still be detected via the MTSE harmonic analysis process. In general, this indicates some amount of positive SNR of the line component above the raised noise floor caused by the array manifold errors.

The following procedure may be used to incorporate non-ideal array manifold response error vector information into an overall covariance matrix estimate.
1. Use MTSE harmonic analysis to detect and estimate the number of line components, K, and their parameters, $v_k$, and $a_k(m)$.
2. Use Eqns. (6.44) and (6.45) to estimate array calibration error vectors, $u_k$, for these line components.
3. Subtract the discrete components from the snapshot data to form the residual, $X_{res} = X - (V+U)A$.

4. Optionally, items 1, 2 and 3 may be iterated.
5. Estimate the final residual "continuous" background spectrum, $\hat{P}_{res}(\cdot)$, and form $R_{MTSE,res}$.
6. Form an overall estimate of the covariance matrix $$R_{TOTAL} = \sum_{k=1}^{K}(v_k + u_k)(v_k + u_k)^H \frac{1}{M}\sum_{m=1}^{M}|a_k(m)|^2 + R_{MTSE,res} \quad (6.46)$$

Comparison-MTSE and MVDR Spectra

The error vector processing is a technique for adapting the CSS with MTSE approach to handle non-ideal array manifold response, where the response retains sufficient "likeness" to the ideal that the parameters of the large discrete components in the spectrum can be estimated. Using this information, the error vector(s) can be estimated and used in the formulation of the final estimate of covariance. Simulations that have been performed indicate that this processing is effective and that the overall normalized SINR loss is equivalent to reduced rank processing of the data using MWF. Array manifold error processing may not be a replacement for unconstrained covariance and reduced rank techniques in all circumstance, but it offers a way to extend the basic CSS with MTSE processing based on available data products to address the issue of non-ideal response.

An additional byproduct of this processing is a final MTSE wavenumber spectrum with the influence of the error vectors for the large discretes removed. One can qualitatively compare the utility in this final estimate of the spectrum to MVDR spectra computed using the ensemble covariance matrix.

The techniques described above may be used to estimate the error vectors associated with the strongest INR line components in the data using the detection and estimation parameters available from harmonic analysis. Through simulations, this technique was seen to improve performance in the face of non-ideal array manifold response, and normalized SINR loss was seen to be comparable to reduced rank techniques provided the harmonic analysis could reliably detect the line components. As a beneficial byproduct, MTSE could be made to produce an estimate of the wavenumber spectrum as if the array manifold had been restored to ideal.

Extensions for Arbitrary Geometry

Arrays with regular element spacing lend themselves to a convenient simultaneous estimation of visible space components of the space-time process and virtual space sensor noise using classical spectral estimation techniques and efficient FFT computation. For arbitrary array geometries, proper estimation of the virtual space sensor noise may require more effort. The following discussion explains an approach for doing this based upon analyzing the covariance for isotropic noise. Methods to extend the disclosed CSS with MTSE techniques for application to arbitrary arrays are also explained below.

Sensor Noise with Arbitrary Array Geometry

The covariance matrix of interest, $R_x$, includes two subspaces corresponding to visible and virtual regions.

$$<R_x> = <R_{vs}> + <R_{vr}> \quad (7.1)$$

Assuming that the subspaces, $<R_{vs}>$ and $<R_{vr}>$ are approximately orthogonal, although due to the array geometry the transition between the two may not be so sharp. The visible region subspace is approximately the subspace defined by the covariance associated with 3D isotropic noise.

$$\langle \underline{R}_{vs} \rangle \approx \langle R_{iso} \rangle \quad (7.2)$$

This is convenient because the 3D isotropic noise is specified in terms of angle of arrival to the array. This has an intuitive physical interpretation regardless of array geometry. Additionally, from Eqn. (3.31), the contribution of the sensor noise component appeared as a 3D isotropic noise component when restricting attention to the visible region. This may be useful later when considering the positive definiteness of the estimated covariance.

Because of the spatial stationarity of the 3D isotropic noise, the covariance is a function of the difference in position, $\Delta \underline{p}$. This difference may be expressed in Cartesian coordinates $\{\Delta p_x, \Delta p_y, \Delta p_z\}$ or spherical coordinates $\{s, \gamma, \zeta\}$.

$$\Delta \underline{p} = \begin{pmatrix} \Delta p_x \\ \Delta p_y \\ \Delta p_z \end{pmatrix} = \begin{pmatrix} s \sin \gamma \cos \zeta \\ s \sin \gamma \sin \zeta \\ s \cos \gamma \end{pmatrix} \quad (7.3)$$

The covariance between two omnidirectional sensors in 3D isotropic noise has a form $$R_{iso}(s, \gamma, \zeta) = R_{iso}(s) = \frac{\sin(\omega s/c)}{\omega s/c} \quad (7.4)$$

The covariance matrix for an array of sensors is populated by values of this function where the relative position is $\Delta \underline{p} = \underline{p}_r - \underline{p}_c$.

$$\underline{R}_{iso} = ((R_{iso}(\Delta \underline{p})))_{r,c} = ((R_{iso}(s)))_{r,c} \quad (7.5)$$

Eqn. (7.5) may be used to compute $\underline{R}_{iso}$, and to perform an eigendecomposition of the matrix. The decomposition is ordered according to decreasing eigenvalues.

$$\underline{R}_{iso} = \underline{Q}_{iso} \Lambda_{iso} \underline{Q}_{iso}^H = \sum_{n=0}^{N-1} \lambda_n \underline{q}_n \underline{q}_n^H \quad (7.6)$$

The eigenvalues for this problem, $\lambda_n$, are a measure of the concentration of each eigenvector within the visible region subspace. The eigenvectors may be divided into two sets, those mostly contained in the visible region subspace and those mostly contained in the virtual region subspace. The boundary may be apparent from inspection of the eigenvalues.

Indicating the number of eigenvectors determined to be in the visible space as $N_{vs}$, show the explicit make up of $\underline{R}_{iso}$.

$$\underline{R}_{iso} = \sum_{n=0}^{N_{vs}-1} \lambda_n \underline{q}_n \underline{q}_n^H + \sum_{n=N_{vs}}^{N-1} \lambda_n \underline{q}_n \underline{q}_n^H \quad (7.7)$$

The visible region subspace is approximately the subspace spanned by the first $N_{vs}$ eigenvectors.

$$\langle \underline{R}_{vs} \rangle \approx \langle \underline{q}_0, \underline{q}_1, \ldots, \underline{q}_{N_{vs}-1} \rangle \quad (7.8)$$

The eigenvectors, $\underline{Q}_{iso}$, make a complete orthonormal set for $\langle C^{N \times N} \rangle$. The covariance matrix $\underline{R}_x$ is full rank, so from $\langle \underline{R}_x \rangle \langle C^{N \times N} \rangle = \langle \underline{Q}_{iso} \rangle$. Thus, $$\langle \underline{R}_{vr} \rangle \approx \langle \underline{q}_{N_{vs}}, \underline{q}_{N_{vs}+1}, \ldots, \underline{q}_{N-1} \rangle \quad (7.9)$$

Grouping the appropriate eigenvectors together for the visible and virtual region subspaces, $$\langle \underline{Q}_{vs} = [\underline{q}_0, \underline{q}_1, \ldots, \underline{q}_{N_{vs}-1}], \underline{Q}_{vr} = [\underline{q}_{N_{vs}}, \underline{q}_{N_{vs}+1}, \ldots, \underline{q}_{N-1}], \quad (7.9)$$

projection matrices for those subspaces may be formed $$\underline{P}_{vs} = \underline{Q}_{vs} \underline{Q}_{vs}^H, \underline{P}_{vr} = \underline{Q}_{vr} \underline{Q}_{vr}^H = \underline{I} - \underline{Q}_{vs} \underline{Q}_{vs}^H \quad (7.11)$$

Let $N_{vr} = N - N_{vs}$. The sensor noise power component within the virtual region subspace can be estimated from the available snapshots as $$\hat{\sigma}_w^2 = \frac{1}{M} \cdot \frac{1}{N_{vr}} \sum_{m=1}^{M} \underline{x}_m^H \underline{P}_{vr} \underline{x}_m \quad (7.12)$$

From the form of the projection matrix, $\underline{P}_{vr}$, the sensor noise power estimate in Eqn. (7.12) is equivalent to $$\hat{\sigma}_w^2 = \frac{1}{M} \cdot \frac{1}{N_{vr}} \sum_{m=1}^{M} \sum_{n=N_{vs}}^{N-1} |\underline{x}_m^H \underline{q}_n|^2 \quad (7.13)$$

Eqn. (7.13) shows that $\hat{\sigma}_w^2$ is the average power across each of the orthonormal basis vectors, $\underline{q}_n$, in the subspace. The overall estimate for the covariance $\underline{R}_x$ then uses this estimate as $$\underline{\hat{R}}_x = \underline{\hat{R}}_{vs} + \hat{\sigma}_w^2 \underline{P}_{vr} \quad (7.14)$$

Use of the projection matrix $\underline{P}_{vr}$ in Eqn. (7.14) avoids double counting the sensor noise component measured in the visible region subspace and contained in $\hat{R}_{vs}$. If the sensor noise is significantly below the continuous background noise component of the space-time process throughout the visible region, one could use the simpler expression $$\underline{\hat{R}}_x = \underline{\hat{R}}_{vs} + \hat{\sigma}_{w,vr}^2 \underline{I} \quad (7.15)$$

at the expense of double counting the sensor noise in the visible region. In either case some representation of the sensor noise in the virtual region may be used.

Positive Definiteness

The estimated covariance must be positive definite to be meaningful for array processing. For regularly spaced arrays, the estimated covariance is positive definite when the estimated frequency-wavenumber spectrum, $\hat{P}(\underline{k}) > 0$, and the estimated sensor noise, $\hat{\sigma}_w^2 > 0$, as explained above. The estimated covariance is also positive definite for arbitrary geometry arrays, where the covariance is estimated as the sum of the visible space covariance, $\underline{\hat{R}}_{vs}$, and the sense noise in the virtual space.

Method 1

Eqn. (7.14) provides an accurate method for accounting for the sensor noise in the covariance matrix.

$$\underline{\hat{R}}_x = \underline{\hat{R}}_{vs} + \sigma_w^2 \underline{P}_{vr} \quad (7.16)$$

The estimate for the covariance corresponding to the visible region of the array is $$\hat{\underline{R}}_{vs} = (2\pi)^{-C} \int \ldots \int_{vs} \hat{P}_{vs}(\underline{k}) \underline{v}(\underline{k}) \underline{v}^H(\underline{k}) d\underline{k} \quad (7.17)$$

The estimate of the wavenumber spectrum in the visible region may be assumed to be greater than zero, $\hat{P}_{vs}(\underline{k}) > 0$, which enables expressing it as including an estimate of the wavenumber spectrum of the observed process, $\hat{P}_f(\underline{k}) \geq 0$, and an estimate of the sensor noise seen in the visible region, $\hat{\sigma}_{w,vs}^2 > 0$.

$$\hat{P}_{vs}(\underline{k}) = \hat{P}_f(\underline{k}) + \hat{\sigma}_{w,vs}^2 \quad (7.18)$$

Using Eqns. (7.18) and (7.17) in the quadratic expression for positive definiteness $$\underline{x}^H \hat{\underline{R}}_x \underline{x} = \underline{x}^H ((2\pi)^{-C} \int \ldots \int_{vs} [\hat{P}_f(\underline{k}) + \hat{\sigma}_{w,vs}^2] \underline{v}(\underline{k}) \underline{v}^H(\underline{k}) d\underline{k} + \hat{\sigma}_w^2 \underline{P}_{vr}) \underline{x} \quad (7.19)$$

Carrying out the integration, this simplifies to $$\underline{x}^H \hat{\underline{R}}_x \underline{x} = \underline{x}^H \hat{\underline{R}}_f \underline{x} + \underline{x}^H (\hat{\sigma}_{w,vs}^2 \underline{R}_{iso} + \hat{\sigma}_w^2 \underline{P}_{vr}) \underline{x} \quad (7.20)$$

The covariance estimate for the space-time process is positive semi-definite, $\hat{R}_f \geq 0$. This follows from $$\underline{x}^H \hat{\underline{R}}_f \underline{x} = (2\pi)^{-C} \int \ldots \int_{vs} \hat{P}_f(\underline{k}) |\underline{x}^H \underline{v}(\underline{k})|^2 d\underline{k} \quad (7.21)$$

where $\hat{P}_f(\underline{k}) \geq 0$ and $|\underline{x}^H \underline{v}(\underline{k})|^2 \geq 0$. For the terms relating to the noise estimates, $\underline{R}_{iso}$ may be replaced with its eigendecomposition.

$$\hat{\sigma}_{w,vs}^2 R_{iso} + \hat{\sigma}_w^2 P_{vr} = \hat{\sigma}_{w,vs}^2 \left[ \sum_{n=0}^{N-1} \lambda_n \underline{q}_n \underline{q}_n^H \right] + \sigma_w^2 P_{vr} \quad (7.22)$$

The matrix $\underline{P}_{vr}$ may also be defined in terms of the eigendecomposition of $\underline{R}_{iso}$ $$\hat{\sigma}_{w,vs}^2 R_{iso} + \hat{\sigma}_w^2 P_{vr} = \sum_{n=0}^{N_{vs}-1} \hat{\sigma}_{w,vs}^2 \lambda_n \underline{q}_n \underline{q}_n^H + \sum_{n=N_{vs}}^{N-1} (\hat{\sigma}_{w,vs}^2 \lambda_n + \hat{\sigma}_w^2) \underline{q}_n \underline{q}_n^H \quad (7.23)$$

Define the combined eigenvalues, $\lambda_n'$, as $$\lambda_n' = \begin{cases} \hat{\sigma}_{w,vs}^2 \lambda_n & 0 \leq n \leq N_{vs} \\ \hat{\sigma}_{w,vs}^2 \lambda_n + \hat{\sigma}_w^2 & N_{vs} \leq n < N \end{cases} \quad (7.24)$$

By the selection methods outlined above, the eigenvalues $\lambda_n$ for $0 \leq n < N_{vs}$ are greater than zero, such that all $\lambda_n'$ are real-valued and greater than zero. Defining $\Lambda' = \text{diag}(\lambda_0', \lambda_1', \ldots, \lambda_{N-1}')$ $$\underline{x}^H (\hat{\sigma}_{w,vs}^2 \underline{R}_{iso} + \hat{\sigma}_w^2 \underline{P}_{vr}) \underline{x} = \underline{x}^H \underline{Q}_{iso} \Lambda' \underline{Q}_{iso}^H \underline{x} \quad (7.25)$$

The matrix $Q_{iso}$ is unitary, therefore $|\underline{Q}_{iso}^H \underline{x}|^2 = |\underline{x}|^2 \neq 0$ for $|\underline{x}|^2 \neq 0$. With positive, real-valued entries on the diagonal of $\Lambda'$ $$\underline{x}^H (\hat{\sigma}_{w,vs}^2 \underline{R}_{iso} + \hat{\sigma}_w^2 \underline{P}_{vr}) \underline{x} > 0 \quad (7.26)$$

The overall matrix $\hat{\underline{R}}_x$ is the sum of a positive semidefinite matrix, $\hat{\underline{R}}_f$, and a positive definite matrix, $\underline{x}^H (\hat{\sigma}_{w,vs}^2 \underline{R}_{iso} + \hat{\sigma}_w^2 \underline{P}_{vr}) \underline{x}$, and therefore is positive definite, $\hat{\underline{R}}_x > 0$.

Method 2

Another method for an arbitrary array geometry is $$\hat{\underline{R}}_x = \hat{\underline{R}}_{vs} + \hat{\sigma}_{w,vs}^2 \underline{I} \quad (7.27)$$

As explained above, $\hat{\underline{R}}_{vs} = (\hat{\underline{R}}_f + \hat{\sigma}_{w,vs}^2 \underline{R}_{iso}) \geq 0$. The matrix $\underline{I} > 0$ and so $\hat{\underline{R}}_x > 0$.

Covariance from Spatial Spectra (CSS) with MTSE

Design of Multi-Tapers

For arbitrary array geometry, the design of the multiple tapers for spectral estimation may be done by dividing the visible region into a search grid, where each grid point defines a region of analysis. For convenience, the angle domain, $(\theta, \phi)$, is used herein, although operation may alternately be specified in wavenumber. In general form, the search grid covers a sphere, $0 \leq \theta \leq \pi$, $0 \leq \phi \leq 2\pi$, although the array characteristics may be exploited to reduce this. For example, a planar array in an x-y plane cannot measure wavenumber in the z direction. Because of this, its search grid may be restricted to the hemisphere, $0 \leq \theta \leq \pi/2$, $0 \leq \phi \leq 2\pi$, as the lower hemisphere is identical due to the ambiguity and provides no additional information.

One approach is to design a set of tapers at each grid location, $(\theta_o \pm \Delta\theta, \phi_o \pm \Delta\phi)$, based on an eigendecomposition of the matrix $$\underline{R}_{\theta_o, \phi_o} = \frac{1}{4\pi} \int_{\theta_o - \Delta\theta}^{\theta_o + \Delta\theta} \int_{\phi_o - \Delta\phi}^{\phi_o + \Delta\phi} \underline{v}(\theta, \phi) \underline{v}^H(\theta, \phi) \sin\theta d\theta d\phi \quad (7.28)$$

$$= \underline{Q}_{\theta_o, \phi_o} \Delta_{\theta_o, \phi_o} \underline{Q}_{\theta_o, \phi_o}^H$$

where $\underline{v}(\theta, \phi)$ is the array manifold response vector. The multi-tapers are selected as the eigenvectors corresponding to the D largest eigenvalues $\underline{R}_{\theta_o, \Phi_o}$.

$$\underline{w}_{\theta_o, \Phi_o, d} = \underline{q}_{\theta_o, \Phi_o, d-1}, d = 1, \ldots, D \quad (7.29)$$

Alternatively, one may design a single set of tapers, $\underline{w}_{o,d}$, perhaps at broadside for the array, and steer the main response axis (MRA) of this fixed set of weights through angle space.

$$\underline{w}_{\theta_o, \Phi_o, d} = \underline{w}_{o,d} \square \underline{v}(\theta_o, \Phi_o), d = 1, \ldots, D \quad (7.30)$$

Discrete Line Component Processing (Harmonic Analysis)

Defining the Multi-Taper Weight Matrix, $$\underline{W}(\theta_o, \Phi_o) = [\underline{w}_{\theta_o, \Phi_o, 1}, \underline{w}_{\theta_o, \Phi_o, 2}, \ldots, \underline{w}_{\theta_o, \Phi_o, D}] \quad (7.31)$$

the eigencoefficients are computed for each snapshot, $\underline{x}_m$, as $$\underline{y}_m(\theta_o, \Phi_o) = \underline{W}^H(\theta_o, \Phi_o) \underline{x}_m \quad (7.32)$$

The eigencoefficients output for a line component at $(\theta_o, \phi_o)$ is given by $$\underline{q}_{\theta_o, \Phi_o} = \underline{W}^H(\theta_o, \Phi_o) \underline{1} \quad (7.33)$$

where $\underline{1}$ is the all one's vector. This vector defines the subspaces used for computing a detection statistic.

$$P_{\theta_o, \phi_o} = \underline{q}_{\theta_o, \phi_o} (\underline{q}_{\theta_o, \phi_o}^H \underline{q}_{\theta_o, \phi_o})^{-1} \underline{q}_{\theta_o, \phi_o}^H, P_{\theta_o, \phi_o}^\perp = I - P_{\theta_o, \phi_o} \quad (7.34)$$

The detection statistic may be computed as before $$F(\theta_o, \phi_o) = \frac{\sum_{m=1}^{M} y_m^H(\theta_o, \phi_o) P_{\theta_o,\phi_o} y_m(\theta_o, \phi_o)}{\sum_{m=1}^{M} y_m^H(\theta_o, \phi_o) P_{\theta_o,\phi_o}^\perp y_m(\theta_o, \phi_o)} \underset{H_0}{\overset{H_1}{\gtrless}} \gamma TH \quad (7.35)$$

K is the number of detected line components. Each has its parameters estimated, $(\hat{\sigma}_k, \hat{\Phi}_k, \hat{a}_k(m))$, and these are used to subtract the line component from the data. The projection or subtraction methods described above may be used. The variance for each line component may be estimated as $$\hat{\sigma}_k^2 = \frac{1}{M} \sum_{m=1}^{M} |\hat{a}_k(m)|^2 \quad (7.36)$$

and may be used in the formation of the covariance matrix. This process may be iterated to successively process multiple line components in the data. The final residual snapshot data, $x_{b,m}$, may include the smooth, continuous background content.

Background/Continuous Spectrum

Once harmonic analysis is complete the residual snapshot data, $x_{b,m}$, may be used to compute a final smooth, continuous background spectrum. The eigencoefficients are computed $$y_{b,m}(\theta_o,\phi_o) = W^H(\theta_o,\phi_o) x_{b,m} = ((y_{b,m}^{(d)}(\theta_o,\phi_o)))_d \quad (7.37)$$

The eigencoefficients are used to produce the individual eigenspectra.

$$\hat{P}_b^{(d)}(\theta_o,\phi_o) = |y_{b,m}^{(d)}(\theta_o,\phi_o)|^2 \quad (7.38)$$

The individual eigenspectra are then linearly combined according to a set of weights $$\hat{P}_{b,x}(\theta_o, \phi_o) = \sum_{d=1}^{D} h_d(\theta_o, \phi_o) \hat{P}_b^{(d)}(\theta_o, \phi_o) \quad (7.39)$$

The weights, $h_d(k)$, may be fixed, which may be optimal for an underlying white spectrum, or may be determined adaptively.

Estimate Sensor Noise in Virtual Region

As described above, analyzing the covariance matrix of isotropic noise to determine an appropriate subspace for the virtual region for the array may provide a dimension, $N_{vr}$, and a projection matrix for that subspace, $P_{vr}$. The sensor noise may be estimated from the residual snapshot data, $x_{b,m}$, as $$\hat{\sigma}_w^2 = \frac{1}{M} \cdot \frac{1}{N_{vr}} \sum_{m=1}^{M} x_{b,m}^H P_{vr} x_{b,m} \quad (7.40)$$

Covariance Matrix Estimate

The final estimate of the covariance matrix may be formed from the estimated line components, the covariance from spatial spectrum of the residual continuous background, and the sensor noise component as $$\hat{R}_{CSS} = \hat{V} \hat{R}_a \hat{V}^H + \quad (7.41)$$
$$(4\pi)^{-1} \int_0^\pi \sin\theta d\theta \int_\pi^{-\pi} \hat{P}_{b,x}(\theta, \phi) v(\theta, \phi) v^H(\theta, \phi) d\phi + \sigma_w^2 P_{vr}$$

where $$\hat{R}_a = \text{diag}(\hat{\sigma}_1^2, \hat{\sigma}_2^2, \ldots, \hat{\sigma}_K^2) \quad (7.42)$$

and $$\hat{V} = [v(\hat{\theta}_1, \hat{\Phi}_1), v(\hat{\theta}_2, \hat{\Phi}_2), \ldots, v(\hat{\theta}_K, \hat{\Phi}_K)] \quad (7.43)$$

Thus, the CSS techniques disclosed herein are applicable to arrays with arbitrary geometry. In a particular embodiment, the sensor noise component in virtual space may be estimated and accounted for. A method for doing so based on the covariance matrix of 3D isotropic noise is explained above. Uniform circular arrays maintain a certain structure, and are not strictly speaking arbitrary, but do result in a covariance matrix which is not Toeplitz, and may be addressed using the same methods. Normalized SINR loss performance and average MTSE spectra have been assessed via simulation. The simulations indicate that performance is generally very close to optimal with little snapshot support, with some losses encountered near line components due to mismatch, and for weak INR line components at very low snapshot support due to inconsistent detection within harmonic analysis.

Figure 6:
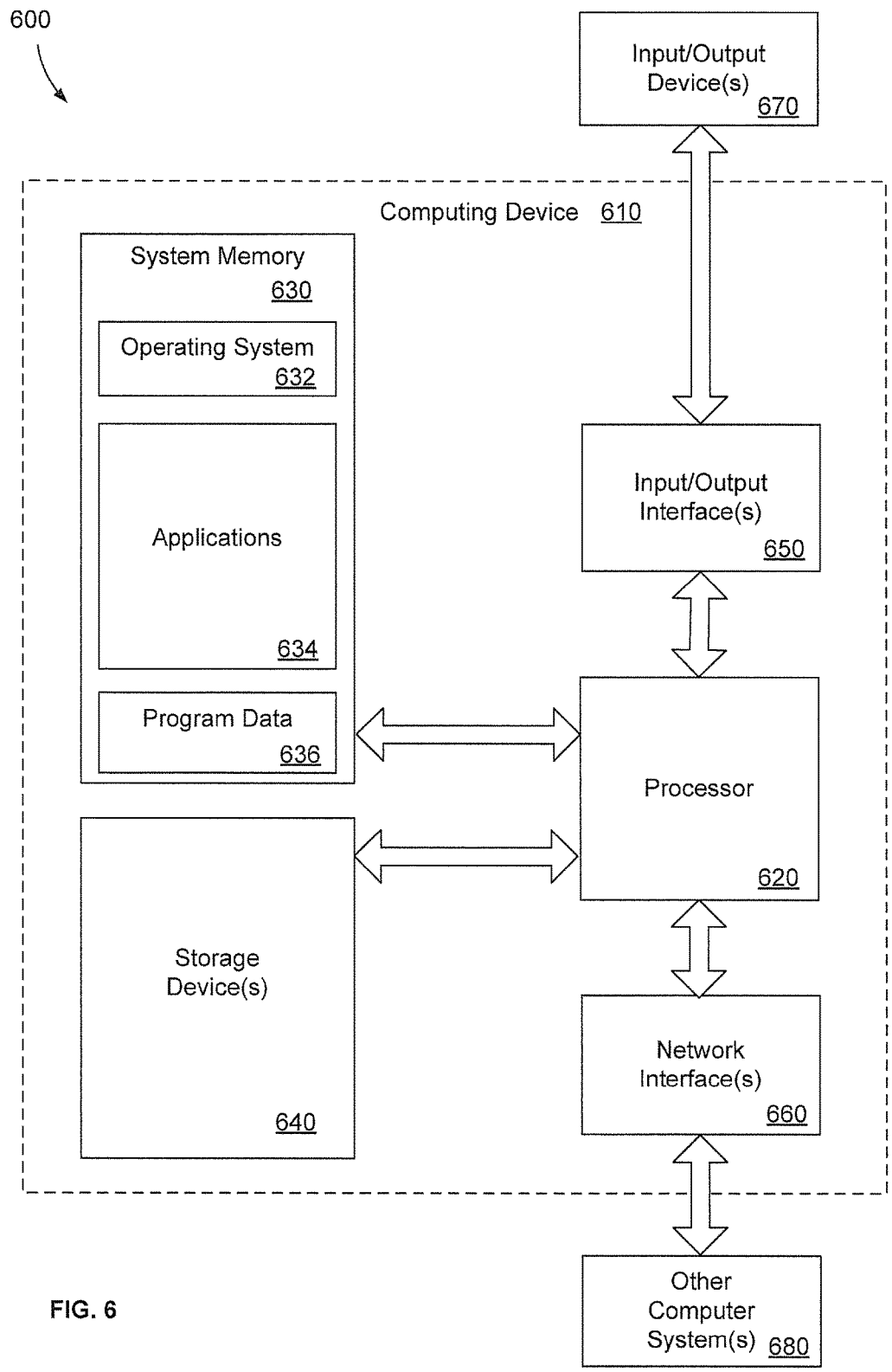
FIG. 6 is a block diagram of an illustrative embodiment of a computing environment.

FIG. 6 is a block diagram of a computing environment 600 including a general purpose computing device 610 operable to support embodiments of computer-implemented methods and computer-executable program instructions according to the present disclosure. For example, the computing device 610 may include or be included within an array processor, such as the array processor 102 of FIG. 1. The computing device 610 typically includes at least one processor 620. Within the computing device 610, the processor 620 communicates with a system memory 630, one or more storage devices 640, one or more input/output interfaces 650, and one or more communication interfaces 660.

The system memory 630 may include volatile memory devices (e.g., random access memory (RAM) devices), nonvolatile memory devices (e.g., read-only memory (ROM) devices, programmable read-only memory, and flash memory), or both. The system memory 630 typically includes an operating system 632, which may include a basic/input output system for booting the computing device 610 as well as a full operating system to enable the computing device 610 to interact with users, other programs, and other devices. The system memory 630 also typically includes one or more application programs 634 and program data 636. For example, the application programs 634 and program data 636 may enable the computing device 610 to perform one or more aspects of signal processing, as described above. To illustrate, the application programs 634 may include instructions that, when executed by the processor 620, cause the processor 620 to receive sensed data from sensors of a sensor array (such as the sensor array 110 of FIG. 1. Data from each sensor of the sensor array may be descriptive of waveform phenomena detected at the sensor. The application programs 634 may also include instructions that cause the processor 620 to determine an estimated spatial spectrum of the waveform phenomena based at least partially on the sensed data. The application programs 634 may further include instructions that cause the processor 620 to determine an estimated covariance matrix of the waveform phenomena based on the estimated spatial spectrum. The application programs 634 may also include instructions cause the processor 620 to determine adaptive beamforming weights using the estimated covariance matrix.

The processor 620 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, applications, and program data. In a particular embodiment, the system memory 630, the storage devices 640, or both, include tangible, non-transitory computer-readable media.

The processor 620 may also communicate with one or more input/output interfaces 650 that enable the computing device 610 to communicate with one or more input/output devices 670 to facilitate user interaction. The input/output interfaces 650 may include serial interfaces (e.g., universal serial bus (USB) interfaces or IEEE 1394 interfaces), parallel interfaces, display adapters, audio adapters, and other interfaces. The input/output devices 670 may include keyboards, pointing devices, displays, speakers, microphones, touch screens, and other devices.

The processor 620 may communicate with other computer systems 680 via the one or more network interfaces 660. The one or more network interfaces 660 may include wired Ethernet interfaces, IEEE 802.01 wireless interfaces, Bluetooth communication interfaces, or other network interfaces. The other computer systems 680 may include host computers, servers, workstations, and other computing devices, such as the other system components 106 of FIG. 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A computer-implemented method comprising:
    transforming, by each sensor of a sensor array, electromagnetic energy into sensed data descriptive of a waveform phenomenon from the sensors of the sensor array, wherein data from each sensor is descriptive of at least a portion of the waveform phenomenon, and wherein the sensed data includes a discrete component and a continuous component;
    receiving at a processor, the sensed data from the sensors of the sensor array;
    applying, at the processor, multi-taper spectral estimation and harmonic analysis to the sensed data to determine an estimated spatial spectrum, wherein applying the harmonic analysis comprises detecting and subtracting the discrete component from the sensed data;
    determining, at the processor, an estimated covariance matrix corresponding to the waveform phenomenon based on the estimated spatial spectrum;
    determining, at the processor, adaptive beamforming weights using the estimated covariance matrix;
    generating, at the processor, a time-domain signal descriptive of the waveform phenomenon by applying the adaptive beamforming weights to the sensed data; and
    sending the time-domain signal to a computing device.

2. The method of claim 1, wherein the sensed data corresponds to a single snapshot from the sensor array.

3. The method of claim 1, wherein the harmonic analysis comprises detecting and subtracting a plurality of discrete components from the sensed data iteratively.

4. The method of claim 1, wherein a source of the waveform phenomenon is treated as stationary for purposes of determining the estimated covariance matrix.

5. The method of claim 1, further comprising subtracting one or more estimated point source interference components from the sensed data before determining the estimated covariance matrix.

6. The method of claim 1, wherein the estimated covariance matrix is determined based on information regarding locations of the sensors with respect to one another.

7. The method of claim 1, wherein the estimated spatial spectrum comprises a frequency-wavenumber spectrum of the waveform phenomenon.

8. The method of claim 1, wherein the estimated spatial spectrum comprises a direction-of-arrival spectrum of the waveform phenomenon.

9. The method of claim 1, wherein the sensed data includes first data acquired by a first sensor of the sensor array and second data acquired by a second sensor of the sensor array, and wherein the first data is acquired by the first sensor and the second data is acquired by the second sensor simultaneously.

10. The method of claim 1, wherein applying the multi-taper spectral estimation includes using a Fast Fourier Transform process with zero-padding.

11. The method of claim 1, wherein a number of tapers used for the multi-taper spectral estimation is less than a number of the sensors of the sensor array, and wherein zero-padding is used to increase sampling density of the estimated spatial spectrum.

12. The method of claim 1, wherein the discrete component is subtracted from the sensed data using a coherent subtraction method.

13. The method of claim 1, wherein the harmonic analysis comprises:
detecting the discrete component of the waveform phenomenon using outputs of the multi-taper spectral estimation; and
determining estimated discrete component parameters corresponding to each detected discrete component.

14. The method of claim 13, further comprising determining an estimated array error vector corresponding to each detected discrete component.

15. The method of claim 14, wherein the estimated array error vector corresponds to a linear minimum mean square error estimate of non-ideal response error in the sensed data.

16. The method of claim 14, further comprising subtracting a contribution of each detected discrete component from the sensed data to generate a residual continuous component.

17. The method of claim 16, further comprising determining an estimated continuous component covariance matrix based on the residual continuous component.

18. The method of claim 17, wherein the estimated covariance matrix is determined as a numeric combination of the estimated continuous component covariance matrix and an estimated discrete component covariance for each detected discrete component.

19. The method of claim 18, wherein the estimated discrete component covariance for a particular detected discrete component is determined based on the estimated array error vector corresponding to the particular detected discrete component and based on the estimated discrete component parameters of the particular detected discrete component.

20. The method of claim 1, wherein the waveform phenomenon includes a signal of interest, and wherein the sensed data is also descriptive of one or more interference signals from one or more interferers.

21. The method of claim 20, wherein the estimated covariance matrix converges with fewer snapshots than interferers.

22. The method of claim 1, wherein the estimated covariance matrix is determined as a combination of a first portion and a second portion, wherein the first portion corresponds to one or more physically propagating waves of the waveform phenomenon, and wherein the second portion is associated with sensor noise.

23. The method of claim 22, further comprising determining an estimate of the sensor noise based at least partially on the second portion.

24. The method of claim 1, further comprising:
physically moving the sensor array while transforming, by the sensors, the electromagnetic energy into the sensed data.

25. The method of claim 1, further comprising:
displaying a visualization based on a spectrum of the time-domain signal.

26. A system comprising:
a sensor array including multiple sensors configured to transform electromagnetic energy into sensed data; and
an array processor coupled to the sensor array, wherein the array processor is configured to:
receive the sensed data descriptive of a waveform phenomenon from the sensors of the sensor array, wherein data from each sensor is descriptive of at least a portion of the waveform phenomenon, and wherein the sensed data includes a discrete component and a continuous component;
apply multi-taper spectral estimation and harmonic analysis to the sensed data to determine an estimated spatial spectrum, wherein applying the multi-taper comprises detecting and subtracting the discrete component from the sensed data;
determine an estimated covariance matrix corresponding to the waveform phenomenon based on the estimated spatial spectrum;
determine adaptive beamforming weights using the estimated covariance matrix;
generate a time-domain signal descriptive of the waveform phenomenon by applying the adaptive beamforming weights to the sensed data; and
send the time-domain signal to a computing device.

27. The system of claim 26, wherein the harmonic analysis comprises detecting and subtracting a plurality of discrete components from the sensed data iteratively.

28. The system of claim 26, wherein the sensor array is arranged with non-uniform spacing between the multiple sensors.

29. A non-transitory computer-readable medium comprising instructions that, when executed by a processor, cause the processor to:
receive sensed data descriptive of a waveform phenomenon from sensors of a sensor array, wherein data from each sensor is descriptive of at least a portion of the waveform phenomenon, and wherein the sensed data includes a discrete component and a continuous component;
apply multi-taper spectral estimation and harmonic analysis to the sensed data to determine an estimated spatial spectrum, wherein applying the harmonic analysis comprises detecting and subtracting the discrete component from the sensed data;
determine an estimated covariance matrix corresponding to the waveform phenomenon based on the estimated spatial spectrum;
determine adaptive beamforming weights using the estimated covariance matrix;
generate a time-domain signal descriptive of the waveform phenomenon by applying the adaptive beamforming weights to the sensed data; and
send the time-domain signal to a computing device.

30. The non-transitory computer-readable medium of claim 29, wherein the sensed data corresponds to a single snapshot from the sensor array.

* * * * *